(12) United States Patent
Inoue et al.

(10) Patent No.: US 11,667,282 B2
(45) Date of Patent: Jun. 6, 2023

(54) DRIVING ASSISTANCE SYSTEM

(71) Applicant: TOYOTA JIDOSHA KABUSHIKI KAISHA, Toyota (JP)

(72) Inventors: Satoshi Inoue, Anjo (JP); Shintaro Inoue, Kanagawa (JP); Shusaku Sugamoto, Toyota (JP); Shuhei Manabe, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 459 days.

(21) Appl. No.: 16/714,969

(22) Filed: Dec. 16, 2019

(65) Prior Publication Data
US 2020/0207341 A1 Jul. 2, 2020

(30) Foreign Application Priority Data
Dec. 28, 2018 (JP) .............................. JP2018-247766

(51) Int. Cl.
*B60W 30/095* (2012.01)
*B60W 30/182* (2020.01)
(Continued)

(52) U.S. Cl.
CPC ........ *B60W 30/0956* (2013.01); *B60W 30/12* (2013.01); *B60W 30/182* (2013.01);
(Continued)

(58) Field of Classification Search
CPC ............ B60W 30/0956; B60W 30/12; B60W 30/18163; B60W 30/182; B60W 30/18145; B60W 50/087; B60W 50/16; B60W 30/095; B60W 2540/18; B60W 30/09; B60W 10/20; B62D 1/04; B62D 5/0409; B62D 15/0265; B62D 5/005;
(Continued)

(56) References Cited

U.S. PATENT DOCUMENTS

2003/0060936 A1    3/2003   Yamamura et al.
2015/0336587 A1   11/2015   Inoue et al.
(Continued)

FOREIGN PATENT DOCUMENTS

JP     2003-063430 A     3/2003
JP     2015-219830 A    12/2015
(Continued)

*Primary Examiner* — Scott A Reinbold
(74) *Attorney, Agent, or Firm* — Sughrue Mion, PLLC

(57) ABSTRACT

A driving assistance system performs a driver-initiative normal driving assistance mode as a driving assistance for a vehicle. The system includes a reaction force characteristics change unit configured to change reaction force characteristics of the operation device, if it is determined that the operation amount of the driver is not included in the appropriate operation amount range in the normal driving assistance mode, an explicit risk determination unit configured to determine whether or not an explicit risk is present based on the external environment of the vehicle, and a driving assistance switching unit configured to switch a driving assistance for the vehicle from the normal driving assistance mode to a system-initiative risk avoidance assistance mode, if it is determined by the explicit risk determination unit that the explicit risk is present in the normal driving assistance mode.

11 Claims, 27 Drawing Sheets

(51) Int. Cl.
  *B62D 1/04* (2006.01)
  *B60W 30/18* (2012.01)
  *B62D 5/04* (2006.01)
  *B60W 30/12* (2020.01)
  *B60T 8/175* (2006.01)

(52) U.S. Cl.
  CPC ......... *B60W 30/18163* (2013.01); *B62D 1/04* (2013.01); *B62D 5/0409* (2013.01); *B60T 8/175* (2013.01)

(58) Field of Classification Search
  CPC ... B62D 5/0463; B60T 8/175; B60T 2220/02; B60K 26/02; B60K 2026/023
  USPC .......................................................... 340/435
  See application file for complete search history.

(56) References Cited

U.S. PATENT DOCUMENTS

| | | | |
|---|---|---|---|
| 2016/0325779 A1* | 11/2016 | Zwicky | B60W 50/14 |
| 2017/0088174 A1 | 3/2017 | Inoue et al. | |
| 2017/0327110 A1 | 11/2017 | Inoue et al. | |
| 2018/0362076 A1* | 12/2018 | Rowell | B62D 6/04 |
| 2019/0064829 A1* | 2/2019 | Ozawa | B60W 30/12 |
| 2019/0351898 A1* | 11/2019 | Kondo | B60T 8/00 |
| 2019/0367082 A1* | 12/2019 | Sugamoto | B62D 15/025 |
| 2019/0375431 A1* | 12/2019 | Garcia | B60W 50/16 |

FOREIGN PATENT DOCUMENTS

| | | |
|---|---|---|
| JP | 2017-065323 A | 4/2017 |
| JP | 2017-206040 A | 11/2017 |
| JP | 2017-206117 A | 11/2017 |

* cited by examiner

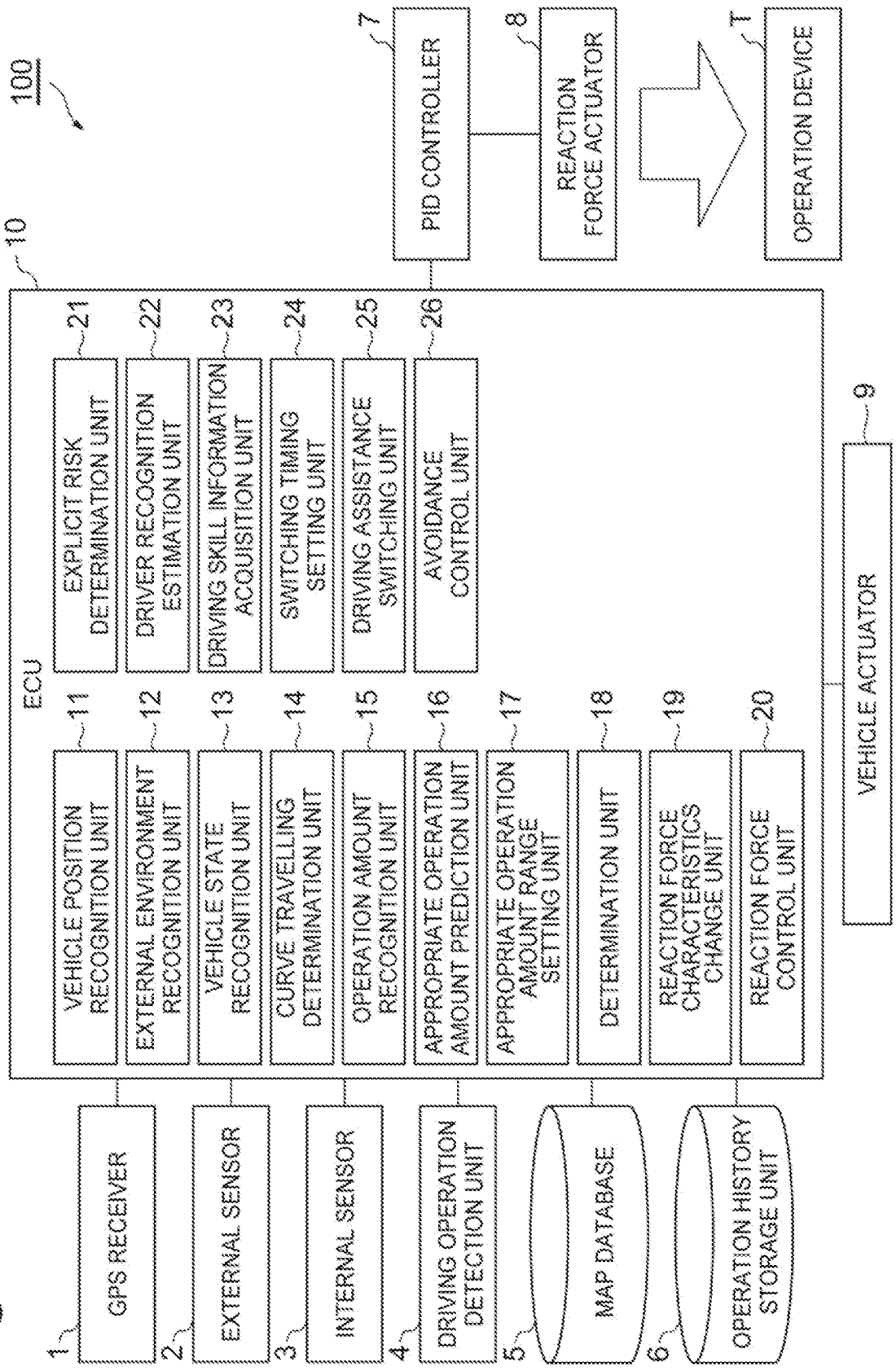

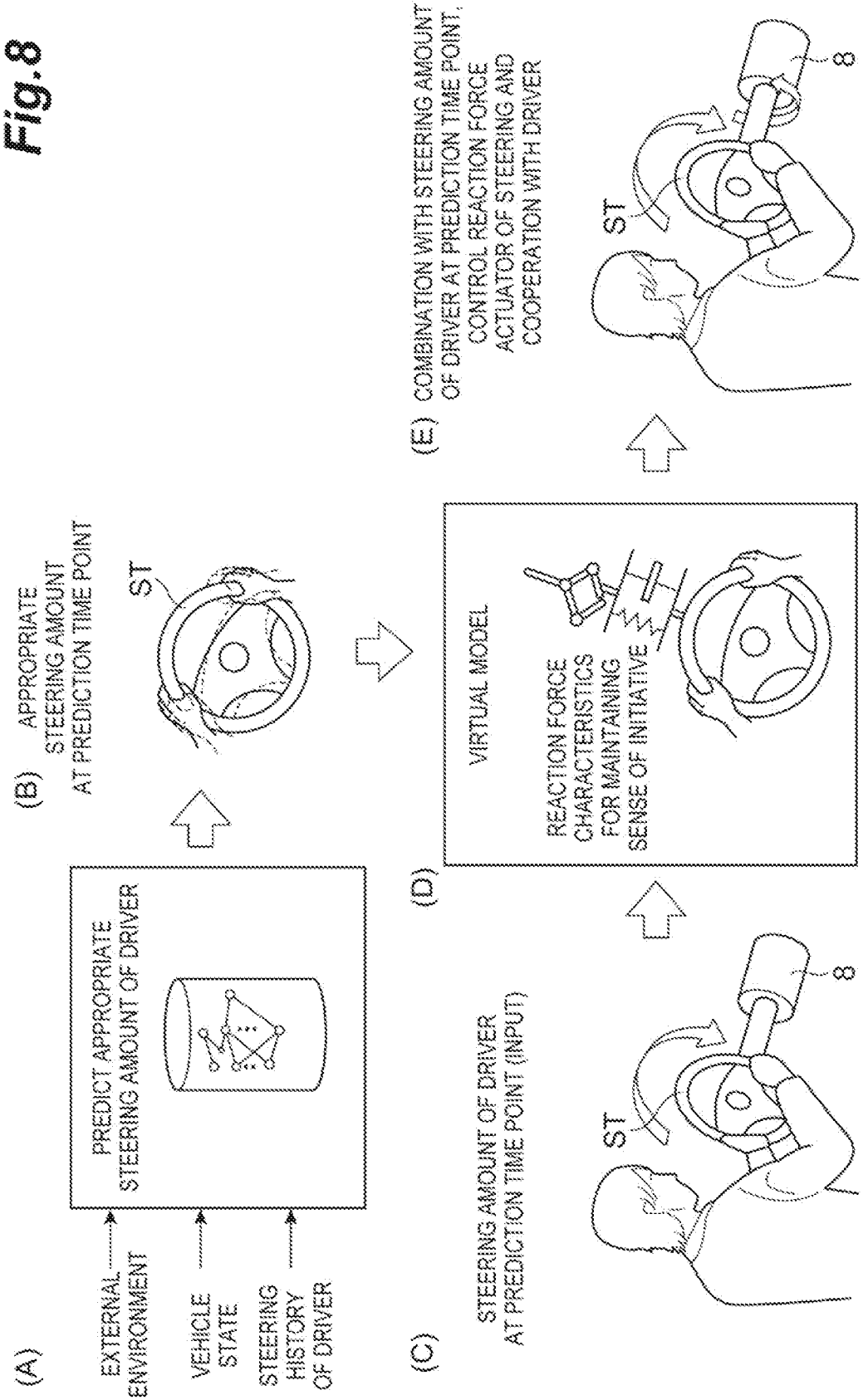

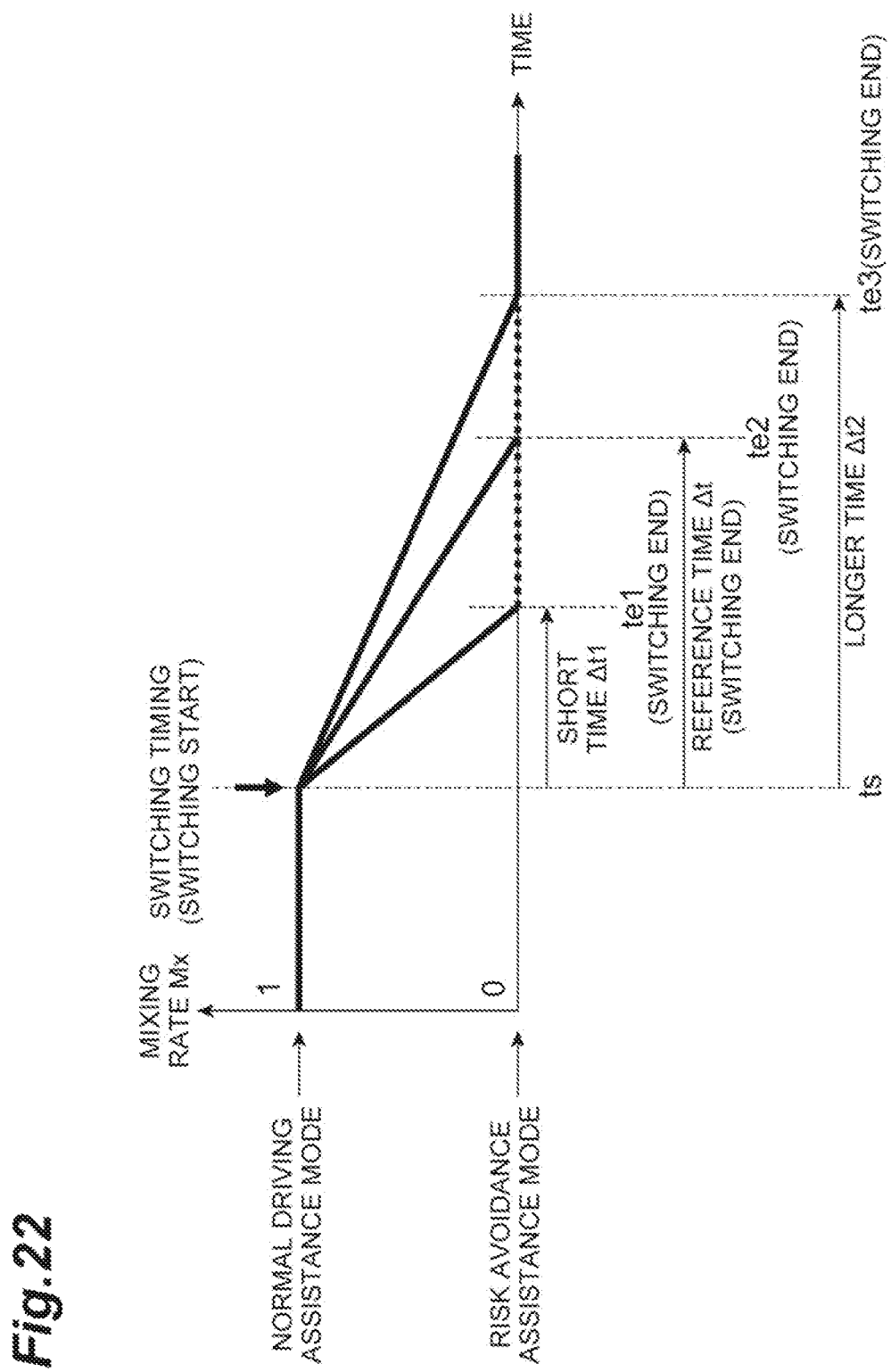

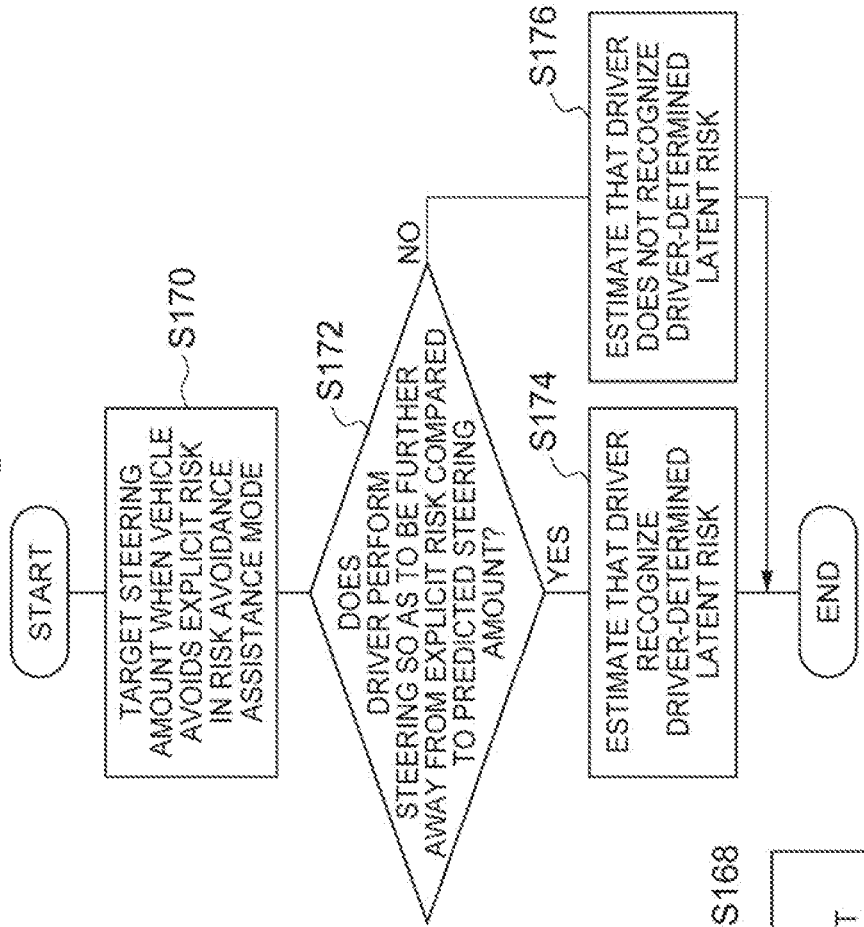
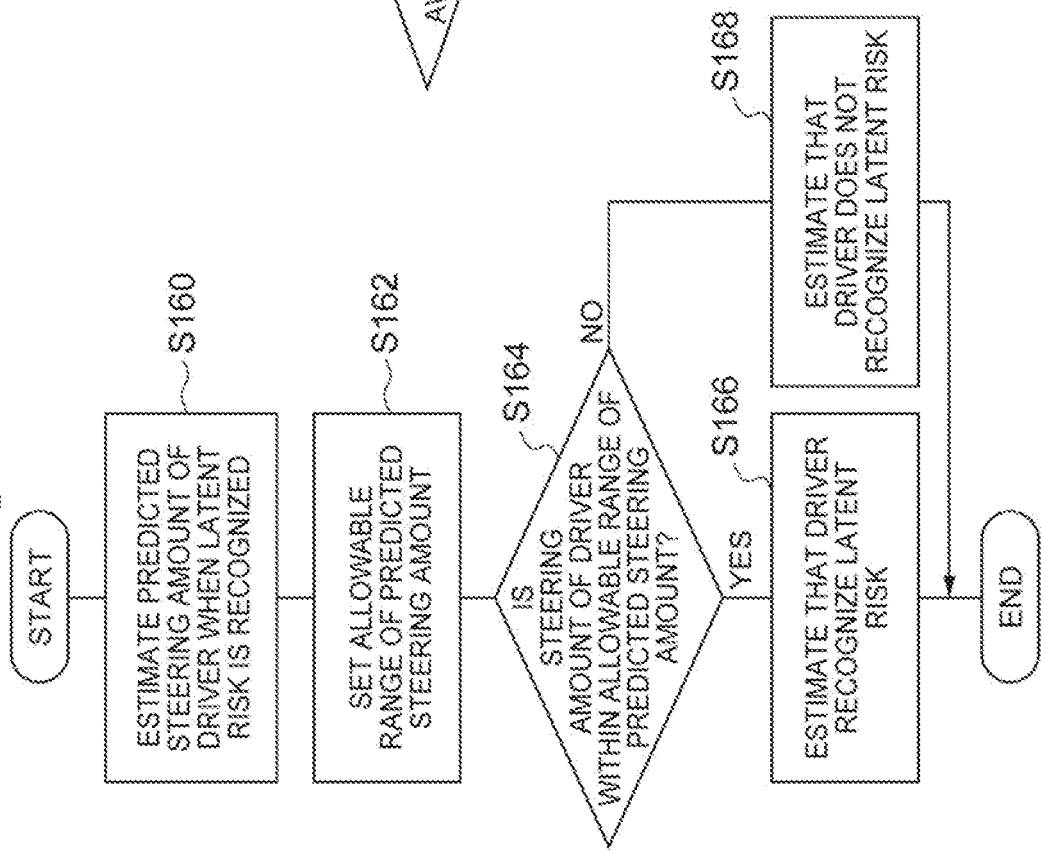

DRIVING ASSISTANCE SYSTEM

TECHNICAL FIELD

The present disclosure relates to a driving assistance system.

CROSS-REFERENCE TO RELATED APPLICATION

This application claims the benefit of priority from Japanese Patent Application No. 2018-247766, filed Dec. 28, 2018, the entire contents of which are incorporated herein by reference.

BACKGROUND

In the related art, Japanese Unexamined Patent Publication No. 2003-063430 is known as a technical literature relating to a driving assistance system. In this publication, an apparatus is described, which estimates a driving operation amount required for a driver in the future, and controls the operation of vehicle's equipment so as to prompt the necessary driving operation amount for the driver.

SUMMARY

Incidentally, when an operation interference is performed so as to prompt the driver for the necessary driving operation amount as the apparatus described above, this leads to a deterioration in the sense of initiative of the driver in the driving operation. For this reason, it is required to provide a driving assistance such that the operation amount of the driver becomes appropriate while maintaining the sense of initiative of the driver. On the other hand, when there is a risk in traveling of a vehicle, it is required to take appropriate measures to avoid the risk.

An aspect of the present disclosure provides a driving assistance system that performs a driver-initiative normal driving assistance mode as a driving assistance for a vehicle. The system includes: an operation amount recognition unit configured to recognize an operation amount of a driver for an operation device of the vehicle; an external environment recognition unit configured to recognize an external environment of the vehicle; an appropriate operation amount range setting unit configured to set an appropriate operation amount range that is a range of an appropriate operation amount performed by the driver in response to the external environment; a determination unit configured to determine whether or not the operation amount of the driver is included in the appropriate operation amount range; a reaction force characteristics change unit configured to change reaction force characteristics of the operation device, if it is determined by the determination unit that the operation amount of the driver is not included in the appropriate operation amount range, such that a reaction force increase amount with respect to the increase of the operation amount in the appropriate operation amount range is large compared to the reaction force increase amount with respect to the increase of the operation amount from the operation amount at the time of the determination which is an operation amount at the time of determination to the appropriate operation amount rang in the normal driving assistance mode, or configured to change the reaction force characteristics of the operation device, if it is determined by the determination unit that the operation amount of the driver is not included in the appropriate operation amount range, such that the reaction force decrease amount with respect to the decrease of the operation amount in the appropriate operation amount range is large compared to the reaction force decrease amount with respect to the decrease of the operation amount from the operation amount at the time of the determination to the appropriate operation amount range in the normal driving assistance mode; an explicit risk determination unit configured to determine whether or not an explicit risk is present based on the external environment of the vehicle; and a driving assistance switching unit configured to switch a driving assistance for the vehicle from the normal driving assistance mode to a system-initiative risk avoidance assistance mode, if it is determined by the explicit risk determination unit that the explicit risk is present in the normal driving assistance mode.

According to the driving assistance system in an aspect of the present disclosure, if it is determined by the determination unit that the operation amount of the driver is not included in the appropriate operation amount range, the operation amount of the driver is suppressed from exceeding the appropriate operation amount range by changing the reaction force characteristics of the operation device, and thus, the operation amount of the driver can be easily stayed within the appropriate operation amount range in the normal driving assistance mode. Therefore, it is possible to perform the driving assistance such that the operation amount of the driver becomes appropriate while maintaining the sense of initiative of the driver. In addition, in the driving assistance system, if it is determined that an explicit risk such as stop vehicle is present in front of the vehicle, the driving assistance of vehicle is switched from the driver-initiative normal driving assistance mode to the system-initiative risk avoidance assistance mode. Therefore, according to the driving assistance system, it is possible to perform the driving assistance such that the operation amount of the driver becomes appropriate while maintaining the sense of initiative of the driver in the driver-initiative normal driving assistance mode, and it is possible to take appropriate measures to avoid the risk in the system-initiative risk avoidance assistance mode.

In the driving assistance system according to an aspect of the present disclosure, the operation amount of the driver may include a steering amount of the driver for the steering section of the vehicle. The system may further include a driver recognition estimation unit configured to estimate whether or not the driver recognizes the explicit risk, if it is determined by the explicit risk determination unit that the explicit risk is present, based on a predicted steering amount when the driver does not recognize the explicit risk or when the driver does recognizes the explicit risk, and the steering amount of the driver in the normal driving assistance mode. The driving assistance switching unit may be configured to switch the driving assistance for the vehicle from the normal driving assistance mode to the risk avoidance assistance mode, if it is estimated by the driver recognition estimation unit that the driver recognizes the explicit risk.

The driving assistance system according to an aspect of the present disclosure may further include a driving skill information acquisition unit configured to acquire information on a driving skill of the driver, and a switching timing setting unit configured to set a switching timing based on the information on the driving skill of the driver, if it is determined by the driver recognition estimation unit that the driver does not recognize the explicit risk. The driving assistance switching unit may be configured to switch the driving assistance for the vehicle from the normal driving assistance mode to the risk avoidance assistance mode when the switching timing is set and when the vehicle is in the switching timing, in the normal driving assistance mode.

The driving assistance system according to an aspect of the present disclosure may further include a switching transition time setting unit configured to set a switching transition time which is a time from switching start to switching end, when switching from the normal driving assistance mode to the risk avoidance assistance mode. The driving assistance switching unit may be configured to gradually change an assistance torque given to the steering section through the time from the switching start to the switching end such that the assistance torque is changed from a reaction force giving torque in the normal driving assistance mode to a risk avoidance assistance torque in the risk avoidance assistance mode. The switching transition time setting unit may be configured to set the switching transition time as a longer time if it is estimated by the driver recognition estimation unit that the driver does not recognize the explicit risk compared to a case where if it is estimated by the driver recognition estimation unit that the driver recognizes the explicit risk.

The driving assistance system according to an aspect of the present disclosure may further include a vehicle position recognition unit configured to recognize a vehicle position on a map, a latent risk database configured to store latent risk information associated with the position on the map, and a latent risk determination unit configured to determine whether or not a latent risk is present based on the vehicle position on the map and the latent risk information. The driving assistance switching unit may be configured to switch the driving assistance for the vehicle from the normal driving assistance mode to the risk avoidance assistance mode, if it is determined by the latent risk determination unit that the latent risk is present.

The driving assistance system according to an aspect of the present disclosure may further include a switching transition time setting unit configured to set a switching transition time which is a time from switching start to switching end, when switching from the normal driving assistance mode to the risk avoidance assistance mode. The driver recognition estimation unit may be configured to estimate whether or not the driver recognizes the latent risk based on a predicted steering amount when the driver recognizes the latent risk and a steering amount of the driver, if it is estimated by the latent risk determination unit that the latent risk is present. The driving assistance switching unit mat be configured to gradually change an assistance torque given to the steering section through the time from the switching start to the switching end such that the assistance torque is changed from a reaction force giving torque in the normal driving assistance mode to a risk avoidance assistance torque in the risk avoidance assistance mode. The switching transition time setting unit may be configured to set the switching transition time as a longer time if it is determined by the latent risk determination unit that the latent risk is present and when it is estimated by the driver recognition estimation unit that the driver does not recognize the explicit risk, compared to a case when it is estimated by the driver recognition estimation unit that the driver recognizes the explicit risk.

In the driving assistance system according to an aspect of the present disclosure, the driver recognition estimation unit may be configured to estimate whether or not the driver recognizes a driver-determined latent risk based on the target steering amount when the vehicle avoids the explicit risk in the risk avoidance assistance mode and a steering amount of the driver, if it is determined by the explicit risk determination unit that the explicit risk is present and if it is determined by the latent risk determination unit that the latent risk is not present. The driving assistance switching unit may be configured to continue the normal driving assistance mode if it is estimated by the driver recognition estimation unit that the driver recognizes the driver-determined latent risk. Advantageous Effects of the disclosure.

According to a driving assistance system in an aspect of the present disclosure, it is possible to perform the driving assistance such that the operation amount of the driver amount becomes appropriate while maintaining the sense of initiative of the driver in the normal driving assistance mode under the driver's initiative, and it is possible to take appropriate measures to avoid the risk in a system-initiative risk avoidance assistance mode.

BRIEF DESCRIPTION OF THE DRAWINGS

FIG. 1 is a block diagram illustrating a driving assistance system according to a first embodiment.

FIG. 8 is diagram for explaining a functional outline of the driving assistance system.

FIG. 22 is a graph illustrating an example of a relationship between a mixing rate and a time relating to the setting of the switching transition time.

FIG. 27A is a flowchart illustrating an example of driver's latent risk recognition estimation processing.

FIG. 27B is a flowchart illustrating an example of driver-determined driver's latent risk recognition estimation processing.

DETAILED DESCRIPTION

Figure 2A:
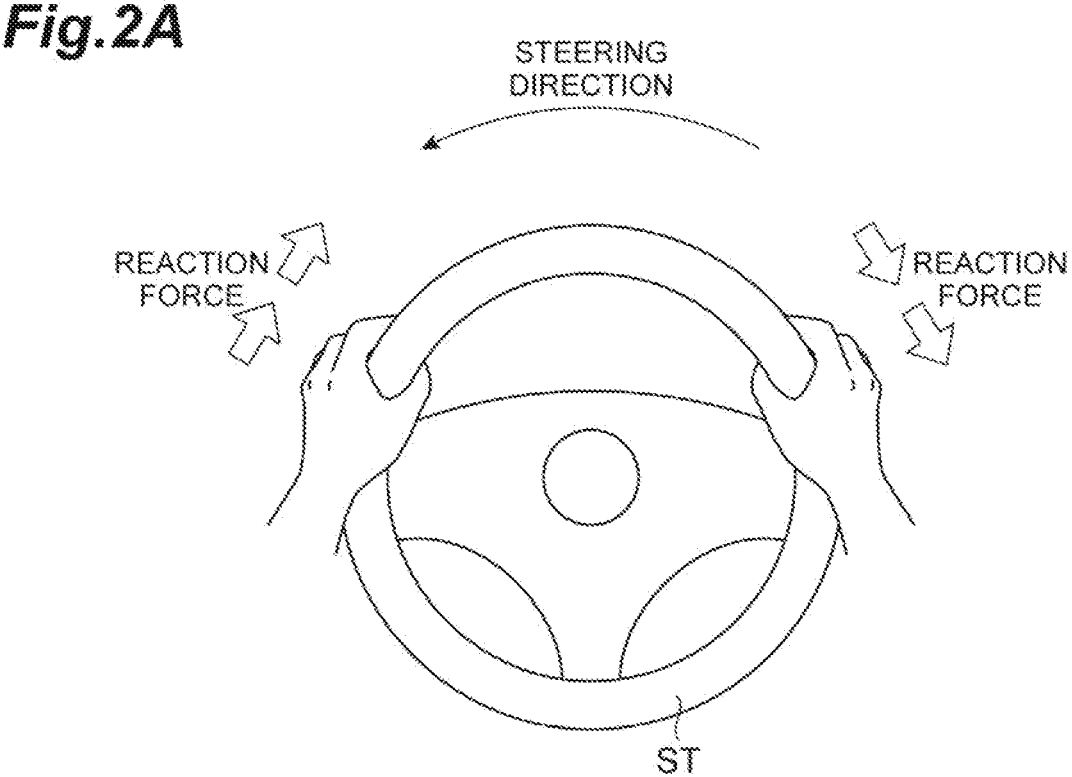
FIG. 2A is a diagram for explaining reaction force generated when a steering section is rotated from a reference position.

Hereinafter, embodiments of the present disclosure will be described with reference to the drawings.

First Embodiment

FIG. 1 is a block diagram illustrating a driving assistance system according to a first embodiment. A driving assistance system 100 illustrated in FIG. 1 is a system for performing driving assistance to assist a driving operation by a driver of a vehicle. The driving assistance system 100 can perform a normal driving assistance mode and a risk avoidance assistance mode as a driving assistance for the vehicle, and can switch the assistance mode between the normal driving assistance mode and the risk avoidance assistance mode.

The normal driving assistance mode is a mode for performing the driving assistance on the driver-initiative driving. In the normal driving assistance mode in the present embodiment, the driving assistance is performed to change reaction force characteristics of an operation device T of the vehicle such that an operation amount of the operation device T by driver becomes an appropriate operation amount.

The risk avoidance assistance mode is a mode for performing a driving assistance on a system-initiative driving. In the risk avoidance assistance mode, an operation intervention is performed by the system, and the driving assistance for the vehicle is performed to avoid the risks. Details of the normal driving assistance mode and the risk avoidance assistance mode will be described later.

Configuration of Driving Assistance System in First Embodiment

A configuration of the driving assistance system 100 in the first embodiment will be described with reference to the drawings. As illustrated in FIG. 1, the driving assistance system 100 includes an electronic control unit (ECU) 10 that performs an overall management of the system. The ECU 10 is an electronic control unit including a central processing unit (CPU), read only memory (ROM), random access memory (RAM), a controller area network (CAN) communication circuit, and the like. In the ECU 10, for example, various functions are realized by loading a program stored in the ROM into the RAM and executing the program loaded in the RAM by the CPU. The ECU 10 may be configured of a plurality of electronic units.

The ECU 10 is connected to a GPS receiver 1, an external sensor 2, an internal sensor 3, a driving operation detection unit 4, a map database 5, operation history storage unit 6, a proportional integral differential (PID) controller 7, a reaction force actuator 8, and a vehicle actuator 9.

The GPS receiver 1 measures a position of the vehicle (for example, latitude and longitude of the vehicle) by receiving signals from equal to or more than three GPS satellites. The GPS receiver 1 transmits information on the measured position of the vehicle to the ECU 10.

The external sensor 2 is a detection device that detects a surrounding environment of the vehicle. The external sensor 2 includes at least one of a camera and a radar sensor.

The camera is an imaging device that images the external situation of the vehicle. The camera is provided on at the inside of a windshield of the vehicle. The camera transmits image information relating to the surroundings of the vehicle to the ECU 10. The camera may be a monocular camera or may be a stereo camera.

The radar sensor is a detection device that detects objects around the vehicle using radio waves (for example, millimeter waves) or light. The radar sensor includes, for example, millimeter wave radar or a light detection and ranging (LIDAR). The radar sensor transmits the radio wave or light to the surroundings of the vehicle, and detects the objects by receiving radio waves or light reflected from obstacles. The radar sensor transmits the detected object information to the ECU 10.

The internal sensor 3 is a detection device that detects a travel state of the vehicle. The internal sensor 3 includes a vehicle speed sensor, an accelerator sensor, and a yaw rate sensor. The vehicle speed sensor is a measurement device that measures a speed of the vehicle. As the vehicle speed sensor, for example, a vehicle wheel speed sensor is used, which is provided on vehicle wheels of the vehicle or on a drive shaft rotating integrally with vehicle wheels, and measures a rotational speed of the vehicle wheels. The vehicle speed sensor transmits the measured vehicle speed information (vehicle wheel speed information) to the ECU 10.

The accelerator sensor is a measurement device that measures an acceleration of the vehicle. The accelerator sensor includes, for example, a longitudinal accelerator sensor that measures acceleration in the longitudinal direction of the host vehicle and a lateral accelerator sensor that measures a lateral acceleration of the host vehicle. The accelerator sensor transmits, for example, acceleration information of the vehicle to the ECU 10. The yaw rate sensor is a measurement device that measures a yaw rate (rotation angular velocity) around the vertical axis at the center of gravity of the vehicle. As the yaw rate sensor, for example, a Gyro sensor can be used. The yaw rate sensor transmits the measured yaw rate information of the vehicle to the ECU 10.

The driving operation detection unit 4 detects an operation amount of the operation device T of the vehicle by the driver. The operation device T of the vehicle is equipment to which the driver inputs the operation for driving the vehicle. The operation device T of the vehicle includes a steering section of the vehicle. The operation device T includes at least one of an accelerator operation device of the vehicle, and a brake operation device of the vehicle.

The steering section is, for example, a steering wheel. The steering section is not limited to a case of wheel-shape, but may be any configuration as long as the section functions as a steering wheel. The accelerator operation device is, for example, an accelerator pedal. The brake operation device is, for example, a brake pedal. The accelerator operation device and the brake operation device do not necessarily need to be pedals, but may be any configurations as long as the driver can input the acceleration or the deceleration.

In addition, the operation device T of the vehicle has a reference position. The reference position is an initial state of the operation device T, and when the driver does not perform the operation, the operation device T is configured to return to the reference position. The operation device T is configured to generate reaction force according to an amount of change (an operation amount) when the reference position is changed by the driver's operation. When the driver operates the operation devices T so as to return to the reference position, the operation device T generates the reaction force (restoring force) so as to activate the driver's operation.

FIG. 2A is a diagram for explaining the reaction force generated when the steering section ST is rotated from the reference position. The steering section ST illustrated in FIG. 2A is in a state of reference position. As illustrated in FIG. 2A, when the driver rotates the steering section ST counterclockwise from the reference position, the reaction force is generated in the steering section ST so as to hinder the rotation by the driver.

Figure 2B:
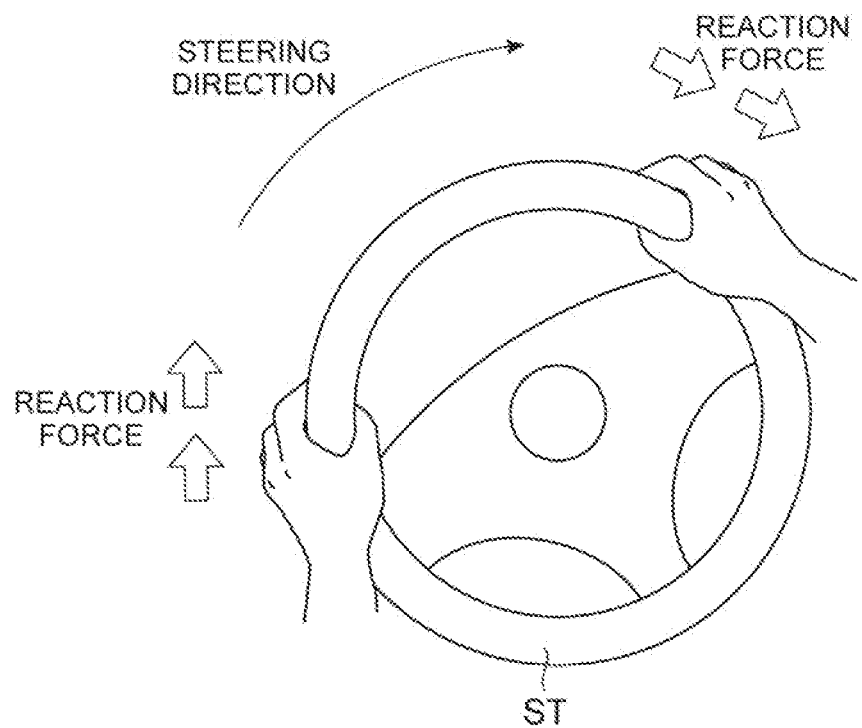
FIG. 2B is a diagram for explaining reaction force generated when the steering section is rotated so as to return to the reference position.

FIG. 2B is a diagram for explaining the reaction force generated when the steering section ST is rotated so as to return to the reference position. The steering section ST illustrated in FIG. 2B is rotated leftward from the reference position. In FIG. 2B, the driver rotates the steering section ST such that the steering section ST returns to the reference position. In this case, as illustrated in FIG. 2B, the reaction force is generated in the steering section ST such that the rotation by the driver is boosted (activated). The reaction force has been described with the steering section ST as an example, and also in the accelerator operation device and the brake operation device, the reaction force is generated such that each operation device returns to the reference position (for example, the initial position of the pedal).

The driving operation detection unit 4 includes a steering sensor. The steering sensor measures the operation amount of the steering section by the driver. The operation amount of the steering section includes a steering angle. The operation amount of the steering section may include a steering torque. The driving operation detection unit 4 may include at least one of an accelerator sensor and a brake sensor. The accelerator sensor measures an operation amount of the accelerator operation device by the driver. The operation amount of the accelerator operation device includes, for example, a pedal stroke (amount of pressing) of the accelerator pedal. The brake sensor measures the operation amount of the brake operation device by the driver. The operation amount of the brake operation device includes, for example, a pedal stroke (amount of pressing) of the brake pedal. The operation amount of the accelerator operation device and the brake operation device may include a pressing speed. The driving operation detection unit 4 transmits the operation amount information on the measured operation amount of the driver to the ECU 10.

The map database 5 is a database storing map information. The map database 5 is configured, for example, in a hard disk drive (HDD) mounted on the vehicle. The map information includes information on the position of the road, information on the shape of the road (for example, a curvature of the curve), information on the position of an intersection and a branch. The map information may also include traffic regulation information such as a speed limit associated with the position information. The map database 5 does not to be mounted on the vehicle, but may be stored in a server that can communicate with the vehicle.

The operation history storage unit 6 is a database that stores an operation history of the driver. The operation history storage unit 6 is configured in, for example, the HDD mounted on the vehicle. The operation history of the driver is a history of the operation amount by the driver.

The operation history storage unit 6 stores the operation history of the driver from the travel start of the vehicle. The operation history storage unit 6 may store the operation history of the driver separately for each trip of the vehicle. If a function of personal driver authentication is installed in the vehicle, the operation history storage unit 6 may store a past operation history for each individual personal authenticated driver. The operation history storage unit 6 may store all the operation history of the driver who drives the vehicle (operation history that does not distinguish the drivers from each individual), without performing the personal authentication. In addition, the operation history storage unit 6 may store the operation history of the driver in association with the external environment and the vehicle state of the vehicle at the time of operation. Details of the external environment and the vehicle state will be described later. The operation history storage unit 6 does not need to be mounted on the vehicle, but may be formed in a server that can communicate with the vehicle.

The PID controller 7 is a controller that performs PID control on the reaction force of the operation device T of the vehicle. The PID controller 7 calculates a command value using a control signal from the ECU 10 according to the operation amount by the driver and the result of control of the vehicle, and transmits the command value to the reaction force actuator 8. In this way, the PID controller 7 suppresses the influence of the disturbance to the operation device T such as the road surface condition.

The reaction force actuator 8 is an actuator that controls the reaction force of the operation device T of the vehicle. The reaction force actuator 8 is connected to the ECU 10 via the PID controller 7. The reaction force actuator 8 includes at least one of a steering reaction force actuator, an accelerator reaction force actuator, and a brake reaction force actuator.

The steering reaction force actuator controls the reaction force of the steering section of the vehicle. The steering reaction force actuator is an electric motor that is, for example, provided on a steering shaft and applies the reaction force (assistance torque) to the steering section through the steering shaft. As the steering reaction force actuator, an electric power steering (EPS) motor may be used. As the steering reaction force actuator, an actuator in a steer-by-wire system in the steering section may be used. The steering reaction force actuator does not need to output all of the reaction force, but may adjust the reaction force felt by the driver by changing the output in combination with the reaction force mechanically transmitted from the tire. The steering reaction force actuator gives the reaction force to the steering section based on the command value transmitted from the PID controller 7.

The accelerator reaction force actuator controls the reaction force of the accelerator operation device of the vehicle. The accelerator reaction force actuator is an electric motor provided, for example, on the accelerator pedal, and gives the reaction force to the accelerator pedal. The accelerator reaction force actuator gives the reaction force to the accelerator pedal (accelerator operation device) based on the command value transmitted from PID controller 7. The brake reaction force actuator controls the reaction force of the brake operation device of the vehicle. The brake reaction force actuator is an electric motor provided on, for example, the brake pedal, and gives the reaction force to the brake pedal. The brake reaction force actuator gives the reaction force to the brake pedal (brake operation device) based on the command value transmitted from the PID controller 7.

The vehicle actuator 9 is a device used for controlling a host vehicle. The vehicle actuator 9 includes at least a drive actuator, a brake actuator, and a steering actuator. The drive actuator controls an amount of air supplied to the engine (throttle opening) according to a control signal from the ECU 10 and controls the driving force of the host vehicle. If the host vehicle is a hybrid vehicle, in addition to the amount of air supplied to the engine, a control signal from the ECU 10 is input to a motor as a power source to control the driving force. If the host vehicle is an electric vehicle, a control signal from the ECU 10 is input to a motor as a power source to control the driving force. The motor as the power source in the above-described cases configures the actuator 8.

The brake actuator controls a brake system according to a control signal from the ECU 10 and controls the braking force given to the vehicle wheels of the host vehicle. As the brake system, for example, a hydraulic brake system can be used. The steering actuator controls the driving of an assist motor that controls the steering torque in the electric power steering system, according to the control signal from the ECU 10. In this way, the steering actuator controls the steering torque of the host vehicle. The steering actuator may be common to the steering reaction force actuator or may be a separate actuator.

Next, a functional configuration of the ECU 10 will be described. The ECU 10 includes a vehicle position recognition unit 11, an external environment recognition unit 12, a vehicle state recognition unit 13, a curve traveling determination unit 14, an operation amount recognition unit 15, an appropriate operation amount prediction unit 16, an appropriate operation amount range setting unit 17, a determination unit 18, a reaction force characteristics change unit 19, a reaction force control unit 20, an explicit risk determination unit 21, a driver recognition estimation unit 22, a driving skill information acquisition unit 23, a switching timing setting unit 24, a driving assistance switching unit 25, and an avoidance control unit 26. A part of the functions of the ECU 10 described below may be performed in a server that can communicate with the vehicle.

The vehicle position recognition unit 11 recognizes a vehicle position on the map based on the position information from the GPS receiver 1 and the map information in the map database 5. In addition, the vehicle position recognition unit 11 may recognize the vehicle position on the map using the position information on fixed obstacles such as utility poles included in the map information in the map database 5 and the result of detection performed by the external sensor 2 using a simultaneous localization and mapping (SLAM) technology. In addition, the vehicle position recognition unit 11 may recognize the vehicle position on the map using a well-known method.

The external environment recognition unit 12 detects an external environment of the vehicle based on the result of detection performed by the external sensor 2 (image captured by the camera and/or object information by the radar sensor) and the vehicle position on the map and map information recognized by the vehicle position recognition unit 11. The external environment includes road situations around the vehicle and object situations around the vehicle.

The road situation includes the curvature of the traveling road on which the vehicle travels. The road situation may include slopes, lane widths, and the number of lanes. The external environment recognition unit 12 can recognize the road situation from the map information and/or from the result of detection performed by the external sensor 2. The object situation includes a position of the object with respect to the vehicle. The object situation may include a moving direction of the object with respect to the vehicle and a relative speed of the object with respect to the vehicle. The external environment recognition unit 12 can recognize the object situation from the result of detection performed by the external sensor 2.

The vehicle state recognition unit 13 recognizes the state of the traveling vehicle based on the result of measurement performed by the internal sensor 3. The vehicle state includes at least one of a vehicle speed of the vehicle, an acceleration of the vehicle, and a yaw rate of the vehicle. The vehicle state recognition unit 13 can recognize the vehicle speed of the vehicle based on the vehicle speed information from the vehicle speed sensor. The vehicle state recognition unit 13 can recognize the acceleration (a longitudinal acceleration and a lateral acceleration) of the vehicle based on the acceleration information from the accelerator sensor. The vehicle state recognition unit 13 can recognize the yaw rate of the vehicle based on the yaw rate information from the yaw rate sensor.

The curve traveling recognition unit 14 determines whether or not the vehicle is traveling on a curve. The curve traveling recognition unit 14 determines whether or not the vehicle is traveling on the curve based on the curvature of the traveling road recognized by external environment recognition unit 12.

The operation amount recognition unit 15 recognizes the operation amount of the driver on the operation device T of the vehicle based on the operation amount information from the driving operation detection unit 4. The operation amount recognition unit 15 recognizes the operation amount of the driver including at least a steering amount of the driver on the steering section of the vehicle. The operation amount of the driver may include at least one of the accelerator operation amount of the driver on the accelerator operation device of the vehicle and the brake operation amount of the driver on the brake operation device of the vehicle. The operation amount recognition unit 15 may store the result of recognizing the operation amount of the driver in the operation history storage unit 6.

The appropriate operation amount prediction unit 16 predicts a appropriate operation amount of the driver based on the operation history of the driver stored in the operation history storage unit 6, the external environment recognized by the external environment recognition unit 12, and the vehicle state recognized by the vehicle state recognition unit 13. For example, at least the operation history from the current time point to a certain time before (for example, a couple of seconds) can be used as the operation history of the driver.

The appropriate operation amount is an operation amount that the driver normally tries to operate in response to the external environment along the operation history of the driver. The appropriate operation amount is predicted as the operation amount if it is assumed that the driver grasps the external environment and the vehicle state based on the operation history of the driver, external environment, and the vehicle state, and performs the appropriate driving operation. As an example, the appropriate operation amount can be an operation amount in which the vehicle travels in the vicinity of the center of the driving lane and the distance between the vehicle and the surrounding object such as a preceding vehicle can be secured as equal to or longer than a certain distance. The appropriate operation amount includes an appropriate steering amount corresponding to the steering amount. The appropriate operation amount may include at least one of an appropriate accelerator operation amount corresponding to the accelerator operation amount, and an appropriate brake operation amount corresponding to the brake operation amount.

The appropriate operation amount prediction unit 16 predicts the appropriate operation amount at a prediction time point set in advance. The prediction time point is a time point at which the appropriate operation amount is predicted. The prediction time point can be, for example, 0.5 seconds, 1 second, and 2 seconds after the current time point. The prediction time point can be a time point after a lapse of a time longer than a control cycle of the vehicle such that the prediction time point does not become past at the time of performing the control.

As an example, the appropriate operation amount prediction unit 16 predicts the appropriate operation amount using a driving behavior model optimized by machine learning. The driving behavior model is generated in such a manner that the appropriate operation amount is output at the prediction time point when the operation history of the driver, the external environment, and the vehicle state are input. The appropriate operation amount prediction unit 16 may predict the appropriate operation amount using a statistical model. From vast statistical data in which the operation history of the driver, the external environment, and the vehicle state, and the subsequent operation amount of the driver are associated with each other, the appropriate operation amount prediction unit 16 searches for a case having the similar operation history of the driver, the external environment, and the vehicle state, and then, the operation amount of the driver can be predicted using the appropriate operation amount in the similar case. The statistical data is stored in, for example, a server that can communicate with the vehicle. The method of predicting the appropriate operation amount by the appropriate operation amount prediction unit 16 is not particularly limited, and various methods can be adopted. The appropriate operation amount prediction unit 16 may predict the appropriate operation amount using a driving trend of a driver instead of the operation history of the driver. The driving tendency of the driver can be obtained from the operation history of the driver using a well-known evaluation method.

When the appropriate operation amount is predicted by the appropriate operation amount prediction unit 16, the appropriate operation amount range setting unit 17 sets an appropriate operation amount range including the appropriate operation amount. The appropriate operation amount range is a range of the operation amount including the appropriate operation amount. The appropriate operation amount range may be set as a range with the appropriate operation amount as a median value. The appropriate operation amount range can be set as a certain range set in advance. The appropriate operation amount range does not necessarily need to be the median value of the appropriate operation amount, and the appropriate operation amount may be a value deviated from the median value.

The appropriate operation amount range includes an appropriate steering amount range corresponding to the appropriate steering amount. The appropriate operation amount range may include at least one of an appropriate accelerator operation amount range corresponding to the appropriate accelerator operation amount, and an appropriate brake operation amount range corresponding to the appropriate brake operation amount. As a specific example, the appropriate steering amount range can be a range of equal to or larger than −10 degrees and equal to or smaller than +10 degrees with a clockwise steering as a positive steering angle and with the appropriate steering amount as a median value. The appropriate steering amount range may be a range of equal to or larger than −5 degrees and equal to or smaller than +5 degrees with the appropriate steering amount as a median value. In a case of the appropriate accelerator operation amount range, a certain accelerator operation amount range with the appropriate accelerator operation amount as a median value can be the appropriate accelerator operation amount range. The same is applied to the case of appropriate brake operation amount range.

The determination unit 18 determines whether or not the operation amount of the driver corresponding to the prediction time point for the appropriate operation amount is included in the appropriate operation amount range based on the operation amount of the driver recognized by the operation amount recognition unit 15 and the appropriate operation amount range set by the appropriate operation amount range setting unit 17.

The operation amount of the driver corresponding to the prediction time point for the appropriate operation amount is the operation amount of the driver recognized at the prediction time point, for example. As the operation amount of the driver amount corresponding to the prediction time point for the appropriate operation amount, the operation amount of the driver recognized immediately before the prediction time point (for example, the recognition timing of the previous operation amount) may be used. Hereinafter, the operation amount of the driver amount when the operation amount of the driver amount corresponding to the prediction time point for the appropriate operation amount is determined not to be included in the appropriate operation amount range by the determination unit 18 is referred to as an operation amount at the time of determination. The operation amount at the time of determination includes a steering amount at the time of determination. The operation amount at the time of determination may include at least one of an accelerator operation amount at the time of determination and a brake operation amount at the time of determination.

The reaction force characteristics change unit 19 changes the reaction force characteristics of the operation device T when the driving assistance for the vehicle is in the normal driving assistance mode. If it is determined by the determination unit 18 that the operation amount of the driver amount corresponding to the prediction time point for the appropriate operation amount is not included in the appropriate operation amount range and if it is determined by the curve traveling recognition unit 14 that the vehicle is traveling on a curve, the reaction force characteristics change unit 19 changes the reaction force characteristics of the operation device T to the reaction force characteristics for maintaining the sense of initiative. The reaction force characteristics change unit 19 does not change the reaction force characteristics when the driving assistance for the vehicle is in the risk avoidance assistance mode.

The reaction force characteristics change unit 19 can change the reaction force characteristics using, for example, a virtual model optimized by machine learning. When the types of operation device T (the types of the steering section, the accelerator operation device, and the brake operation device), the appropriate operation amount, the operation amount of the driver, and the current operation amount are input, the virtual model outputs the reaction force characteristics for maintaining the sense of initiative. At least one of the reference reaction force characteristics of the operation device T and the appropriate operation amount range may be included in the input to the virtual model. By selecting any one of the type of operation device T, the appropriate operation amount, and the appropriate operation amount range from the prepared reaction force characteristics for maintaining the sense of initiative patterns, the reaction force characteristics change unit 19 may change the reaction force characteristics to the reaction force characteristics for maintaining the sense of initiative. The reaction force characteristics change unit 19 may use a physical model, a mathematical model, or a statistical model. The method of changing the reaction force characteristics using the reaction force characteristics change unit 19 is not particularly limited, and various methods can be adopted.

The reaction force characteristics of the operation device T is the characteristics of the reaction force given to the operation device T according to the operation amount of the driver for the operation device T. The reaction force characteristics relates to the amount of change of the reaction force according to the change of the operation amount of the driver for the operation device T. The reaction force characteristics relates to force sensing characteristics felt by the driver from the operation device T.

Here, the reaction force characteristics of the operation device T if it is determined by the determination unit 18 that the operation amount of the driver amount corresponding to the prediction time point for the appropriate operation amount is included in the appropriate operation amount range is referred to as reference reaction force characteristics. The reaction force characteristics for maintaining the sense of initiative can be set by performing a minute change on the reference reaction force characteristics. The minute change means a change of such an extent that the sense of initiative of the driver can be maintained.

The reaction force characteristics for maintaining the sense of initiative means reaction force characteristics in which the operation amount of the driver is likely to stay in the appropriate operation amount range while maintaining the sense of initiative of the driver. The sense of initiative of the driver is the sense of initiative for the driver's driving operation of the vehicle. The sense of initiative of the driver relates to the driver's willingness to the driving operation. Excessive operation intervention on the driver's driving operation decreases the driver's willingness to the driving operation and impairs the sense of initiative.

The reaction force characteristics for maintaining the sense of initiative can be defined as the reaction force characteristics in which a reaction force increase amount with respect to the increase of the operation amount in the appropriate operation amount range is large compared to a reaction force increase amount with respect to the increase of the operation amount from the operation amount at the time of determination that the operation amount of the driver is not included in the appropriate operation amount range to the appropriate operation amount range. "When the reaction force increases with respect to the change in the operation amount" means a time when the operation device T is operated to be away from the reference position. Specifically, a case where the driver rotates the steering section ST in one direction so as to leave from the reference position (reference angle) is included. In addition, a case where the driver is pressing the accelerator pedal or the brake pedal from the reference position is included.

In this case, while changing the operation amount for the operation device T so as to approach the appropriate operation amount (for example, the operation amount according to the curvature of the curve on which the vehicle travels), the reaction force increase amount felt by the driver after the operation amount reaches the appropriate operation amount range is large compared to that before the operation amount reaches the appropriate operation amount range. Therefore, the driver can decrease the possibility of deviating beyond the appropriate operation amount range caused by further increase of the operation amount, and thus, it is possible to make the operation amount of the driver easy to stay in the appropriate operation amount range.

Figure 3:
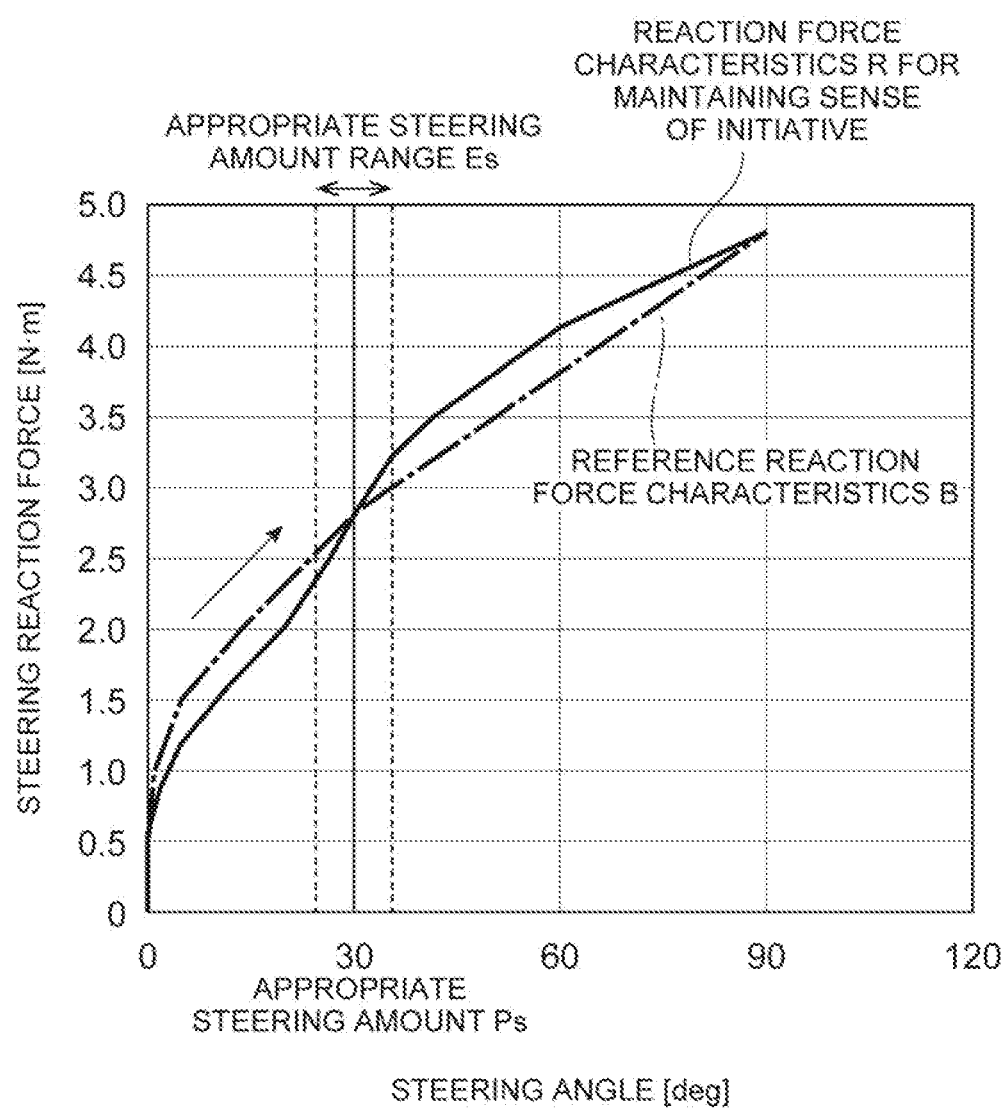
FIG. 3 is a graph illustrating reaction force characteristics when the steering section is rotated so as to be away from the reference position.

Specifically, FIG. 3 is a graph illustrating the reaction force characteristics when the steering section ST is rotated so as to be away from the reference position. In FIG. 3, the vertical axis represents the steering reaction force and the horizontal axis represents the steering angle. The reference position is assumed to be 0 degree.

FIG. 3 illustrates an example of the appropriate steering amount Ps, the appropriate steering amount range Es, the reference reaction force characteristics B, and the reaction force characteristics R for maintaining the sense of initiative. In FIG. 3, it is assumed that the appropriate steering amount Ps is set to 30 degrees, and the appropriate steering amount range Es is set to equal to or larger than 25 degrees and equal to or smaller than 35 degree. In addition, in FIG. 3, as a precondition, the vehicle is assumed to be traveling on a curve, and the current steering angle of the steering section ST is equal to or larger than 0 degrees and equal to or smaller than 25 degrees. That is, the current steering angle is not included in the appropriate steering amount range Es, and it is necessary to increase the steering angle so as to reach the appropriate steering amount Ps in order to be away from the reference position.

In the situation illustrated in FIG. 3, since it is determined by the determination unit 18 that the steering angle (steering amount) by the driver corresponding to the prediction time point of the appropriate steering amount is not included in the appropriate steering amount range Es, and it is determined by the curve traveling recognition unit 14 that the vehicle is running on the curve, the reaction force characteristics change unit 19 changes the reaction force characteristics of the steering section ST from the reference reaction force characteristics B to the reaction force characteristics R for maintaining the sense of initiative. The reaction force characteristics R for maintaining the sense of initiative is the reaction force (steering reaction force) same as the reference reaction force characteristics B in the appropriate steering amount Ps (30 degrees in this case). That is, the driver receives the reaction force same as the reference reaction force characteristics B when the operation amount reaches the appropriate steering amount Ps.

The reaction force characteristics change unit 19 changes the reaction force characteristics to the reaction force characteristics R for maintaining the sense of initiative by performing the minute change such that the reaction force increase amount with respect to the increase of steering angle in the appropriate steering amount range Es is large than that in the reference reaction force characteristics B. In the reaction force characteristics R for maintaining the sense of initiative, the reaction force increase amount with respect to the increase of the operation amount in the appropriate steering amount range Es is large compared to the reaction force increase amount (the reaction force increase amount along the reference reaction force characteristics B) with respect to the increase of the steering amount from the steering amount at the time of determination that the steering amount of the driver is not included in appropriate steering amount range Es to time of reaching the appropriate steering amount range Es.

The reaction force increase amount with respect to the increase of the steering angle corresponds to the slope of the reference reaction force characteristics B and the reaction force characteristics R for maintaining the sense of initiative in FIG. 3. The reaction force characteristics change unit 19 performs the minute change on the reaction force characteristics of the steering section ST to be the reaction force characteristics R for maintaining the sense of initiative in which the slope in the appropriate steering amount range Es becomes approximately three times or twice as large as the reference reaction force characteristics B. In the minute change, any magnification between 1.1 times to 5 times may be adopted.

As illustrated in FIG. 3, if the slope is approximately 3 times, the steering torque increase is approximately 12%. If the slope is approximately 2 times, the steering torque increase is approximately 7%. In the reaction force characteristics R for maintaining the sense of initiative, an upper limit of the increase in reaction force compared to the reference reaction force characteristics B may be 15%. In the appropriate steering amount range Es also, the reaction force characteristics is set in such a manner that the driver does not feel an excessive burden and can change the steering amount with the driver's intention.

Alternatively, the reaction force characteristics R for maintaining the sense of initiative may be the reaction force characteristics in which a reaction force decrease amount with respect to the decrease of the operation amount in the appropriate operation amount range is large compared to the reaction force decrease amount with respect to the decrease of the operation amount from the operation amount at the time of determination to the appropriate operation amount range. "When the reaction force decreases with respect to the change in the operation amount" means a time when the operation device is operated to return to the reference position. Specifically, a case where the driver rotates the steering section to return to the reference position is included. In addition, a case where the driver weakens the pressing force on the accelerator pedal or the brake pedal so as to return pedals to the reference position is corresponding to the case described above. At this time, the reaction force felt by the driver is the reaction force that boosts the driver's operation (the reaction force which makes the operation device try to return to the reference position).

In this case, while changing the operation amount for the operation device T so as to approach the appropriate operation amount, the reaction force decrease amount felt by the driver after the operation amount reaches the appropriate operation amount range is large compared to that before the operation amount reaches the appropriate operation amount range (the reaction force boosting the driver's operation becomes easy to decrease). Therefore, the driver can decrease the possibility of deviating beyond the appropriate operation amount range caused by further increase of the operation amount, and thus, it is possible to make the operation amount of the driver easy to stay in the appropriate operation amount range.

Figure 4:
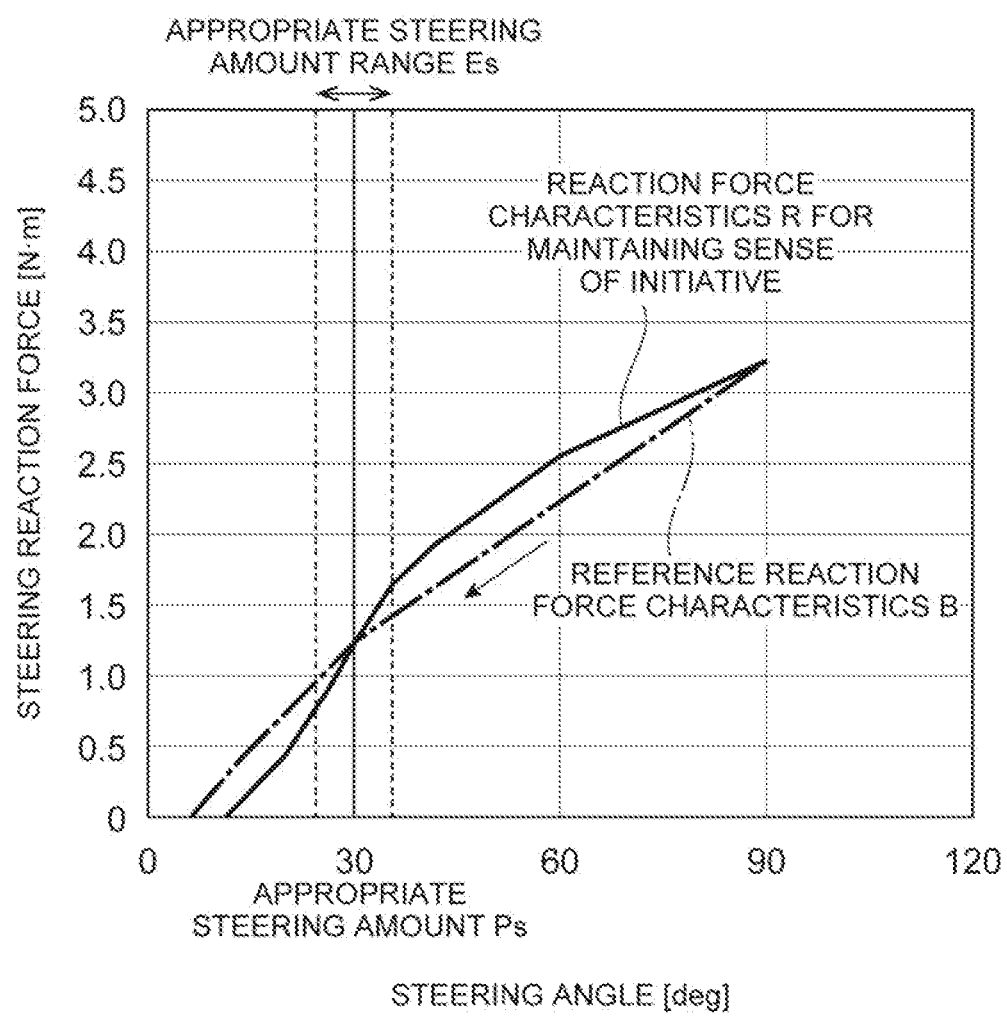
FIG. 4 is a graph illustrating reaction force characteristics when the steering section is rotated so as to return to the reference position.

Specifically, FIG. 4 is a graph illustrating the reaction force characteristics when the steering section ST is rotated so as to return to the reference position. The appropriate steering amount Ps and the appropriate steering amount range Es in FIG. 4 are the same as those in FIG. 3. In FIG. 4, as a precondition, the vehicle is assumed to be traveling on a curve, and the current steering angle of the steering section ST exceeds 35 degree. That is, the current steering angle is not included in the appropriate steering amount range Es, and it is necessary to decrease the steering angle so as to reach the appropriate steering amount Ps in order to reach the reference position.

In the situation illustrated in FIG. 4, since it is determined by the determination unit 18 that the steering angle (steering amount) by the driver corresponding to the prediction time point of the appropriate steering amount is not included in the appropriate steering amount range Es, and it is determined by the curve traveling recognition unit 14 that the vehicle is running on the curve, the reaction force characteristics change unit 19 changes the reaction force characteristics of the steering section ST from the reference reaction force characteristics B to the reaction force characteristics R for maintaining the sense of initiative.

The reaction force characteristics change unit 19 changes the reaction force characteristics to the reaction force characteristics R for maintaining the sense of initiative by performing the minute change such that the reaction force decrease amount with respect to the decrease of steering angle in the appropriate steering amount range Es is large than that in the reference reaction force characteristics B. In the reaction force characteristics R for maintaining the sense of initiative, the reaction force decrease amount with respect to the decrease of the operation amount in the appropriate steering amount range Es is large compared to the reaction force decrease amount (the reaction force decrease amount along the reference reaction force characteristics B) with respect to the decrease of the steering amount from the steering amount at the time of determination to time of reaching the appropriate steering amount range Es.

The reaction force decrease amount with respect to the decrease of the steering angle corresponds to the slope of the reference reaction force characteristics B and the reaction force characteristics R for maintaining the sense of initiative in FIG. 4. The reaction force characteristics change unit 19 performs the minute change on the reaction force characteristics of the steering section ST to be the reaction force characteristics R for maintaining the sense of initiative in which the slope in the appropriate steering amount range Es becomes approximately three times or twice as large as the reference reaction force characteristics B. In the minute change, any magnification between 1.1 times to 5 times may be adopted. The reaction force characteristics R for maintaining the sense of initiative is the reaction force same as the reference reaction force characteristics B in the appropriate steering amount Ps (30 degrees in this case).

Figure 5:
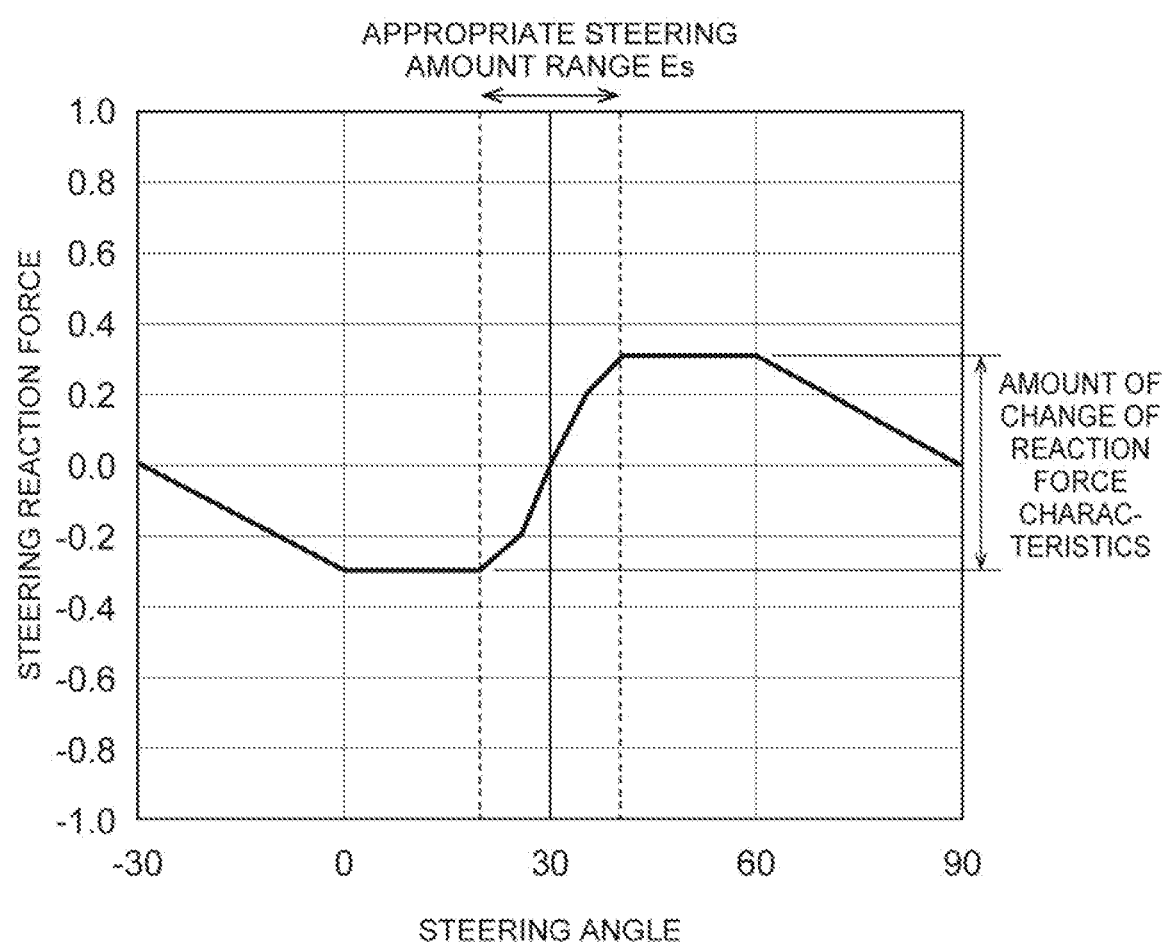
FIG. 5 is a graph for explaining the amount of change of reaction force characteristics from the reference reaction force characteristics to the reaction force characteristics for maintaining the sense of initiative.

FIG. 5 is a graph for explaining the amount of change of reaction force characteristics from the reference reaction force characteristics B to the reaction force characteristics R for maintaining the sense of initiative. In FIG. 5, the vertical axis represents the steering reaction force and the horizontal axis represents steering angle FIG. 5 illustrates the appropriate steering amount range Es and the amount of change of the reaction force characteristics.

The graph illustrated in in FIG. 5 corresponds to a force sensing interaction added to the reference reaction force characteristics B in order to perform the minute change on the reaction force characteristics R for maintaining the sense of initiative. The amount of change of the reaction force characteristics corresponds to the magnitude of the force sensing interaction. As illustrated in FIG. 5, the minute change is performed such that the slope of the appropriate steering amount range Es is large. For example, the minute change can be a change that is sufficiently small relative to basic reaction force characteristics (in comparing the maximum value, the change of equal to or smaller than ⅕ or the like), or a change of such an extent that the operation device T does not significantly move due to the change. The reaction force characteristics change unit 19 changes the reaction force characteristics to the reaction force characteristics R for maintaining the sense of initiative by adding the minute change illustrated in in FIG. 5 to the reference reaction force characteristics B according to the predicted appropriate steering amount Ps and the set appropriate steering amount range Es. The reaction force characteristics change unit 19 does not necessarily need to prepare and use the amount of change illustrated in FIG. 5 in advance.

As described above, the reaction force characteristics for maintaining the sense of initiative has been described with the case of steering section ST as an example, and the same can be applied to the case of accelerator operation device and the brake operation device.

Figure 6A:
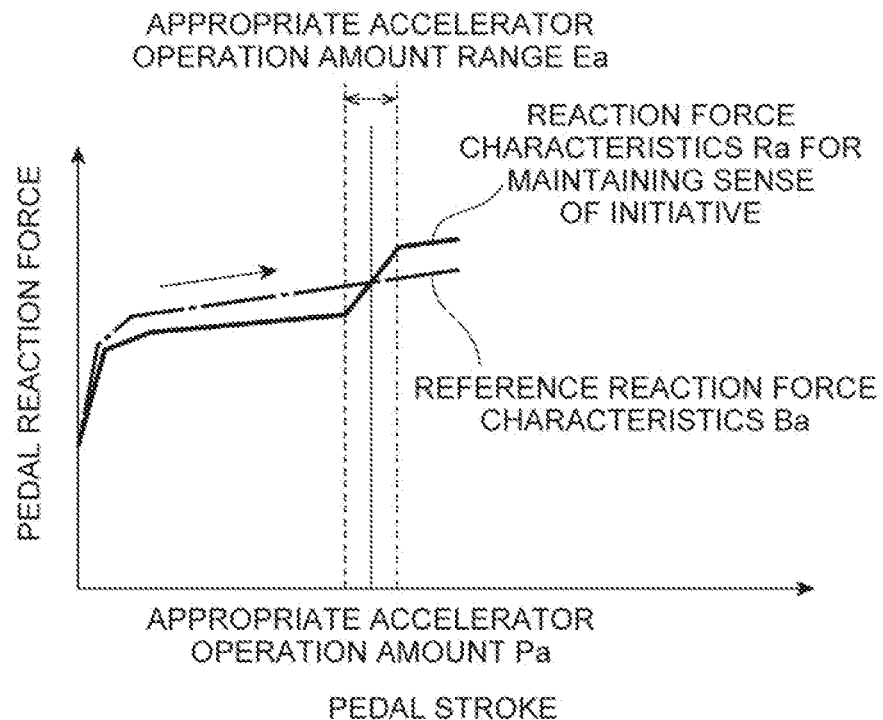
FIG. 6A is a graph illustrating reaction force characteristics when an accelerator pedal is pressed.

Here, FIG. 6A is a graph illustrating the reaction force characteristics when the accelerator pedal is pressed. The vertical axis in FIG. 6A represents the pedal reaction force, and the horizontal axis represents a pedal stroke (the amount of pressing of the pedal). The pedal reaction force of the accelerator pedal is the force that the accelerator pedal tries to return to the reference position (the initial position of the pedal). FIG. 6A illustrates an example of reaction force characteristics Ra for maintaining the sense of initiative and reference reaction force characteristics Ba in the accelerator pedal. In addition, FIG. 6A illustrates an appropriate accelerator operation amount Pa and an appropriate accelerator operation amount range Ea. In FIG. 6A, as a precondition, the current pedal stroke of the accelerator pedal is smaller than the appropriate accelerator operation amount Pa and is not included in the appropriate accelerator operation amount range Ea. The driver needs to press the accelerator pedal to make the operation amount reach the appropriate accelerator operation amount Pa.

In the situation illustrated in FIG. 6A, since it is determined by the determination unit 18 that the driver's pedal stroke corresponding to the appropriate accelerator operation amount Pa is not included in the appropriate accelerator operation amount range Ea, the reaction force characteristics change unit 19 changes the reaction force characteristics of the accelerator pedal from the reference reaction force characteristics Ba to the reaction force characteristics Ra for maintaining the sense of initiative.

The reaction force characteristics change unit 19 changes the reaction force characteristics to the reaction force characteristics Ra for maintaining the sense of initiative by performing the minute change such that the reaction force increase amount with respect to the increase of the pedal stroke of the accelerator pedal in the appropriate accelerator operation amount range Ea is large compared to that in the reference reaction force characteristics Ba. In the reaction force characteristics Ra for maintaining the sense of initiative, the reaction force increase amount with respect to the increase of the pedal stoke in the appropriate accelerator operation amount range Ea is large compared to the reaction force increase amount (the reaction force increase amount along the reference reaction force characteristics Ba) with respect to the increase of the pedal stoke from the accelerator operation amount at the time of determination that the pedal stroke of the accelerator pedal by the driver is not included in the appropriate accelerator operation amount range Ea to the time when the pedal stroke reaches the appropriate accelerator operation amount range Ea.

In the reaction force characteristics Ra for maintaining the sense of initiative, in order to increase the slope in the appropriate accelerator operation amount range Ea compared to that in the reference reaction force characteristics Ba, the slope becomes smaller in the range of the pedal stroke than the appropriate accelerator operation amount range Ea, but not becomes a negative slope. That is, in the reaction force characteristics Ra for maintaining the sense of initiative, the pedal reaction force does not decrease due to the increase of the pedal stroke.

Figure 6B:
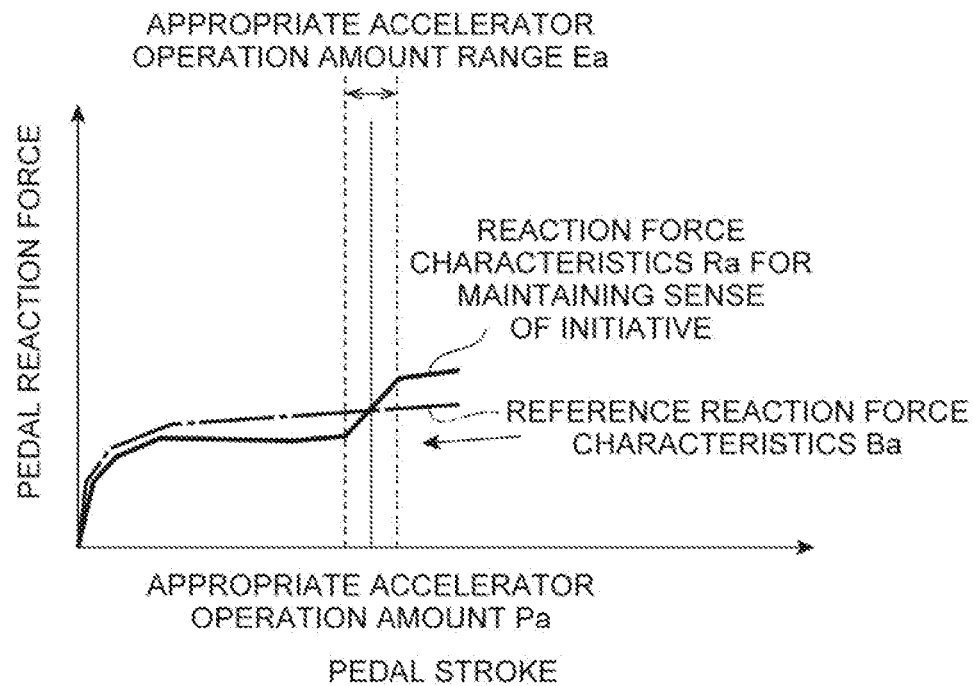
FIG. 6B is a graph illustrating reaction force characteristics when the accelerator pedal is released.

FIG. 6B is a graph illustrating the reaction force characteristics when the accelerator pedal is released. In FIG. 6B, as a precondition, the current pedal stroke of the accelerator pedal is equal to or larger than the appropriate accelerator operation amount Pa and exceeds the appropriate accelerator operation amount range Ea. The driver needs to release the accelerator pedal and return the accelerator pedal to reach the appropriate accelerator operation amount Pa by the reaction force.

In the situation illustrated in FIG. 6B also, since it is determined by the determination unit 18 that the driver's pedal stroke corresponding to the appropriate accelerator operation amount Pa is not included in the appropriate accelerator operation amount range Ea, the reaction force characteristics change unit 19 changes the reaction force characteristics of the accelerator pedal from the reference reaction force characteristics Ba to the reaction force characteristics Ra for maintaining the sense of initiative.

The reaction force characteristics change unit 19 changes the reaction force characteristics to the reaction force characteristics Ra for maintaining the sense of initiative by performing the minute change such that the reaction force decrease amount with respect to the decrease of the pedal stroke of the accelerator pedal in the appropriate accelerator operation amount range Ea is large compared to that in the reference reaction force characteristics Ba. In the reaction force characteristics Ra for maintaining the sense of initiative, the reaction force decrease amount with respect to the decrease of the pedal stoke in the appropriate accelerator operation amount range Ea is large compared to the reaction force decrease amount (the reaction force decrease amount along the reference reaction force characteristics Ba) with respect to the decrease of the pedal stoke from the accelerator operation amount at the time of determination to the appropriate accelerator operation amount range Ea. That is, when the pedal stroke enters the appropriate accelerator operation amount range Ea, the return of the accelerator pedal becomes slow.

The reaction force decrease amount with respect to the decrease of the pedal stroke corresponds to the slope of the reference reaction force characteristics Ba and the reaction force characteristics Ra for maintaining the sense of initiative in FIG. 6B. The reaction force characteristics change unit 19 performs the minute change on the reaction force characteristics of the accelerator pedal to be the reaction force characteristics Ra for maintaining the sense of initiative in which the slope in the appropriate accelerator operation amount range Ea becomes approximately three times or twice as large as the reference reaction force characteristics Ba. In the minute change, any magnification between 1.1 times to 5 times may be adopted. The reaction force characteristics Ra for maintaining the sense of initiative is the reaction force same as the reference reaction force characteristics Ba in the appropriate accelerator operation amount Pa.

Figure 7A:
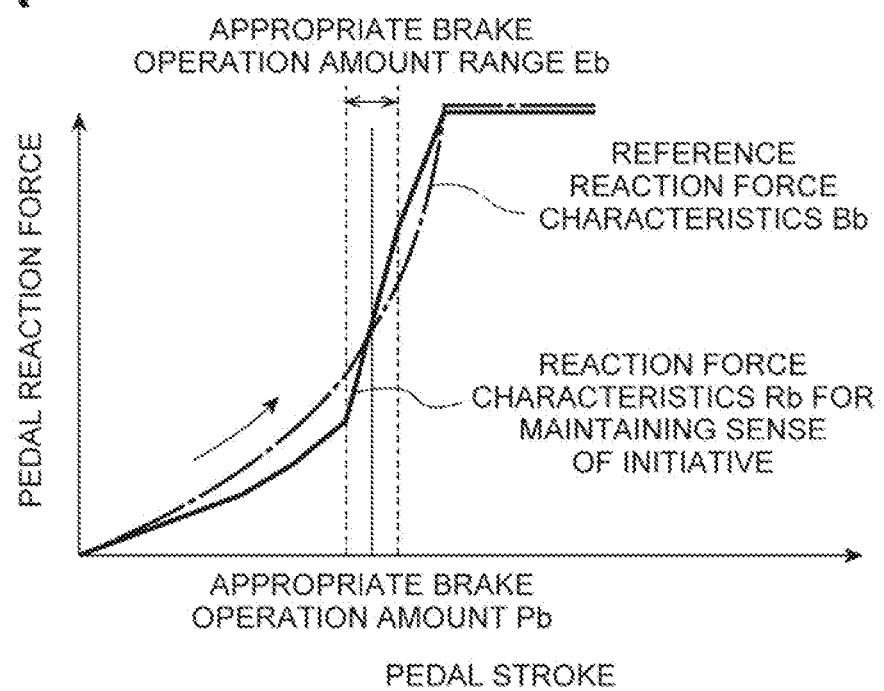
FIG. 7A is a graph illustrating reaction force characteristics when a brake pedal is pressed.

FIG. 7A is a graph illustrating the reaction force characteristics when the brake pedal is pressed. The vertical axis in FIG. 7A represents the pedal reaction force, and the horizontal axis represents a pedal stroke (the amount of pressing of the pedal). The pedal reaction force of the brake pedal is the force that the brake pedal tries to return to the reference position (the initial position of the pedal).

FIG. 7A illustrates an example of reaction force characteristics Rb for maintaining the sense of initiative and reference reaction force characteristics Bb in the brake pedal. In addition, FIG. 7A illustrates an appropriate brake operation amount Pb and an appropriate brake operation amount range Eb. In FIG. 7A, as a precondition, the current pedal stroke of the brake pedal is smaller than the appropriate brake operation amount Pb and is not included in the appropriate brake operation amount range Eb. The driver needs to press the brake pedal to make the operation amount reach the appropriate brake operation amount Pb.

In the situation illustrated in FIG. 7A, since it is determined by the determination unit 18 that the driver's pedal stroke corresponding to the appropriate brake operation amount Pb is not included in the appropriate brake operation amount range Eb, the reaction force characteristics change unit 19 changes the reaction force characteristics of the brake pedal from the reference reaction force characteristics Bb to the reaction force characteristics Rb for maintaining the sense of initiative.

The reaction force characteristics change unit 19 changes the reaction force characteristics to the reaction force characteristics Rb for maintaining the sense of initiative by performing the minute change such that the reaction force increase amount with respect to the increase of the pedal stroke of the brake pedal in the appropriate brake operation amount range Eb is large compared to that in the reference reaction force characteristics Bb. In the reaction force characteristics Rb for maintaining the sense of initiative, the reaction force increase amount with respect to the increase of the pedal stoke in the appropriate brake operation amount range Eb is large compared to the reaction force increase amount (the reaction force increase amount along the reference reaction force characteristics Bb) with respect to the increase of the pedal stoke from the brake operation amount at the time of determination that the pedal stroke of the brake pedal by the driver is not included in the appropriate brake operation amount range Eb to the time when the pedal stroke reaches the appropriate brake operation amount range Eb.

In the reaction force characteristics Rb for maintaining the sense of initiative, in order to increase the slope in the appropriate brake operation amount range Eb compared to that in the reference reaction force characteristics Bb, the slope becomes smaller in the range of the pedal stroke than the appropriate brake operation amount range Eb, but not becomes a negative slope.

Figure 7B:
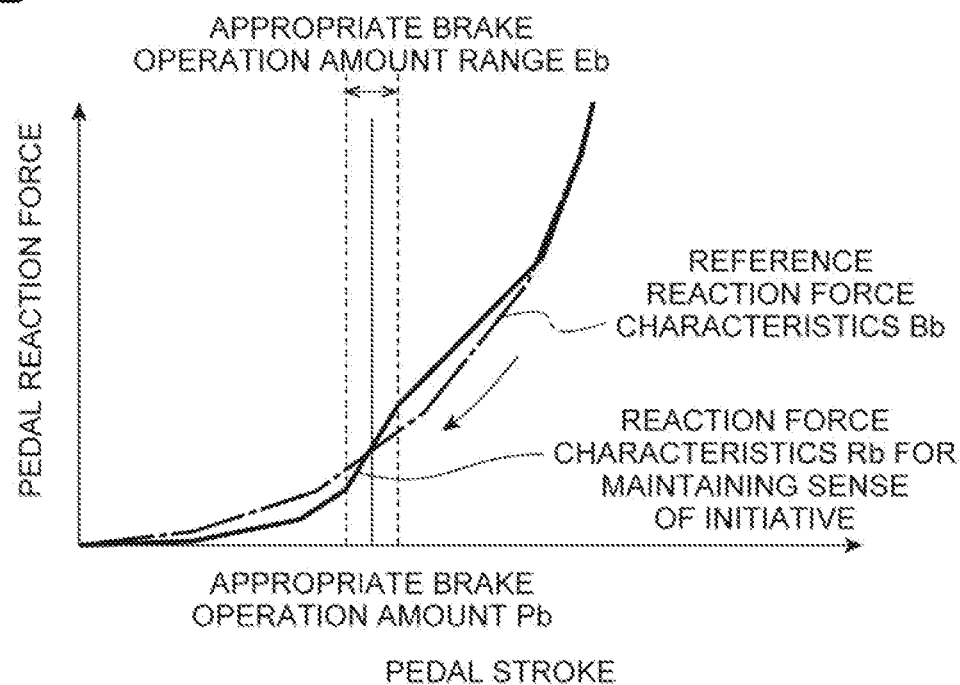
FIG. 7B is a graph illustrating reaction force characteristics when the brake pedal is released.

FIG. 7B is a graph illustrating the reaction force characteristics when the accelerator pedal is released. In FIG. 6B, as a precondition, the current pedal stroke of the brake pedal is equal to or larger than the appropriate brake operation amount Pb and exceeds the appropriate brake operation amount range Eb. The driver needs to release the brake pedal and return the brake pedal to reach the appropriate brake operation amount Pb by the reaction force.

In the situation illustrated in FIG. 7B also, since it is determined by the determination unit 18 that the driver's pedal stroke corresponding to the appropriate brake operation amount Pb is not included in the appropriate brake operation amount range Eb, the reaction force characteristics change unit 19 changes the reaction force characteristics of the brake pedal from the reference reaction force characteristics Bb to the reaction force characteristics Rb for maintaining the sense of initiative.

The reaction force characteristics change unit 19 changes the reaction force characteristics to the reaction force characteristics Rb for maintaining the sense of initiative by performing the minute change such that the reaction force decrease amount with respect to the decrease of the pedal stroke of the brake pedal in the appropriate brake operation amount range Eb is large compared to that in the reference reaction force characteristics Bb. In the reaction force characteristics Rb for maintaining the sense of initiative, the reaction force decrease amount with respect to the decrease of the pedal stoke in the appropriate brake operation amount range Eb is large compared to the reaction force decrease amount (the reaction force decrease amount along the reference reaction force characteristics Bb) with respect to the decrease of the pedal stoke from the brake operation amount at the time of determination to the appropriate brake operation amount range Eb. That is, when the pedal stroke enters the appropriate brake operation amount range Eb, the return of the accelerator pedal becomes slow.

The reaction force decrease amount with respect to the decrease of the pedal stroke corresponds to the slope of the reference reaction force characteristics Bb and the reaction force characteristics Rb for maintaining the sense of initiative in FIG. 7B. The reaction force characteristics change unit 19 performs the minute change on the reaction force characteristics of the brake pedal to be the reaction force characteristics Rb for maintaining the sense of initiative in which the slope in the appropriate brake operation amount range Eb becomes approximately three times or twice as large as the reference reaction force characteristics Bb. In the minute change, any magnification between 1.1 times to 5 times may be adopted. The reaction force characteristics Rb for maintaining the sense of initiative is the reaction force same as the reference reaction force characteristics Bb in the appropriate brake operation amount Pb.

The reaction force control unit 20 controls the reaction force of the operation device T based on the operation amount of the driver recognized by the operation amount recognition unit 15 and the reaction force characteristics of the operation device T. The reaction force control unit 20 transmits a reaction force command value that is from the operation amount of the driver and is according to the reaction force characteristics of the operation device T to the PID controller 7. The reaction force control unit 20 controls the reaction force of the operation device T by transmitting the command value corresponding to the PID control from the PID controller 7 to the reaction force actuator 8.

If the reference reaction force characteristics is set as the reaction force characteristics of the operation device T, the reaction force control unit 20 controls the reaction force of the operation device T by transmitting the reaction force command value that is from the operation amount of the driver and is corresponding to the reference reaction force characteristics to the PID controller 7. In addition, if the reaction force characteristics for maintaining the sense of initiative is set as the reaction force characteristics of the operation device T, the reaction force control unit 20 controls the reaction force of the operation device T by transmitting the reaction force command value that is from the operation amount of the driver and is according to the reaction force characteristics to the PID controller 7.

Specifically, if the reaction force characteristics R for maintaining the sense of initiative illustrated in FIG. 3 is set as the reaction force characteristics of the steering section ST, the reaction force control unit 20 transmits the reaction force command value corresponding to the reaction force characteristics R for maintaining the sense of initiative from the steering amount of the driver to the PID controller 7, and controls the reaction force of the steering section ST by giving a reaction force giving torque from the steering reaction force actuator to the steering section ST. The reaction force giving torque is a support torque for giving a reaction force according to the reaction force characteristics set by the reaction force characteristics change unit 19 to the steering section ST in the normal driving assistance mode.

FIG. 8 is diagrams for explaining a functional outline of the driving assistance system 100. In FIG. 8, a case of the steering section ST will be described as an example.

(A) of FIG. 8 illustrates a prediction of the driver's appropriate steering amount. As illustrated in (A) of FIG. 8, the appropriate operation amount prediction unit 16 predicts the appropriate operation amount using the driving behavior model from the operation history of the driver, the external environment, the vehicle state, and the like.

(B) of FIG. 8 is a diagram illustrating the driver's appropriate steering amount. As illustrated in (B) of FIG. 8, the appropriate steering amount (dashed line) at the prediction time point is predicted from the current steering amount of the driver (solid line).

(C) of FIG. 8 is a diagram illustrating the steering amount of the driver (input) at the prediction time point. The steering amount of the driver may be a steering angle or may be input as a steering torque.

(D) of FIG. 8 is a diagram illustrating the reaction force characteristics for maintaining the sense of initiative set by the virtual model. Here, it is assumed that the reaction force characteristics of the steering section ST has already been changed to the reaction force characteristics for maintaining the sense of initiative. The reaction force control unit 20 transmits the reaction force command value that is from the operation amount of the driver illustrated in (C) of FIG. 8 and that is according to the reaction force characteristics for maintaining the sense of initiative illustrated in (D) of FIG. 8 to the PID controller 7. The PID controller 7 transmits a command value corresponding to the PID control to the reaction force actuator 8 (steering reaction force actuator).

(E) of FIG. 8 is a diagram illustrating a state in which the reaction force is given to the steering section ST and cooperates with the driver. As illustrated in (E) of FIG. 8, the reaction force control unit 20 controls the reaction force of the steering section ST by controlling the reaction force actuator 8 via the PID controller 7. The reaction force control unit 20 performs the reaction force control in cooperation with the driver by performing the control of the reaction force actuator 8 according to the reaction force characteristics for maintaining the sense of initiative in combination with the steering amount of the driver. The driver makes the steering amount easy to stay in the appropriate steering amount range Es by receiving the reaction force according to the reaction force characteristics for maintaining the sense of initiative. The driver can continuously maintain the sense of initiative for the driving operation almost without change in force sensing owing to the reaction force control by the driving assistance system 100.

The explicit risk determination unit 21 determines whether an explicit risk is present or not based on the external environment of the vehicle recognized by the external environment recognition unit 12. The explicit risk is a risk caused by an object that can be detected by the external sensor 2 of the vehicle. The objects that are subject to the explicit risk can include other vehicles that are traveling, stopped vehicles, falling objects, structures, bicycles, pedestrians, and the like. Other vehicles include not only four-wheel vehicles but also two-wheel vehicles and personal mobilities. The structures include construction facilities, road signs, utility poles, and the like.

The explicit risk determination unit 21 calculates, for example, a time to collision (TTC) between the vehicle and the object around the vehicle based on the external environment of the vehicle. The time to collision is obtained by dividing the distance between the vehicle and the object by a relative approaching speed between the vehicle and the object. If an object of which the time to collision with the vehicle is shorter than an explicit risk determination threshold value is present, the explicit risk determination unit 21 determines that explicit risk is present. If an object of which the time to collision with the vehicle is shorter than an explicit risk determination threshold value is not present, the explicit risk determination unit 21 determines that explicit risk is not present. The explicit risk determination threshold value is a threshold value set in advance.

Instead of the time to collision, the explicit risk determination unit 21 may use an inter-vehicle time (time headway (THW)) obtained by dividing the distance between the vehicle and the object by the approaching speed of the vehicle, or may use the distance between the vehicle and the object. In addition, the explicit risk determination unit 21 may limit the object subject to the explicit risk to an object in the traveling lane where the vehicle travels, or to an object on a route of the vehicle. The route of the vehicle may be predicted from the current vehicle state (such as the yaw rate) or may be predicted using the shape of the road in the map information. The explicit risk determination unit 21 may determine the presence of the explicit risk only when the driving assistance for the vehicle is in the normal driving assistance mode.

The driver recognition estimation unit 22 estimates whether or not the driver recognizes the explicit risk if it is determined by the explicit risk determination unit 21 that the explicit risk is present. The estimation of the driver's recognition of the explicit risk means the estimation of whether or not the driver knows the explicit risk from visual information on the site. The driver recognition estimation unit 22 estimates whether or not the driver recognizes the explicit risk based on a predicted steering amount when the driver does not recognize the explicit risk or a predicted steering amount when the driver recognizes the explicit risk, and the steering amount of the driver.

The driver recognition estimation unit 22 estimates the predicted steering amount of the driver when the explicit risk is not recognized based on, for example, the external environment of the vehicle, the vehicle state of the vehicle, and the operation history of the driver. The driver recognition estimation unit 22 estimates the predicted steering amount as such an amount that the vehicle travels along the traveling road assuming that an object subject to the explicit risk is not present. The driver recognition estimation unit 22 estimates the predicted steering amount of the driver up to a predetermined time ahead.

The driver recognition estimation unit 22 sets an allowable range of the predicted steering amount. For example, as the allowable range, the driver recognition estimation unit 22 sets the allowable range as a range of the steering amount set in advance having the predicted steering amount as a median value. The range of the steering amount set in advance is, for example, a range of equal to or larger than +5 deg or and equal to or less than −5 deg.

The driver recognition estimation unit 22 estimates whether or not the recognized steering amount of the driver recognized by the operation amount recognition unit 15 is within the allowable range of the predicted steering amount. If the steering amount of the driver is within the allowable range of the predicted steering amount, the driver recognition estimation unit 22 estimates that the driver does not recognize the explicit risk. If the steering amount of the driver is not within the allowable range of the predicted steering amount, the driver recognition estimation unit 22 estimates that the driver recognizes the explicit risk.

Figure 9A:
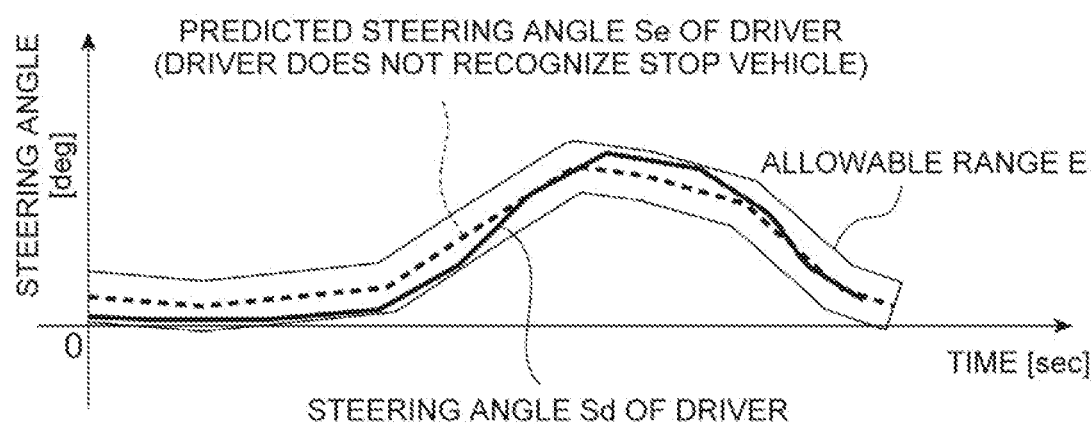
FIG. 9A is a graph for explaining a change of the steering angle when the driver does not recognize an explicit risk.

Here, FIG. 9A is a graph for explaining the "change of the steering angle" when the driver does not recognize the explicit risk. The vertical axis of the graph in FIG. 9A represents the steering angle, and the horizontal axis represents the time. A predicted steering angle Se of the driver, an allowable range E, and a steering angle Sd of the driver are illustrated in FIG. 9A. As illustrated in FIG. 9A, if the driver does not recognizes the explicit risk, it is considered that the steering angle Sd of the driver is included in the allowable range E of the predicted steering angle Se when the explicit risk is not recognized.

Figure 9B:
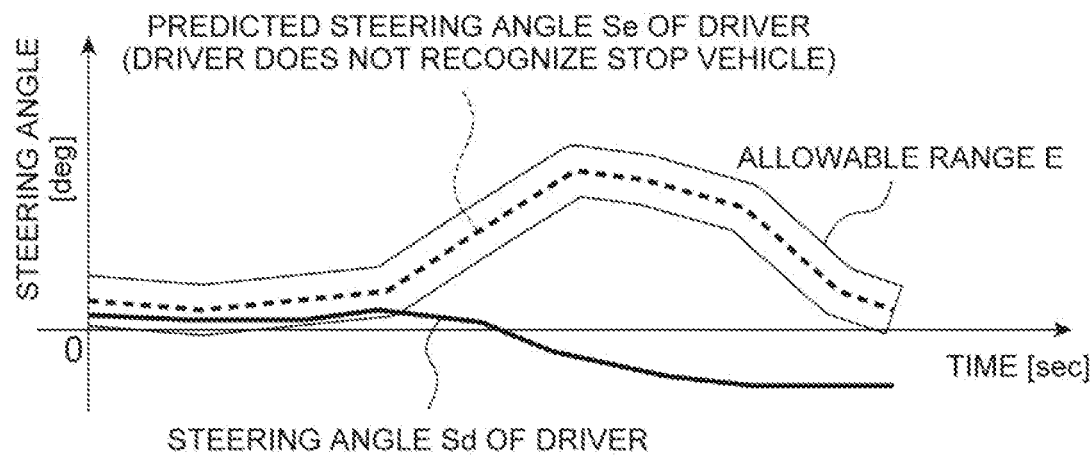
FIG. 9B is a graph for explaining a change of the steering angle when the driver recognizes the explicit risk.

FIG. 9B is a graph for explaining the "change of the steering angle" when the driver recognizes the explicit risk. As illustrated in FIG. 9B, when the driver recognizes the explicit risk, since the driver performs steering so as to avoid the explicit risk, it is considered that the steering is performed such that the steering angle Sd of the driver becomes the steering angle outside the allowable range E of the predicted steering angle Se. The driver recognition estimation unit 22 may estimate that the driver recognizes the explicit risk only when a state in which the steering amount of the driver is outside the allowable range of the predicted steering amount is continued for more than a certain period.

The driver recognition estimation unit 22 may estimate the predicted steering amount of the driver when the explicit risk is recognized instead of the predicted steering amount of the driver when the explicit risk is not recognized. In this case also, the driver recognition estimation unit 22 can estimate the predicted steering amount of the driver when the explicit risk is recognized, based on the external environment of the vehicle, the vehicle state of the vehicle, and the steering history of the driver. The driver recognition estimation unit 22 estimates the predicted steering amount such that the vehicle travels on the traveling road while avoiding the explicit risk. The driver recognition estimation unit 22 sets the allowable range of the predicted steering amount when the explicit risk is recognized similarly to the predicted steering amount when the explicit risk is not recognized.

If the steering amount of the driver is outside the allowable range of the predicted steering amount when the explicit risk is recognized, the driver recognition estimation unit 22 estimates that the driver does not recognize the explicit risk. If the steering amount of the driver is within the allowable range of the predicted steering amount when the explicit risk is recognized, the driver recognition estimation unit 22 estimates that the driver recognizes the explicit risk. The driver recognition estimation unit 22 may estimate that the driver recognizes the explicit risk only when a state in which the steering amount of the driver is outside the allowable range of the predicted steering amount when the explicit risk is recognized is continued for more than a certain period. A certain time is not particularly limited, and may be 5 seconds, 3 seconds, or 1 second.

In addition, the driver recognition estimation unit 22 may estimate whether or not the driver recognizes the explicit risk using not only the steering amount but also at least one of the accelerator operation amount of the and the brake operation amount of the driver. In addition, in the estimation of the predicted steering amount, the driver recognition estimation unit 22 may use a driving tendency of the driver (driver characteristics). In this case, there is no need to use the operation history of the driver. The driver recognition estimation unit 22 does not necessarily need to use the operation history or the driving tendency of the driver in the estimation of the predicted steering amount.

The allowable range does not necessarily need to be a range with a predicted steering amount as a median value. If the upper or lower limit of the allowable range is the steering amount that makes the vehicle deviate from the traveling road, the upper or lower limit may be restricted so that the vehicle does not deviate from the traveling road. The driver recognition estimation unit 22 may change the upper and lower limits of the range according to the vehicle speed of the vehicle. The driver recognition estimation unit 22 sets the allowable range in which the difference between the upper limit and the lower limit is narrower as the vehicle speed of the vehicle increases, for example.

The driving skill information acquisition unit 23 acquires information on the driving skill of the driver. If it is estimated by the driver recognition estimation unit 22 that the driver does not recognize the explicit risk, the driving skill information acquisition unit 23 acquires the information on the driving skill of the driver. The information on the driving skill includes, for example, information that can determine whether the driver is an unskilled driver or a skilled driver. The information on the driving skill may include information that allows the driver to be determined as an intermediate driver between the unskilled driver and the skilled driver. The information on the driving skill may be information that expresses the driving skill by a number such as the skill level.

The driving skill information acquisition unit 23 acquires the information on the driving skill by evaluating the driving skill of the driver based on, for example, the operation history of the driver and the external environment of the vehicle. The driving skill information acquisition unit 23 calculates a standard steering amount as an evaluation standard from the shape of the road on which the vehicle travels, and then, can evaluate the driving skill using a difference between the steering amount of the driver and the standard steering amount.

If an average value of the difference between the steering amount of the driver and the standard steering amount for a certain period in the past or in a predetermined section is equal to or greater than an unskilled driver threshold value, the driving skill information acquisition unit 23 evaluates the driving skill of the driver as an unskilled driver. If the average value of the difference between the steering amount of the driver and the standard steering amount is less than a skilled driver threshold value, the driving skill information acquisition unit 23 evaluates the driving skill of the driver as a skilled driver. The skilled driver threshold value is a threshold value having a value smaller than the unskilled driver threshold value. If the average value of the difference between the steering amount of the driver and the standard steering amount is greater than the skilled driver threshold value and less than the unskilled driver threshold value, the driving skill information acquisition unit 23 evaluates the driving skill of the driver as intermediate. The driving skill information acquisition unit 23 may evaluate the driving skill from a smoothness of the operation by the driver based on only the operation history of the driver.

In addition, the driving skill information acquisition unit 23 may acquire the information on the driving skill of the driver, for example, from the personal data of the driver registered in advance in the vehicle, or may acquire the information on the driving skill through a wireless communication from the server in which the driver information is stored.

The switching timing setting unit 24 sets a switching timing if it is estimated by the driver recognition estimation unit 22 that the driver does not recognize the explicit risk. The switching timing is a timing for switching the driving assistance for the vehicle from the normal driving assistance mode to the risk avoidance assistance mode. The switching timing is set such that the explicit risk can be appropriately avoided after switching to the risk avoidance assistance mode.

The switching timing is defined using, for example, the time to collision between the object that is subject to the explicit risk and the vehicle. The switching timing may be defined using the inter-vehicle time between the vehicle and the object, or may be defined using the distance between the vehicle and the object. The switching timing may be defined using time or a traveling distance of the vehicle.

The switching timing setting unit 24 sets the switching timing based on the information on the driving skill acquired by the driving skill information acquisition unit 23. For example, if the driver is an unskilled driver, the switching timing setting unit 24 sets the switching timing for the unskilled driver such that the timing is earlier than that when the driver is an intermediate driver. If the driver is an intermediate driver, the switching timing setting unit 24 sets the switching timing for the unskilled driver such that the timing is earlier than that when the driver is a skilled driver. In other words, if the driver is a skilled driver, the switching timing setting unit 24 sets the switching timing for the skilled driver such that the timing is later than that when the driver is an intermediate driver.

If the information on the driving skill is expressed as a skill level, the switching timing setting unit 24 may set the switching timing such that the timing becomes later as the skill level is higher. The estimation by the driver recognition estimation unit 22 for the driver's recognition of the explicit risk is not absolute, but it is considered that the closer the object is, the more likely the driver is aware of the explicit risk. In addition, since it is considered that the higher the driving skill is, the more likely the driver is aware of the explicit risk, and thus, the quicker the driver can cope with the explicit risk, the switching timing can be later in accordance with the level of the driving skill.

In the normal driving assistance mode, if it is determined by the explicit risk determination unit 21 that explicit risk is present, the driving assistance switching unit 25 switches the driving assistance for the vehicle from the driver-initiative normal driving assistance mode to the system-initiative risk avoidance assistance mode.

In the risk avoidance assistance mode, a steering intervention by the system is performed. In the risk avoidance assistance mode, for example, a target steering amount (for example, a target steering angle) to avoid the explicit risk is calculated, the steering section ST of the vehicle M is controlled to approach the target steering amount by an assistance torque (a risk avoidance assistance torque) in the risk avoidance assistance mode. The calculation of the target steering amount will be described later. In the risk avoidance assistance mode, an operation intervention is also performed on the vehicle speed. In the risk avoidance assistance mode, a cooperative control in which the risk avoidance assistance torque is given to the steering section ST of the vehicle may be performed such that the steering amount approaches the target steering amount together with the steering amount of the driver.

If it is determined by the explicit risk determination unit 21 that the explicit risk is present, and if it is determined by the driver recognition estimation unit 22 that the driver recognizes the explicit risk, since the driver unlikely to be embarrassed by the mode switching, the driving assistance switching unit 25 switches the driving assistance for the vehicle from the driver-initiative normal driving assistance mode to the system-initiative risk avoidance assistance mode.

If it is determined by the explicit risk determination unit 21 that the explicit risk is present, and if it is determined by the driver recognition estimation unit 22 that the driver does not recognize the explicit risk, the driving assistance switching unit 25 determines whether or not the vehicle is in the switching timing. The driving assistance switching unit 25 determines whether or not the vehicle is in the switching timing, based on, for example, the time to collision between the vehicle and the object subject to the explicit risk.

If it is estimated by the driver recognition estimation unit 22 that the driver recognizes the explicit risk before the vehicle is in the switching timing, The driving assistance switching unit 25 switches the driving assistance for the vehicle from the normal driving assistance mode to the risk avoidance assistance mode.

If it is determined that the vehicle is in the switching timing while it is not determined that the driver recognizes the explicit risk, the driving assistance switching unit 25 switches the driving assistance for the vehicle from the normal driving assistance mode to the risk avoidance assistance mode. In this way, even if the driver does not recognize the explicit risk, the driving assistance switching unit 25 can perform the driving assistance by the system-initiative risk avoidance assistance mode to avoid the explicit risk.

Figure 10:
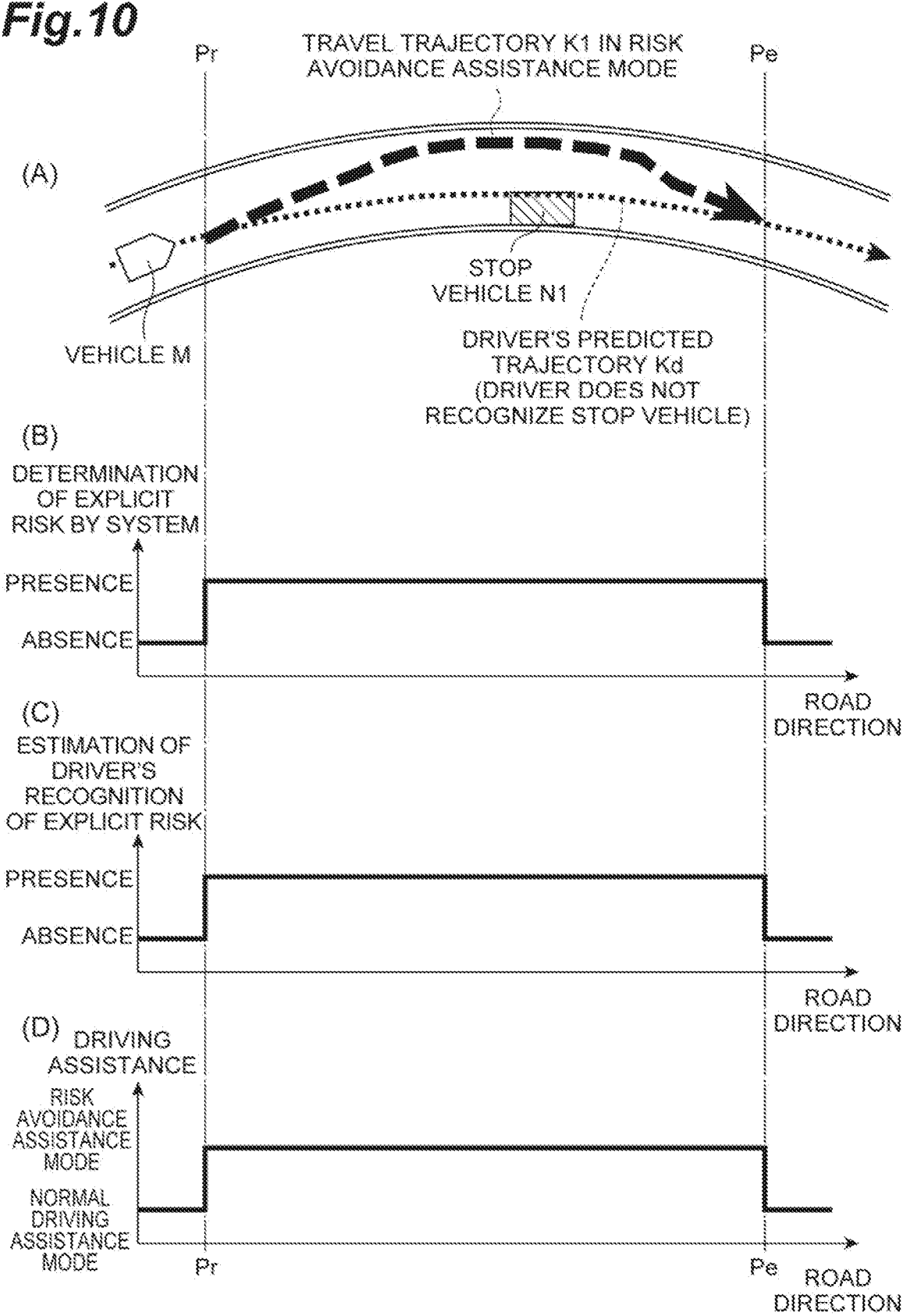
FIG. 10 is a plan view for explaining an example of a mode switching situation.

FIG. 10 is a plan view for explaining an example of a mode switching situation. A vehicle M, a stop vehicle N1, a driver's predicted trajectory Kd, a travel trajectory K1 in the risk avoidance mode are illustrated in (A) of FIG. 10. In addition, a risk recognition start position Pr and a risk recognition end position Pe are illustrated in (A) of FIG. 10. The risk recognition start position Pr is a position of the vehicle M if it is determined by the explicit risk determination unit 21 that an explicit risk (stop vehicle N1) is present. The risk recognition end position Pe is a position of the vehicle M when the risk avoidance assistance mode ends.

The stop vehicle N1 is an object that is subject to the explicit risk detected by the external sensor 2. The driver's predicted trajectory Kd is a driver's predicted trajectory when the driver does not recognize the stop vehicle N1. The driver's predicted trajectory Kd is a trajectory corresponding to a predicted steering amount of the driver when the explicit risk is not recognized in the driver recognition estimation unit 22.

(B) of FIG. 10 is a graph illustrating a result of determination of the explicit risk by the system in the situation illustrated in (A) of FIG. 10. In (B) of FIG. 10, the vertical axis represents result of determination of the explicit risk by the system, and the horizontal axis represents the road direction. As illustrated in (B) of FIG. 10, the explicit risk determination unit 21 determines that the explicit risk is present at the timing when the vehicle M reaches the risk recognition start position Pr based on the external environment of the vehicle M.

In addition, the explicit risk determination unit 21 determines that the explicit risk is not present at the timing when the vehicle M reaches the risk recognition end position Pe. With regard to the explicit risk that has been once determined to be present, the explicit risk determination unit 21 may determine that the explicit risk is not present when a risk avoidance assistance mode end condition set in advance is satisfied. The predetermined risk avoidance assistance mode end condition can be a state in which, for example, the distance between the vehicle M and the object subject to the explicit risk equal to or longer than a certain distance.

(C) of FIG. 10 is a graph illustrating a result of estimation of the driver's recognition of the explicit risk in the situation illustrated in (A) of FIG. 10. In (C) of FIG. 10, the vertical axis represents the result of estimation of the driver's recognition of the explicit risk, and the horizontal axis represents the road direction. As illustrated in (C) of FIG. 10, the driver recognition estimation unit 22 determines that the driver recognizes the explicit risk at the timing when the vehicle M reaches the risk recognition start position Pr. That is, in the situation illustrated in (C) of FIG. 10, the driver recognizes the explicit risk (stop vehicle N1) almost simultaneously with the driving assistance system 100.

(D) of FIG. 10 is a graph illustrating the result of mode switching in the situation illustrated in (A) of FIG. 10. In (D) of FIG. 10, the vertical axis represents the result of mode switching, and the horizontal axis represents road direction. As illustrated in (D) of FIG. 10, the driving assistance switching unit 25 switches the driving assistance for the vehicle M from the normal driving assistance mode to the risk avoidance assistance mode at the timing when the vehicle M reaches the risk recognition start position Pr. That is, the driving assistance switching unit 25 performs the mode switching at the timing if it is determined by the explicit risk determination unit 21 that the explicit risk is present and if it is determined by the driver recognition estimation unit 22 that the driver recognizes the explicit risk. Thereafter, since the risk avoidance assistance mode end condition is satisfied at the timing when the vehicle M reaches the risk recognition end position Pe, the driving assistance switching unit 25 restores the driving assistance for the vehicle M from the risk avoidance assistance mode to the normal driving assistance mode.

Figure 11:
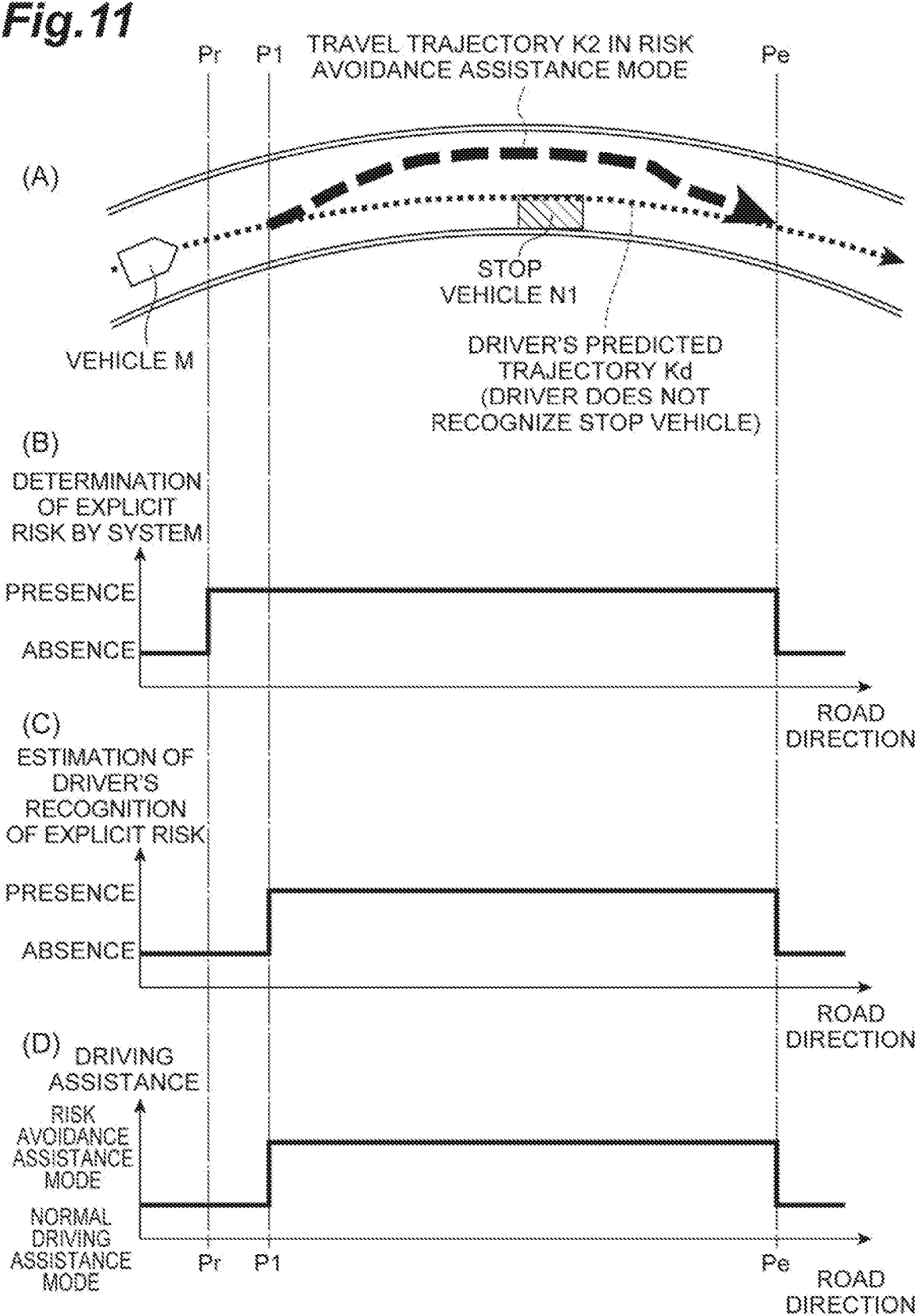
FIG. 11 is a plan view for explaining an example when the driver's recognition of the explicit risk is delayed.

The case where the driver's recognition of the explicit risk is delayed will be described using FIG. 11. (A) of FIG. 11 is a plan view for explaining an example when the driver's recognition of the explicit risk is delayed. A travel trajectory K2 in risk avoidance mode is illustrated in (A) of FIG. 11. (B) of FIG. 11 is a graph illustrating the result of determination of the explicit risk by the system in the situation illustrated in (A) of FIG. 11. (C) of FIG. 11 is a graph illustrating the result of estimation of the driver's recognition of the explicit risk in the situation illustrated in (A) of FIG. 11.

(D) of FIG. 11 is a graph illustrating the result of mode switching in the situation illustrated in (A) of FIG. 11.

In (A) of FIG. 11, the switching to the risk avoidance assistance mode is delayed because the driver's recognition of the explicit risk is delayed compared to that in (A) of FIG. 11. In (A) of FIG. 11, a position of the vehicle M if it is estimated that the driver recognizes the explicit risk is illustrated as P1.

As illustrated in (C) of FIG. 11, the driver recognition estimation unit 22 estimates that the driver does not recognize the explicit risk at the timing when the vehicle M reaches the risk recognition start position Pr, and estimates that the driver recognizes the explicit risk at the timing when the vehicle M reaches the position P1. In this case, as illustrated in (D) of FIG. 11, the driving assistance switching unit 25 switches the driving assistance for the vehicle M from the normal driving assistance mode to the risk avoidance assistance mode at the timing when the vehicle M reaches the position P1.

Figure 12:
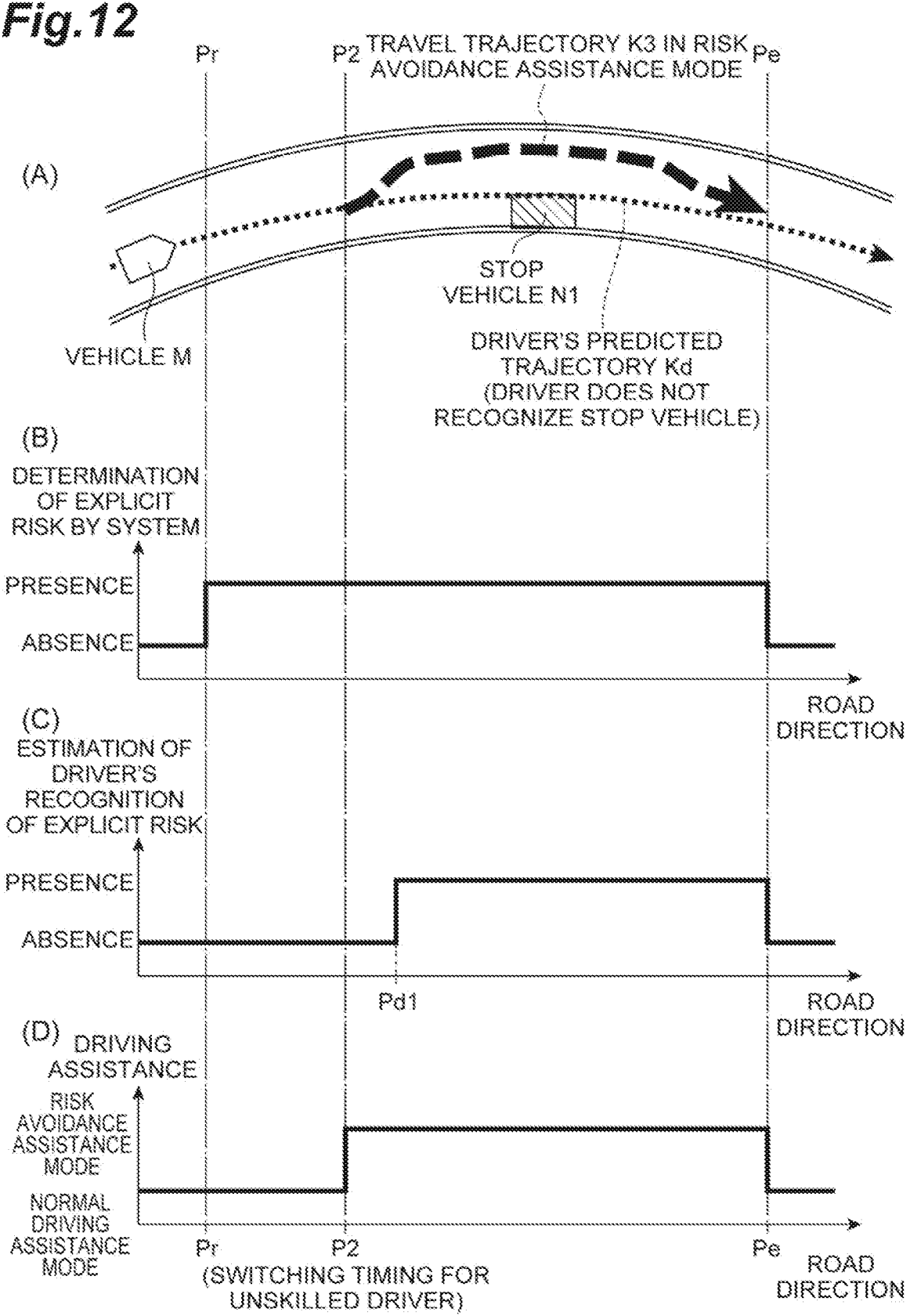
FIG. 12 is a plan view for explaining an example of a case where an unskilled driver can not recognize the explicit risk up to the switching timing.

The case where the unskilled driver cannot recognize the explicit risk up to the switching timing will be described using FIG. 12. (A) of FIG. 12 is a plan view for explaining an example of a case where the unskilled driver can not recognize the explicit risk up to the switching timing. A travel trajectory K3 in the risk avoidance mode is illustrated in (A) of FIG. 12. (B) of FIG. 12 is a graph illustrating the result of determination of the explicit risk by the system in the situation illustrated in (A) of FIG. 12. (C) of FIG. 12 is a graph illustrating the result of estimation of the driver's recognition of the explicit risk in the situation illustrated in (A) of FIG. 12. (D) of FIG. 12 is a graph illustrating the result of mode switching in the situation illustrated in (A) of FIG. 12.

In (A) of FIG. 12, since the driver's recognition of the explicit risk is delayed compared to that in (A) of FIG. 11 and the vehicle M is in the switching timing, the switching to the risk avoidance assistance mode is performed without the explicit risk being recognized by the driver. In (A) of FIG. 12, a position of the vehicle M when the vehicle M is in the switching timing is illustrated as P2.

As illustrated in (C) of FIG. 12, the driver recognition estimation unit 22 determines that the driver does not recognize the explicit risk at the timing when the vehicle M reaches the risk recognition start position Pr. Therefore, the switching timing setting unit 24 sets the switching timing based on the information on the driving skill of the driver acquired by the driving skill information acquisition unit 23. The switching timing setting unit 24 sets the switching timing for the unskilled driver because the driver's driving skill is unskilled.

As illustrated in (D) of FIG. 12, the driving assistance switching unit 25 determines that the vehicle M is in a switching timing for the unskilled driver at the timing when the vehicle M reaches the position P2, and then, switches the driving assistance for the vehicle M from the normal driving assistance mode to the risk avoidance assistance mode. As illustrated in (C) of FIG. 12, the driver recognizes the explicit risk at the timing when the vehicle M reaches the position Pd1 after receiving the switching to the risk avoidance assistance mode. After performing the switching to the risk avoidance assistance mode, the driver recognition estimation unit 22 does not need to estimate the driver's recognition of the explicit risk.

Figure 13:
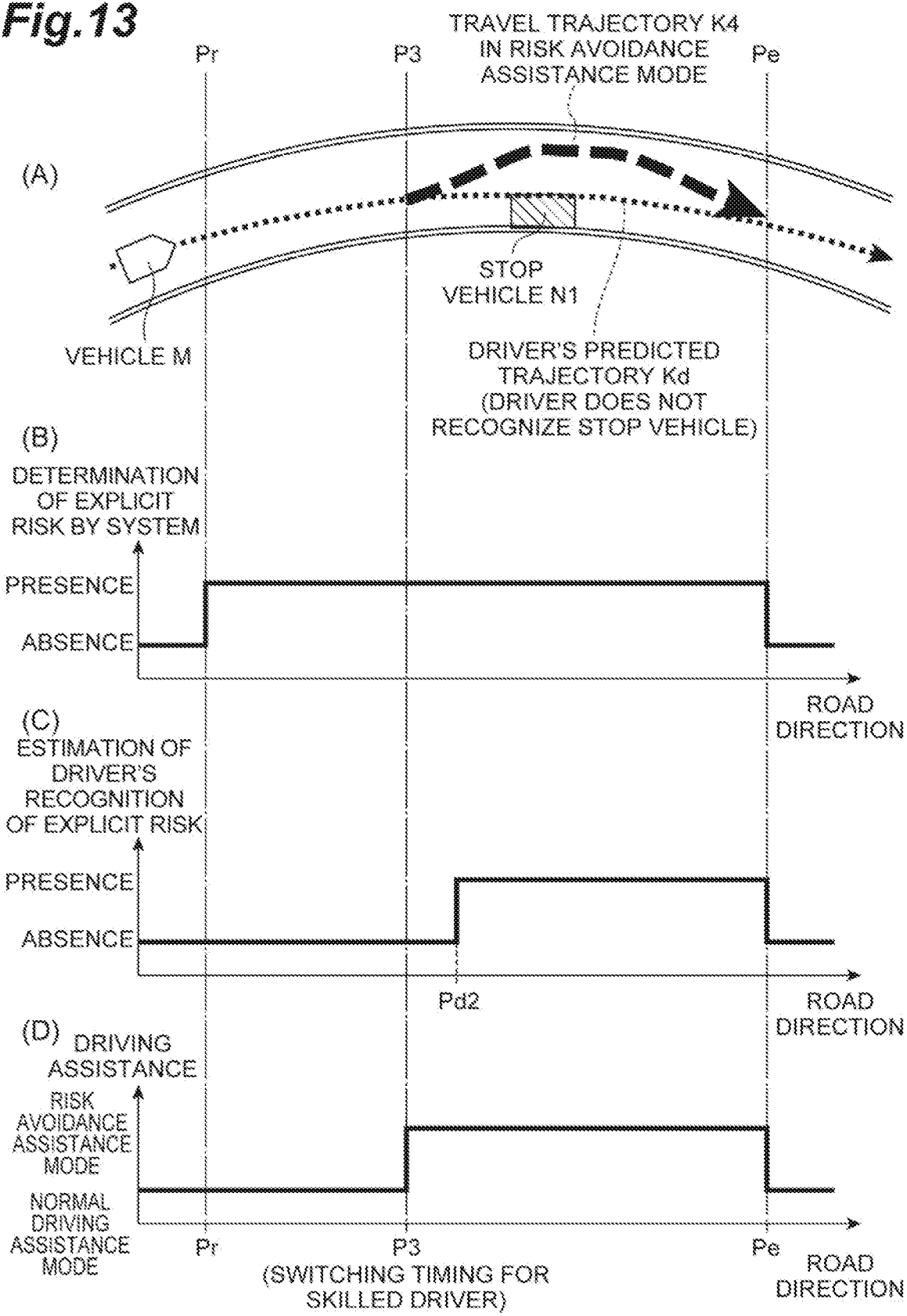
FIG. 13 is a plan view for explaining an example of a case where a skilled driver can not recognize the explicit risk up to the switching timing.

(A) of FIG. 13 is a plan view for explaining an example of a case where a skilled driver cannot recognize the explicit risk up to the switching timing. A travel trajectory K4 in the risk avoidance mode is illustrated in (A) of FIG. 13. The case where the skilled driver cannot recognize the explicit risk up to the switching timing will be described using FIG. 13. (B) of FIG. 13 is a graph illustrating a result of determination of the explicit risk by the system in the situation illustrated in (A) of FIG. 13. (C) of FIG. 13 is a graph illustrating a result of estimation of the driver's recognition of the explicit risk in the situation illustrated in (A) of FIG. 13. (D) of FIG. 13 is a graph illustrating a result of mode switching in the situation illustrated in (A) of FIG. 13.

In (A) of FIG. 13, since the driver is a skilled driver, a switching timing for the skilled driver that is later than the switching timing for the unskilled driver in (A) of FIG. 12 is set. In (A) of FIG. 13, a position of vehicle M when the vehicle M is in the switching timing is illustrated as P3.

As illustrated in (C) of FIG. 13, the driver recognition estimation unit 22 estimates that the driver does not recognize the explicit risk at the timing when the vehicle M reaches the risk recognition start position Pr. Therefore, the switching timing setting unit 24 sets a switching timing based on the information on the driving skill of the driver acquired by the driving skill information acquisition unit 23. The switching timing setting unit 24 sets the switching timing for the skilled driver because the driving skill of the driver is skilled.

As illustrated in (D) of FIG. 13, the driving assistance switching unit 25 determines that the vehicle M is in the switching timing for the skilled driver at the timing when the vehicle M reaches the position P3, and switches the driving assistance for the vehicle M from the normal driving assistance mode to the risk avoidance assistance mode. Thereafter, as illustrated in (C) of FIG. 13, the driver recognizes the explicit risk at the timing when the vehicle M reaches the position Pd2 after receiving the switching to the risk avoidance assistance mode. After performing the switching to the risk avoidance assistance mode, the driver recognition estimation unit 22 does not need to estimate the driver's recognition of the explicit risk.

When the driving assistance of vehicle M is switched to the risk avoidance assistance mode by the driving assistance switching unit 25, the avoidance control unit 26 performs the system-initiative driving assistance in the risk avoidance assistance mode. The avoidance control unit 26 performs the system-initiative driving assistance so as to avoid the explicit risk based on the external environment of the vehicle M and the vehicle state of the vehicle M.

The avoidance control unit 26 generates a risk potential based on, for example, the external environment of the vehicle M and the vehicle state of the vehicle M. The risk potential includes the explicit risk. The risk potential may include risks other than the explicit risk (lane departure risk, or the like). The avoidance control unit 26 may generate the risk potential based on the position of the vehicle M on the map and the map information in addition to the external environment of the vehicle M and the vehicle state of the vehicle M.

The avoidance control unit 26 calculates a target yaw rate so as to avoid the explicit risk based on the risk potential. The avoidance control unit 26 calculates a target steering angle from the target yaw rate. The target steering angle may coincide with the predicted steering amount of the driver when the explicit risk is recognized by the driver recognition estimation unit 22. In this case, the predicted steering amount of the driver when the explicit risk is recognized may be used as the target steering amount.

The avoidance control unit 26 calculates a risk avoidance assistance torque to be given to the steering section ST so as to realize the target steering angle. The avoidance control unit 26 performs the assistance in the risk avoidance assistance mode by giving a risk avoidance assistance torque to the steering section ST of the vehicle M by transmitting a control signal to the steering actuator. The avoidance control unit 26 may control the vehicle speed of the vehicle M by transmitting a control signal to the engine actuator and/or the brake actuator.

The assistance in the risk avoidance assistance mode is not limited to the above. Any of the risk avoidance assistance modes can be used as long as the vehicle M can avoid the risk under the system initiative. Various types of collision avoidance control can be adopted as the assistance in the risk avoidance assistance mode. As the assistance in the risk avoidance assistance mode, for example, the driving assistance control disclosed in Japanese Patent Application No. 2018-131723 may be adopted.

Processing by Driving Assistance System in First Embodiment

Next, the processing by the driving assistance system 100 in the first embodiment will be described with reference to the drawings.

Reaction Force Characteristics Change Processing

Figure 14:
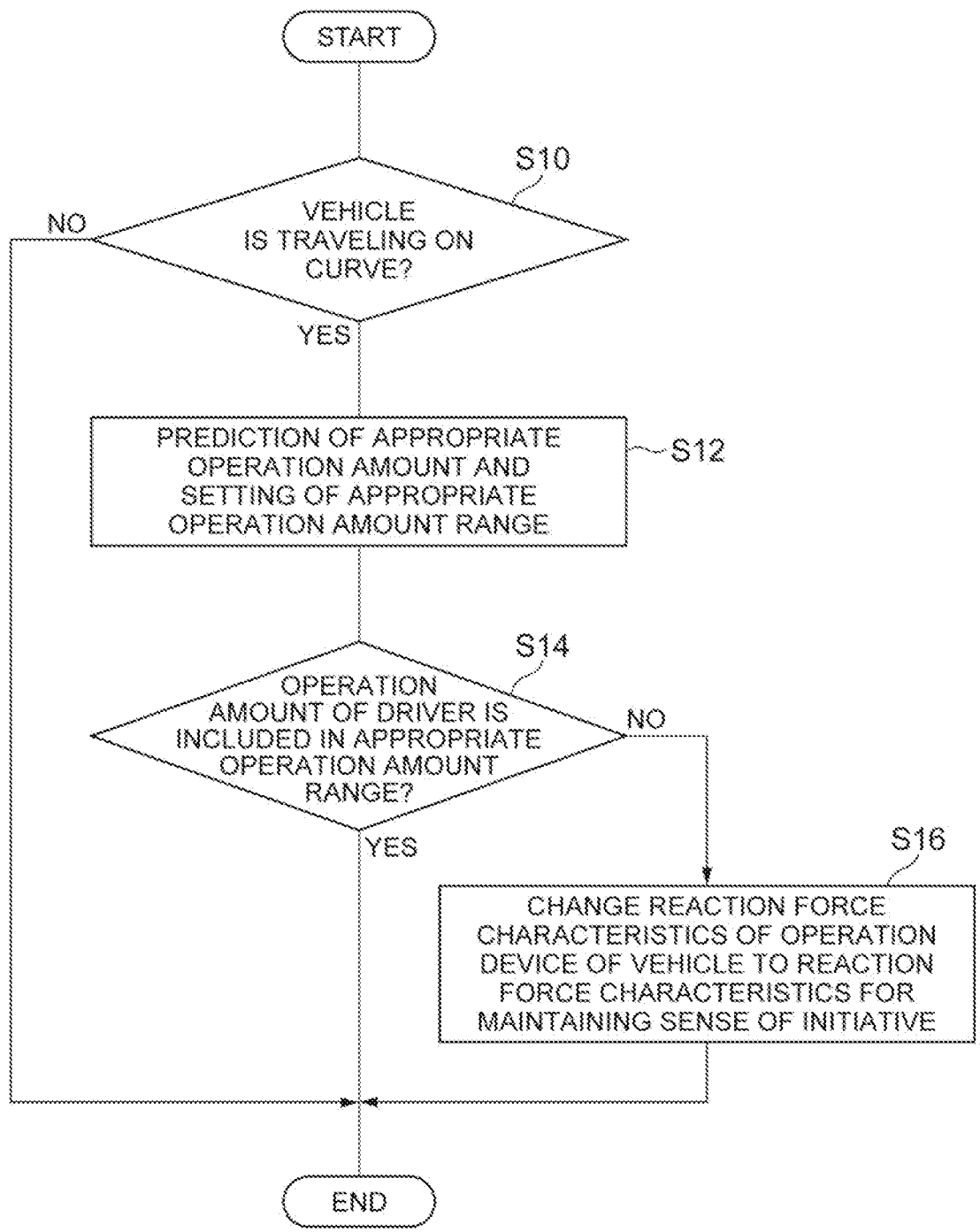
FIG. 14 is a flowchart illustrating an example of reaction force characteristics change processing.

FIG. 14 is a flowchart illustrating an example of reaction force characteristics change processing. The reaction force characteristics change processing illustrated in FIG. 14 is performed, for example, when the vehicle is traveling.

As illustrated in FIG. 14, as S10, the ECU 10 of the driving assistance system 100 determines whether or not the vehicle is traveling on a curve using the curve traveling recognition unit 14. The curve traveling recognition unit 14 determines whether or not the vehicle is traveling on the curve based on the curvature of the traveling road recognized by the external environment recognition unit 12. If it is determined that the vehicle is traveling on the curve (YES in S10), the ECU 10 makes the process proceed to S12. If it is not determined that the vehicle is traveling on the curve (NO in S10), the ECU 10 ends the current processing. In this case, the ECU 10 repeats the processing from S10 again after a certain time has elapsed.

In S12, the ECU 10 performs the prediction of the appropriate operation amount using the appropriate operation amount prediction unit 16 and setting of the appropriate operation amount range using the appropriate operation amount range setting unit 17. The appropriate operation amount prediction unit 16 predicts the appropriate operation amount of the driver based on the operation history of the driver stored in the operation history storage unit 6, the external environment recognized by the external environment recognition unit 12, and the vehicle state recognized by the vehicle state recognition unit 13. The appropriate operation amount range setting unit 17 sets the appropriate operation amount range that is a range set in advance including the appropriate operation amount.

In S14, the ECU 10 determines whether or not the operation amount of the driver corresponding to the prediction time point for the appropriate operation amount is included in the appropriate operation amount range using the determination unit 18. The determination unit 18 performs the determination described above based on the operation amount of the driver recognized by the operation amount recognition unit 15 and the appropriate operation amount range set by the appropriate operation amount range setting unit 17. If it is determined that the operation amount of the driver corresponding to the prediction time point for the appropriate operation amount is included in the appropriate operation amount range (YES in S14), the ECU 10 ends the current processing. In this case, the reaction force characteristics of the operation device T remains the reference reaction force characteristics. The ECU 10 repeats the processing from S10 again after a certain time has elapsed. If it is determined that the operation amount of the driver corresponding to the prediction time point for the appropriate operation amount is not included in the appropriate operation amount range (NO in S14), the ECU 10 makes the process proceed to S16.

In S16, the ECU 10 changes the reaction force characteristics of the operation device T to the reaction force characteristics for maintaining the sense of initiative using the reaction force characteristics change unit 19. The reaction force characteristics change unit 19 can change the reaction force characteristics to the reaction force characteristics for maintaining the sense of initiative, for example, by a minute change from the reference reaction force characteristics. Thereafter, the ECU 10 ends the processing.

Reaction Force Characteristics Change Processing

Figure 15:
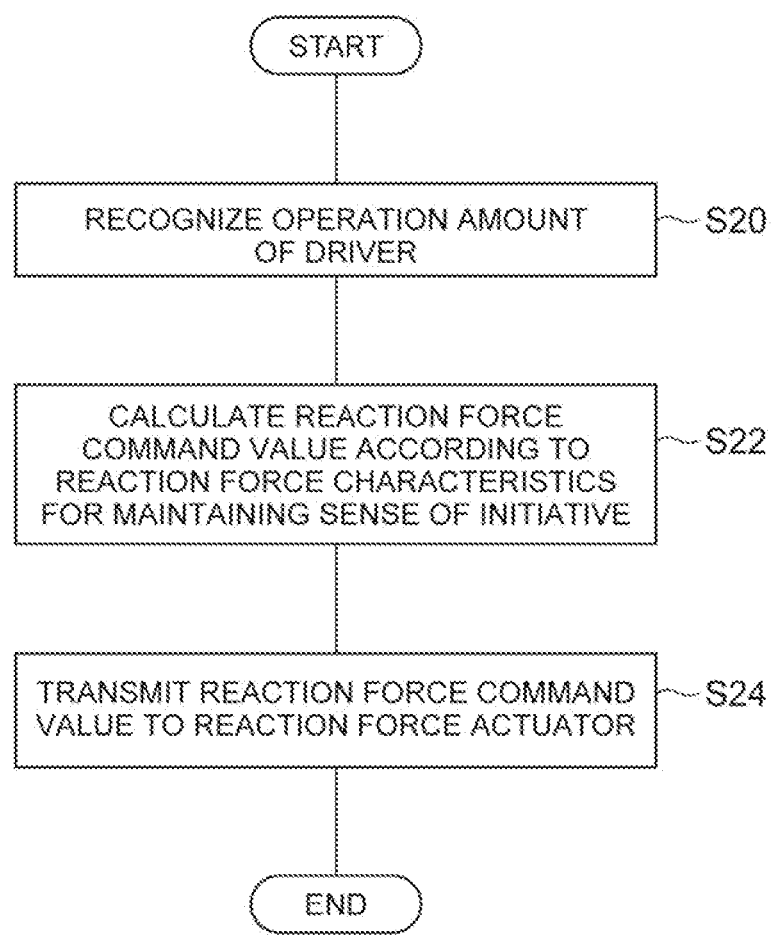
FIG. 15 is a flowchart illustrating an example of reaction force control processing.

FIG. 15 is a flowchart illustrating an example of the reaction force control processing. The reaction force control processing is performed when the change to the reaction force characteristics for maintaining the sense of initiative is performed in in S16 in FIG. 14. The description for the case where the reaction force characteristics remain as the reference reaction force characteristics will be omitted.

As illustrated in FIG. 15, as S20, the ECU 10 recognizes the operation amount of the driver using the operation amount recognition unit 15. The operation amount recognition unit 15 recognizes the operation amount of the driver for the operation device T of the vehicle based on the operation amount information from the driving operation detection unit 4.

In S22, the ECU 10 calculates the reaction force command value according to the reaction force characteristics for maintaining the sense of initiative using the reaction force control unit 20. The reaction force control unit 20 calculates the reaction force command value based on the operation amount of the driver recognized by the operation amount recognition unit 15 and the reaction force characteristics.

In S24, the ECU 10 transmits the reaction force command value to the reaction force actuator 8 using the reaction force control unit 20. The reaction force control unit 20 controls the reaction force of the operation device T by transmitting the command value to the reaction force actuator 8 via the PID controller 7.

Mode Switching Processing

Figure 16:
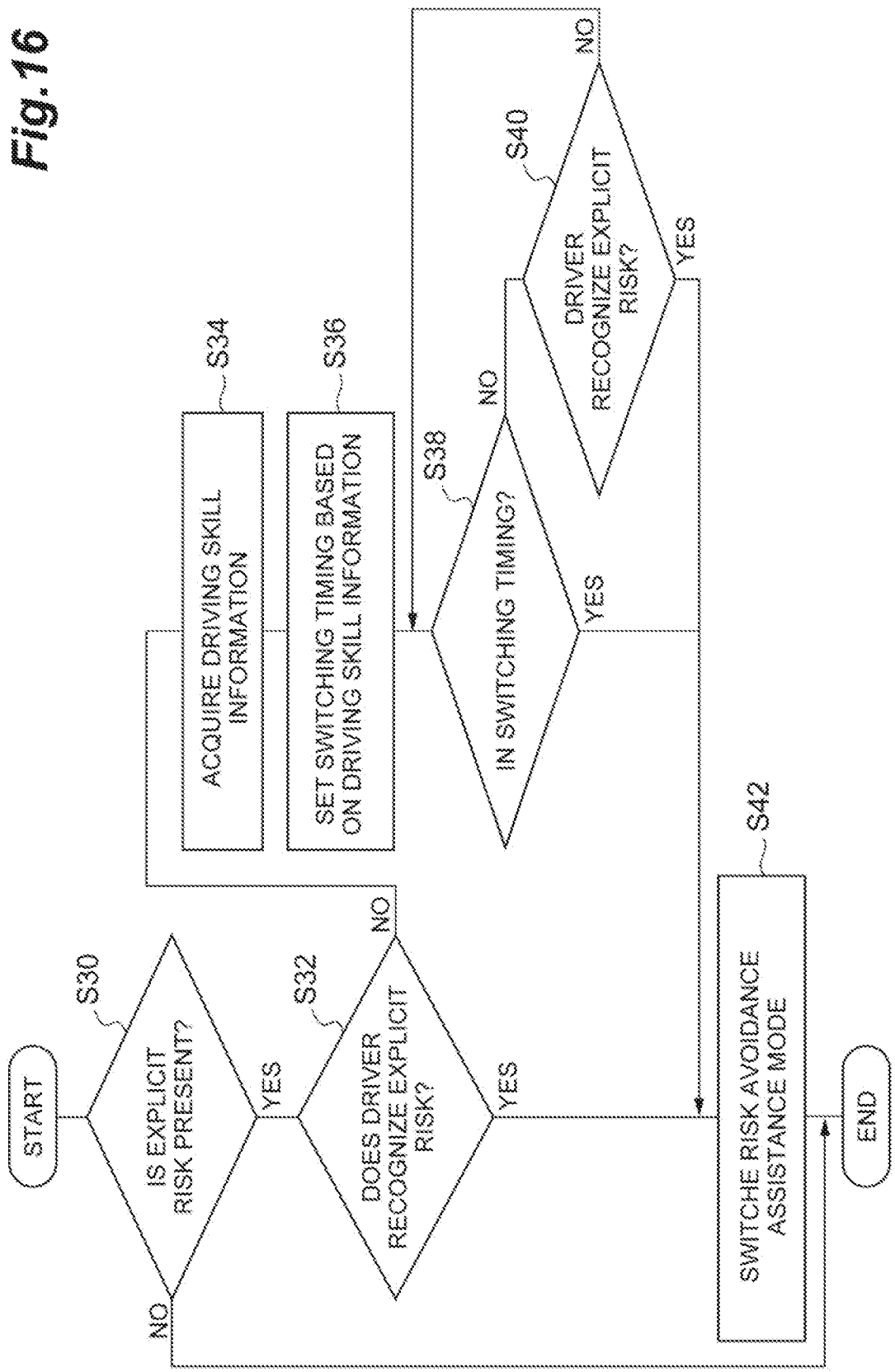
FIG. 16 is a flowchart illustrating an example of mode switching processing in the first embodiment.

FIG. 16 is a flowchart illustrating an example of the mode switching processing in the first embodiment. The mode switching processing illustrated in FIG. 16 is performed when the driving assistance of vehicle M is in the normal driving assistance mode.

As illustrated in FIG. 16, as S30 the ECU 10 of the driving assistance system 100 determines whether or not the explicit risk is present using the explicit risk determination unit 21. The explicit risk determination unit 21 determines whether or not the explicit risk is present based on the external environment of the vehicle M recognized by the external environment recognition unit 12. If it is determined that the explicit risk is present (YES in S30), the ECU 10 makes the process proceed to S32. If it is determined that the explicit risk is not present (NO in S30), the ECU 10 ends the current processing. Thereafter, the ECU 10 repeats the processing from S30 again after a predetermined time has elapsed.

In S32, The ECU 10 estimates whether or not the driver recognizes the explicit risk using the driver recognition estimation unit 22. The driver recognition estimation unit 22 estimates whether or not the driver recognizes the explicit risk based on at least one of the predicted steering amount when the driver does not recognize the explicit risk and the predicted steering amount when the driver recognizes the explicit risk, and the steering amount of the driver. If it is estimated that the driver recognizes explicit risk (YES in S32), the ECU 10 makes the process proceed to S42. If it is estimated that the driver does not recognize explicit risk (NO in S32), the ECU 10 makes the process proceed to S34.

In S34, the ECU 10 acquires the information on the driving skill of the driver using the driving skill information acquisition unit 23. The driving skill information acquisition unit 23 acquires the information on the driving skill by, for example, the driving skill of the driver using the average value of the difference between the steering amount of the driver and the standard steering amount according to the shape of the road over a certain period of time in the past. The information on the driving skill may be acquired in advance.

In S36, the ECU 10 sets the switching timing using the switching timing setting unit 24. The switching timing setting unit 24 sets the switching timing based on the information on the driving skill acquired by the driving skill information acquisition unit 23. For example, if the driver is an unskilled driver, the switching timing setting unit 24 sets the switching timing for the unskilled driver such that the timing is earlier than that when the driver is an intermediate driver. The switching timing may be set in advance at the timing when the information on the driving skill is acquired.

In S38, the ECU 10 determines whether or not the vehicle M is in the switching timing using the driving assistance switching unit 25. The driving assistance switching unit 25 determines whether or not the vehicle M is in the switching timing based on, for example, the time to collision between the vehicle M and the object subject to the explicit risk. If it is determined that the vehicle M is in the switching timing (YES in S38), the ECU 10 makes the process proceed to S42. If it is determined that the vehicle M is not in the switching timing (NO in S38), the ECU 10 makes the process proceed to S40.

In S40, the ECU 10 estimates again whether or not the driver recognizes explicit risk using the driver recognition estimation unit 22. If it is estimated that the driver recognizes the explicit risk (YES in S40), the ECU 10 makes the process proceed to S42. If it is estimated that the driver does not recognize the explicit risk (NO in S40), the ECU 10 makes the process return to S38.

In S42, the ECU 10 switches the driving assistance for the vehicle M from the driver-initiative driving normal driving assistance mode to the system-initiative risk avoidance assistance mode using the driving assistance switching unit 25.

Driver's Recognition of Explicit Risk Estimation Processing

Figure 17:
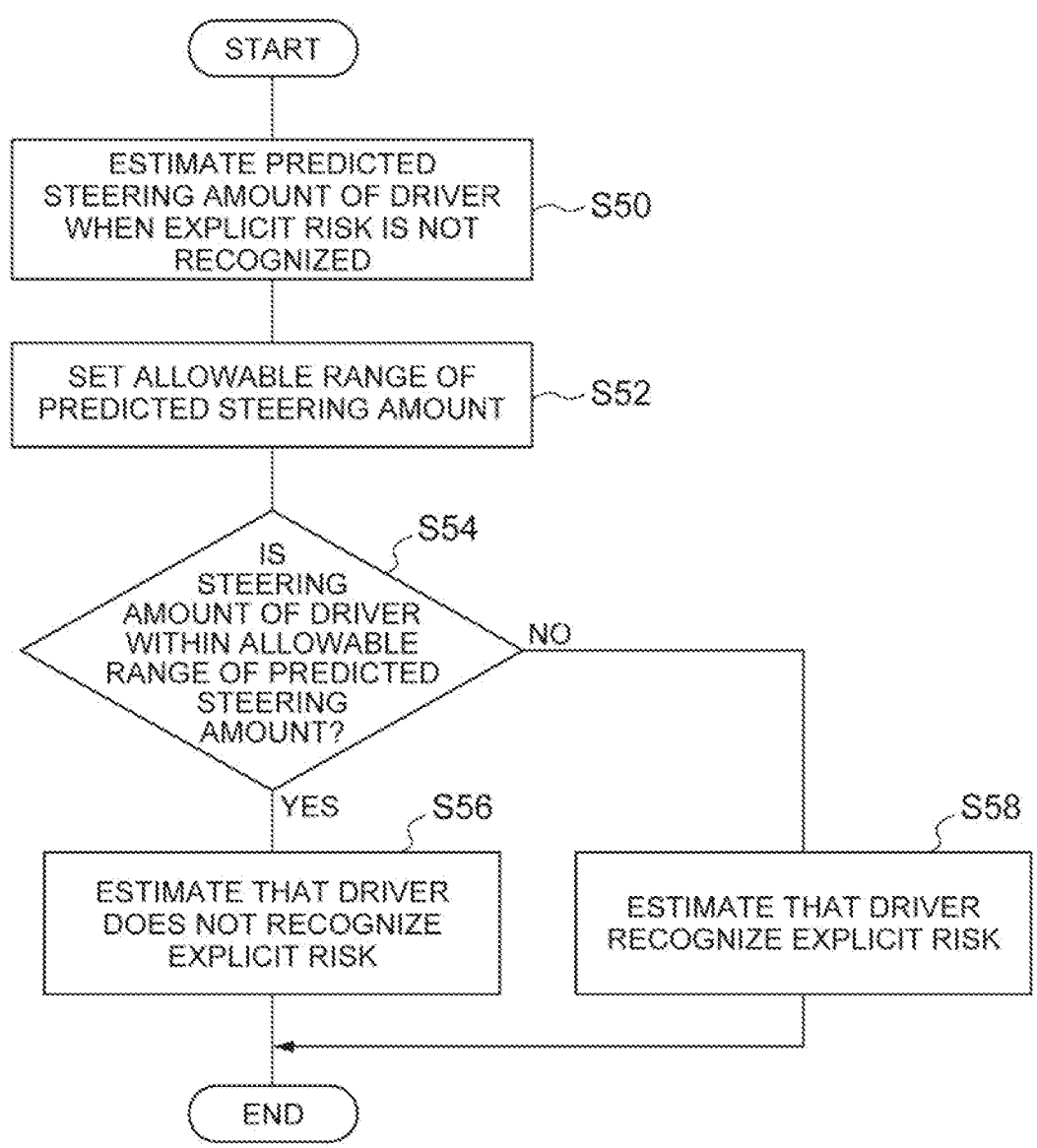
FIG. 17 is a flowchart illustrating an example of driver's explicit risk recognition estimation processing in the first embodiment.

FIG. 17 is a flowchart illustrating an example of driver's explicit risk recognition estimation processing in the first embodiment. The driver explicit risk recognition estimation processing is performed, for example, in S32 and S40 illustrated in FIG. 16.

As illustrated in FIG. 17, as S50, the ECU 10 estimates a predicted steering amount of the driver when the explicit risk is not recognized using the recognition estimation unit 22. The driver recognition estimation unit 22 estimates the predicted steering amount of the driver when the explicit risk is not recognized based on, for example, the external environment of the vehicle M, the vehicle state of the vehicle M, and the operation history of the driver.

In S52, the ECU 10 sets an allowable range of the predicted steering amount using the driver recognition estimation unit 22. For example, the driver recognition estimation unit 22 sets the allowable range as a range of the steering amount set in advance having the predicted steering amount as a median value.

In S54, the ECU 10 determines whether or not the steering amount of the driver recognized by the operation amount recognition unit 15 is within the allowable range of the predicted steering amount using the driver recognition estimation unit 22. If it is determined that the steering amount of the driver is within the allowable range of the predicted steering amount (YES in S54), the ECU 10 makes the process proceed to S56. If it is determined that the steering amount of the driver is not within the allowable range of the predicted steering amount (NO in S54), the ECU 10 makes the process proceed to S58.

In S56, the ECU 10 estimates that the driver does not recognize the explicit risk. In S58, the ECU 10 estimates that the driver recognizes the explicit risk. The driver recognition estimation unit 22 may estimate that the driver recognizes the explicit risk only when a state in which the steering amount of the driver is outside the allowable range of the predicted steering amount is continued for more than a certain period.

Risk Avoidance Assistance Processing

Figure 18:
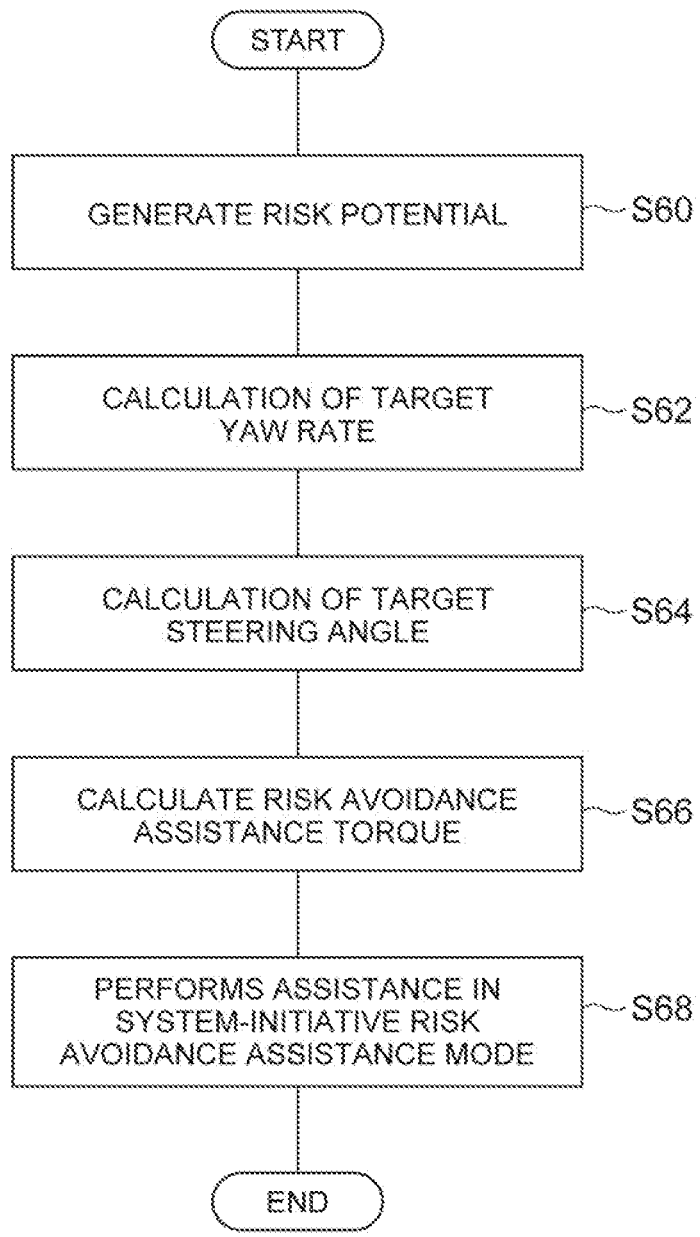
FIG. 18 is a flowchart illustrating an example of risk avoidance assistance processing in the first embodiment.

FIG. 18 is a flowchart illustrating an example of risk avoidance assistance processing in the first embodiment. The risk avoidance assistance processing is performed, for example, when the driving assistance for the vehicle M is switched from the normal driving assistance mode to the risk avoidance assistance mode. The calculation of the risk avoidance assistance processing may be started at a time when the driving assistance system 100 recognizes the explicit risk.

As illustrated in FIG. 18, as S60, the ECU 10 generates a risk potential using the avoidance control unit 26. The avoidance control unit 26 performs the generation of the risk potential based on the external environment of the vehicle M and the vehicle state of the vehicle M, for example.

In S62, the ECU 10 performs the calculation of the target yaw rate using the avoidance control unit 26. The avoidance control unit 26 calculates the target yaw rate in the risk avoidance assistance mode based on the risk potential. In S64, the ECU 10 performs the calculation of the target steering angle using the avoidance control unit 26. The avoidance control unit 26 calculates the target steering angle from the target yaw rate.

In S66, the ECU 10 calculates the risk avoidance assistance torque using the avoidance control unit 26. The avoidance control unit 26 calculates the risk avoidance assistance torque so as to achieve the target steering angle.

In S68, the ECU 10 performs the assistance in the risk avoidance assistance mode using the avoidance control unit 26. The avoidance control unit 26 performs the assistance in the risk avoidance assistance mode by giving a risk avoidance assistance torque to the steering section ST of the vehicle M by transmitting a control signal to the steering actuator. The avoidance control unit 26 may control the vehicle speed of the vehicle M by transmitting a control signal to the engine actuator and/or the brake actuator.

According to the driving assistance system 100 in the first embodiment described above, in the normal driving assistance mode, if it is determined by the determination unit that the operation amount of the driver is not included in the appropriate operation amount range, the operation amount of the driver is suppressed from exceeding the appropriate operation amount range by changing the reaction force characteristics of the operation device T, and thus, the operation amount of the driver can be easily stayed within the appropriate operation amount range. Therefore, it is possible to perform the driving assistance such that the operation amount of the driver becomes appropriate while maintaining the sense of initiative of the driver.

In addition, in the driving assistance system 100, if it is determined that an explicit risk such as stop vehicle is present in front of the vehicle, the driving assistance of vehicle M is switched from the driver-initiative normal driving assistance mode to the system-initiative risk avoidance assistance mode. Therefore, according to the driving assistance system 100, it is possible to perform the driving assistance such that the operation amount of the driver becomes appropriate while maintaining the sense of initiative of the driver in the driver-initiative normal driving assistance mode, and it is possible to take appropriate measures to avoid the risk in the system-initiative risk avoidance assistance mode.

Furthermore, according to the driving assistance system 100, if it is determined that the explicit risk is present, whether or not the driver recognizes the explicit risk is estimated. If it is estimated that the driver recognizes the explicit risk, the driving assistance for the vehicle M is switched to the system-initiative risk avoidance assistance mode. Therefore, it is possible to reduce a fact that the mode switching is performed without the driver understanding the reason for mode switching of the system. In addition, if it is estimated that the driver does not recognize the explicit risk, since the switching timing is set based on the driving skill of the driver, it is possible to perform the switching to the risk avoidance assistance mode at a timing according to the driving skill of the driver.

According to the driving assistance system 100, if it is determined that the operation amount of the driver amount corresponding to the prediction time point for the appropriate operation amount is not included in the appropriate operation amount range, it is possible to make the operation amount of the driver stay in the appropriate operation amount range by changing the reaction force characteristics to the reaction force characteristics for maintaining the sense of initiative in which the operation amount of the driver is likely to remain in the appropriate operation amount range by performing the minute change on the reaction force characteristics of the operation device.

The driving assistance system 100 changes the reaction force characteristics of the operation device to the reaction force characteristics for maintaining the sense of initiative such that the reaction force increase amount with respect to the increase of operation amount in the appropriate operation amount is large compared to the reaction force increase amount with respect to the increase of the operation amount from the operation amount at the time of determination to the appropriate operation amount range. In this case, since the reaction force increase amount with respect to the increase of the operation amount becomes large when the operation amount of the driver enters the appropriate operation amount range, it is possible to suppress the driver from increasing the force required for further operation and causing the operation amount of the driver to exceed the appropriate operation amount range, and thus, it is possible to make the operation amount of the driver easy to stay in the appropriate operation amount range.

In addition, in the driving assistance system 100, if it is determined that the operation amount of the driver amount corresponding to the prediction time point for the appropriate operation amount is not included in the appropriate operation amount range, the driving assistance system 100 changes the reaction force characteristics of the operation device to the reaction force characteristics for maintaining the sense of initiative such that the reaction force decrease amount with respect to the decrease of operation amount in the appropriate operation amount is large compared to the reaction force decrease amount with respect to the decrease of the operation amount from the operation amount at the time of determination to the appropriate operation amount range. In this case, since the reaction force decrease amount with respect to the decrease of the operation amount becomes large when the operation amount of the driver enters the appropriate operation amount range, and the reaction force that boosts the operation amount of the driver decreases, it is possible to suppress the operation amount of the driver from exceeding the appropriate operation amount range, and thus, it is possible to make the operation amount of the driver easy to stay in the appropriate operation amount range.

Furthermore, in the driving assistance system 100, since it is easy for the operation amount of the driver to stay in the appropriate operation amount range by changing the reaction force characteristics of the operation device, it is possible to maintain the sense of initiative of the driver compared to the case where the operation amount of the driver is forcibly interfered so as to become the appropriate operation amount. Therefore, driving assistance system 100, it is possible to perform the driving assistance such that the operation amount of the driver can be appropriate while maintaining the sense of initiative of the driver. As a result thereof, according to driving assistance system 100, the driving assistance can be performed such that the operation amount of the driver becomes appropriate by the minute force sensing interaction which does not impair the sense of initiative of the driver, and thus, the driver has a feeling that his driving skill is improved, and it is possible to activate the driving behavior. In addition, it is possible to suppress the fluctuations in driver's operation when traveling the same lane in multiple times (large difference occurs in the operation amount for each traveling).

In addition, according to the driving assistance system 100, if it is determined by the determination unit 18 that the steering amount of the driver corresponding to the prediction time point of the appropriate steering amount is not included in the appropriate steering amount range, and if it is determined by the curve traveling recognition unit 14 that the vehicle M is traveling on the curve, since the reaction force characteristics of the steering section ST of the vehicle M is changed to the reaction force characteristics for maintaining the sense of initiative, it is possible to make the steering amount of the driver easy to stay in the appropriate steering amount range when traveling on the curve where the appropriate steering by the driver is required. In addition, in the driving assistance system 100, since it is easy for the steering amount of the driver to stay in the appropriate steering amount range by changing the reaction force characteristics of the steering section ST, it is possible to perform the driving assistance such that the steering amount of the driver becomes appropriate while maintaining the sense of initiative of the driver compared to the case where the steering amount of the driver is forcibly interfered so as to become the appropriate steering amount.

Second Embodiment

Figure 19:
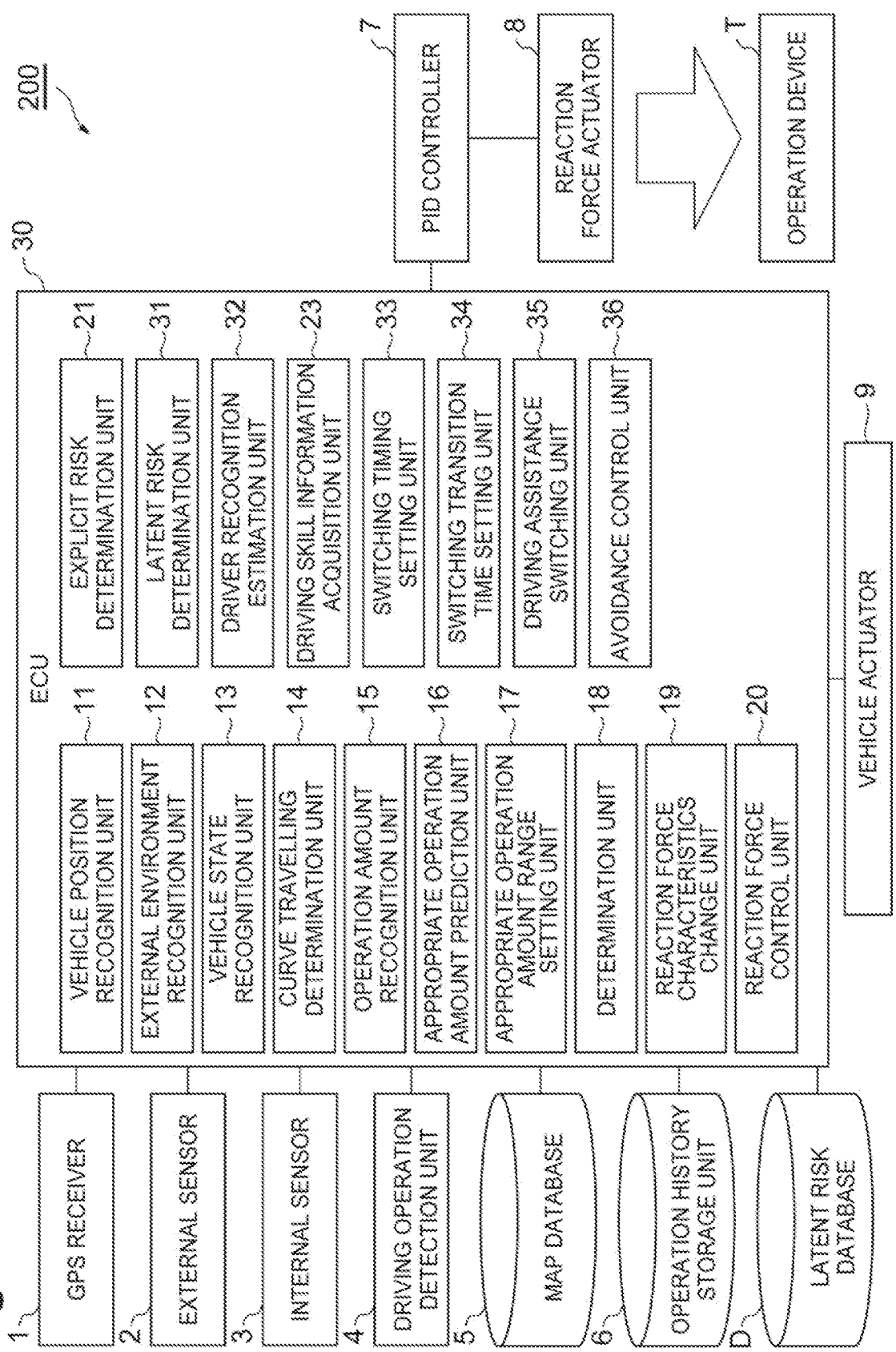
FIG. 19 is a block diagram illustrating a driving assistance system in a second embodiment.

FIG. 19 is a block diagram illustrating a driving assistance system in a second embodiment. The driving assistance system 200 illustrated in FIG. 19 is mainly different from that in the first embodiment in a point that a latent risk is taken into consideration and a point that a switching transition time is taken into consideration. The latent risk and the switching transition time will be described later. Hereinafter, the same reference numerals will be given to the same configuration elements as those in the first embodiment, and detailed description thereof will omitted.

Configuration of Driving Assistance System in Second Embodiment

As illustrated in FIG. 19, the driving assistance system 200 in the second embodiment is different from that in the first embodiment in a point that a latent risk database D is provided. In addition, an ECU 30 of the driving assistance system 200 is different from that in the first embodiment in a point that a latent risk determination unit 31 and a switching transition time setting unit 34 is included. Further, the ECU 30 is different from that in the first embodiment in a point that a driver recognition estimation unit 32, a switching timing setting unit 33, a driving assistance switching unit 35, and an avoidance control unit 36 have additional functions.

The latent risk database D is a database that stores latent risk information. The latent risk database D stores the latent risk information associated with a position (location) on the map. The latent risk information is information regarding the latent risk. The latent risk is a risk that cannot be detected by the external sensor 2 of vehicle M.

Figure 20:
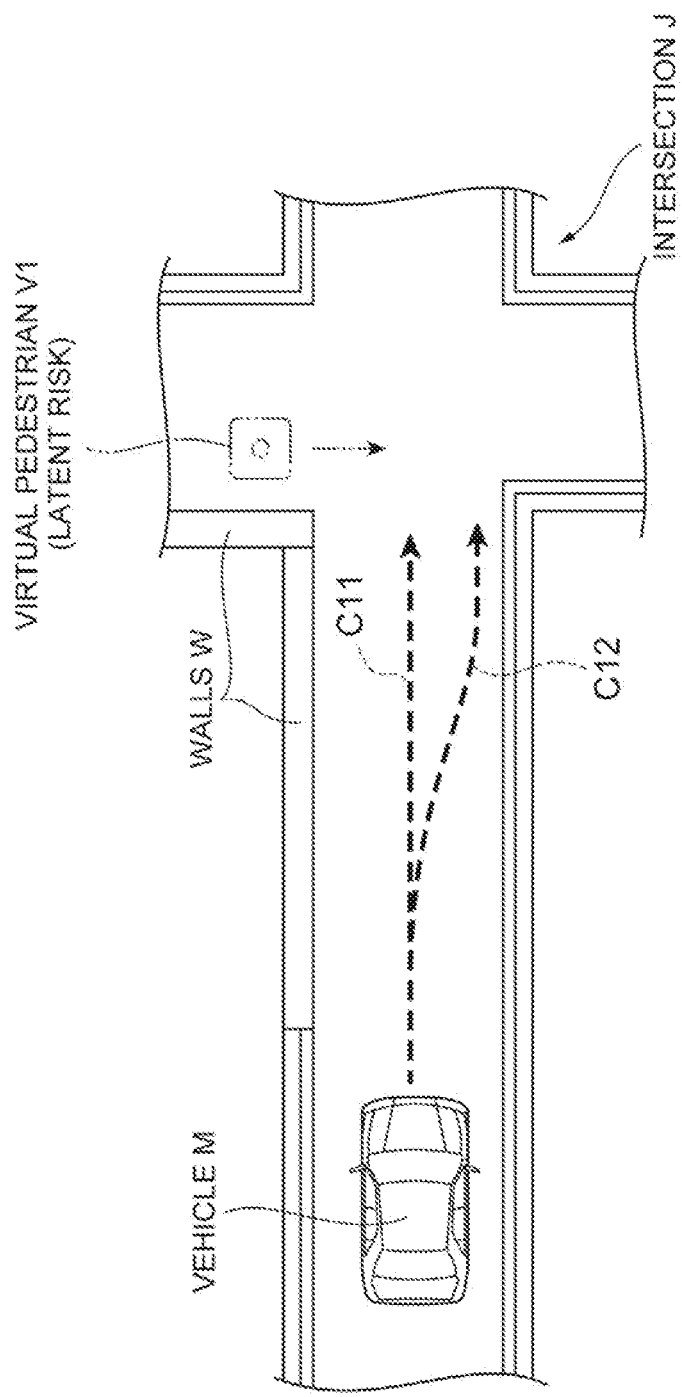
FIG. 20 is a plan view for explaining an example of a latent risk.

Here, FIG. 20 is a plan view for explaining an example of the latent risk. FIG. 20 illustrates a situation in which the vehicle M enters an intersection J with low visibility. FIG. 20 illustrates L-shaped walls W and a virtual pedestrian V1 provided along the intersection J on the left side of vehicle M and the vehicle M. In addition, a travel trajectory C11 of vehicle M when the driver does not recognize the latent risk (virtual pedestrian V1) and a travel trajectory C12 of the vehicle M when the driver recognizes the latent risk are illustrated.

As illustrated in FIG. 20, when entering the intersection J with low visibility, the external sensor 2 of the vehicle M cannot detect the virtual pedestrian V1 behind the wall W. In the latent risk database D, the intersection J with low visibility and the like are registered as the latent risk information. The latent risk information may include a virtual pedestrian (latent risk) behind a construction facility (explicit risk) provided on the road. In this case, the construction facility may also be included in the latent risk information in association with the virtual pedestrian.

The latent risk information includes a latent risk determination condition in accordance with an entering direction of the vehicle M. That is, in the situation illustrated in FIG. 20, for the vehicle M entering the intersection J from the left side of the drawing, the virtual pedestrian V1 is prevented from being recognized due to the wall W, but if the vehicle M enters the intersection J from the lower side of the drawing, the wall W does not hinder and does not become the latent risk.

The latent risk determination condition may include time periods. If the latent risk determination condition includes the time periods, only predetermined time periods such as a time period of an evening, a time period of a night, a school time period, and a commuting time period are determined as the latent risk. The virtual pedestrian V1 was exemplified as a latent risk, however, the latent risk is not limited to the pedestrian. The latent risk may be another vehicle or a bicycle.

The latent risk database D may be configured as a database integrated with the map database 5. In addition, the latent risk database D may be formed on a server that can communicate with the vehicle M. In this case, the driving assistance system 200 can acquire the necessary latent risk information through wireless communication for the vehicle M side.

The latent risk determination unit 31 determines whether or not the latent risk is present based on the position of the vehicle M on the map recognized by the vehicle position recognition unit 11 and the latent risk information in the latent risk database D. The latent risk determination unit 31 recognizes the entering direction of the vehicle M with respect to the position (location) in the latent risk information, from at least one of a temporal change of the position of the vehicle M on the map and the traveling direction of the lane in which the vehicle M is traveling. For example, in the intersection J with low visibility illustrated in FIG. 20, the latent risk determination unit 31 determines that the latent risk is present if the entering direction of the vehicle M is at least one of the left side and the upper side of the drawing. In the intersection J with low visibility illustrated in FIG. 20, the latent risk determination unit 31 determines that the latent risk is not present if the entering direction of vehicle M is at least one of the lower side of the drawing and the right side of the drawing.

If it is determined by the latent risk determination unit 31 that the latent risk is present, the driver recognition estimation unit 32 estimates whether or not the driver recognizes the latent risk. The driver recognition estimation unit 32 estimates whether or not the driver recognizes the latent risk based on the predicted steering amount when the driver recognizes the latent risk and the steering amount of the driver.

The driver recognition estimation unit 32 estimates the predicted steering amount of the driver when the latent risk is recognized based on, for example, the external environment of the vehicle M, the vehicle state of the vehicle M, and the operation history (or the driving tendency) of the driver. The driver recognition estimation unit 32 estimates the predicted steering amount as such an amount that the vehicle M travels avoiding the latent risk on the traveling road. The driver recognition estimation unit 32 does not necessarily need to use the steering history or the driving tendency of the driver. The driver recognition estimation unit 32 estimates the predicted steering amount of the driver up to a predetermined time ahead.

The driver recognition estimation unit 32 sets an allowable range of the predicted steering amount. For example, as the allowable range, the driver recognition estimation unit 32 sets the allowable range as a range of the steering amount set in advance having the predicted steering amount as a median value. The allowable range can be set as in the case of explicit risk. The allowable range may be set as a wider range than in the case of explicit risk.

The driver recognition estimation unit 32 determines whether or not the recognized steering amount of the driver recognized by the operation amount recognition unit 15 is within the allowable range of the predicted steering amount. If the steering amount of the driver is within the allowable range of the predicted steering amount (for example, when the steering amount is along the travel trajectory C12 in FIG. 20), the driver recognition estimation unit 32 estimates that the driver recognizes the latent risk. If the steering amount of the driver is not within the allowable range of the predicted steering amount (for example, when the steering amount is along the travel trajectory C11 in FIG. 20), the driver recognition estimation unit 32 estimates that the driver does not recognize the latent risk.

In addition, if it is determined by the explicit risk determination unit 21 that explicit risk is present, and if it is determined by the latent risk determination unit 31 that the latent risk is not present, the driver recognition estimation unit 32 estimates whether or not the driver recognizes the driver-determined latent risk. The driver-determined latent risk is a risk that cannot be detected by the external sensor 2 of the vehicle M and is not determined by the latent risk determination unit 31 and that is considered by the driver. If it is estimated that the driver recognizes the driver-determined latent risk, the driving assistance switching unit 35 continues the normal driving assistance mode.

The driver recognition estimation unit 32 estimates whether or not the driver recognizes the driver-determined latent risk based on the target steering amount when the vehicle M avoids the explicit risk in the risk avoidance assistance mode and the steering amount of the driver. The driver recognition estimation unit 32 calculates the target steering amount when the vehicle M avoids the explicit risk in the risk avoidance assistance mode based on, for example, the external environment of the vehicle M and the vehicle state of the vehicle M. The driver recognition estimation unit 32 may calculate the target steering amount while considering the operation history of the driver in addition to the external environment of the vehicle M and the vehicle state of the vehicle M. The target steering amount may be calculated by the avoidance control unit 36.

For example, when the driver performs the steering so as to be further away from the explicit risk compared to the target steering amount when the vehicle M avoids the explicit risk in the risk avoidance assistance mode, the driver recognition estimation unit 32 estimates that the driver recognizes the driver-determined latent risk. If a deviation amount in the direction away from explicit risk between the target steering amount when the vehicle M avoids the explicit risk in the risk avoidance assistance mode and the steering amount of the driver is equal to or greater than a deviation threshold value, the driver recognition estimation unit 32 may estimate that the driver recognizes the driver-determined latent risk. The deviation threshold value is a threshold value set in advance. The driver recognition estimation unit 32 may estimate that the driver recognizes the driver-determined latent risk only when the deviation amount is equal to or greater than the deviation threshold value is continued for more than a certain period.

Figure 21A:
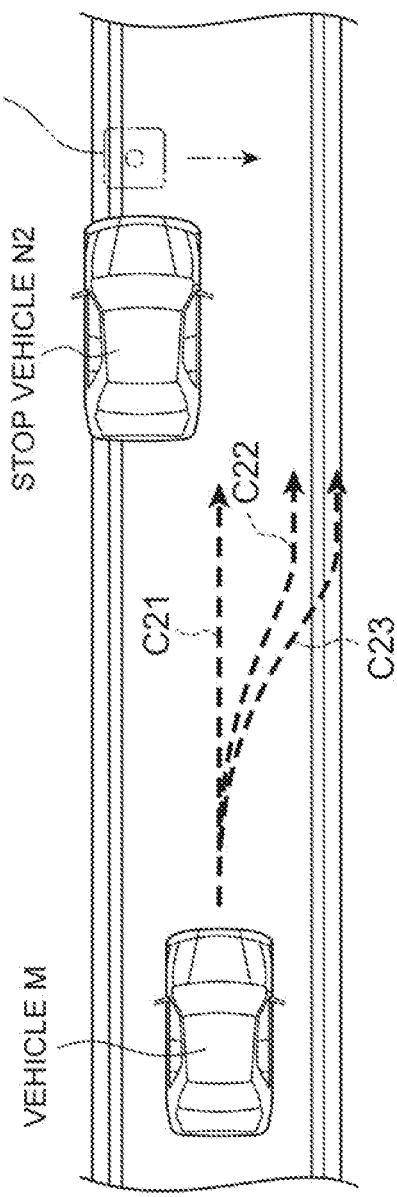
FIG. 21A is a plan view for explaining an example of a driver-determined latent risk recognized by the driver.

Here, FIG. 21A is a plan view for explaining an example of the driver-determined latent risk recognized by the driver. A stop vehicle N2 (explicit risk) in front of vehicle M and a virtual pedestrian V2 (driver-determined latent risk) are illustrated in FIG. 21A. In addition, FIG. 21A illustrates a travel trajectory C21 of vehicle M when driver does not recognize the explicit risk and the driver-determined latent risk, a travel trajectory C22 of the vehicle M when the driver recognizes only the explicit risk, and a travel trajectory C23 of the vehicle M when the driver recognizes both the explicit risk and the driver-determined latent risk.

In FIG. 21A, there is a possibility that a virtual pedestrian V2 is present behind the stop vehicle N2. However, the virtual pedestrian V2 cannot be detected by the external sensor 2 due to the hindrance by the stop vehicle N2. In addition, because the stop vehicle N2 is not always present at the same position, the virtual pedestrian V2 is not included in the latent risk information in latent risk database D.

For this reason, in the situation illustrated in FIG. 21A, the latent risk determination unit 31 determines that the latent risk is not present. As a result, even in the risk avoidance assistance mode, the driving assistance system 200 performs the steering intervention to avoid the explicit risk. The travel trajectory in the risk avoidance assistance mode in this case corresponds to, for example, a travel trajectory C22. In this situation, based on empirical rules, the driver may perform the steering so as to be far away from the stop vehicle N2 (the explicit risk) considering the virtual pedestrian V2. The driver steers the vehicle M along the travel trajectory C23, for example. In this case, since the driver is performing the steering so as to be further away from the explicit risk (corresponding to the travel trajectory C23) compared to the target steering amount when the vehicle M avoids the explicit risk in the risk avoidance assistance mode (corresponding to travel trajectory C22), the driver recognition estimation unit 32 estimates that the driver recognizes the driver-determined latent risk. If it is determined that the driver recognizes the driver-determined latent risk, the driving assistance switching unit 35 continues the normal driving assistance mode without switching to the risk avoidance assistance mode.

Figure 21B:
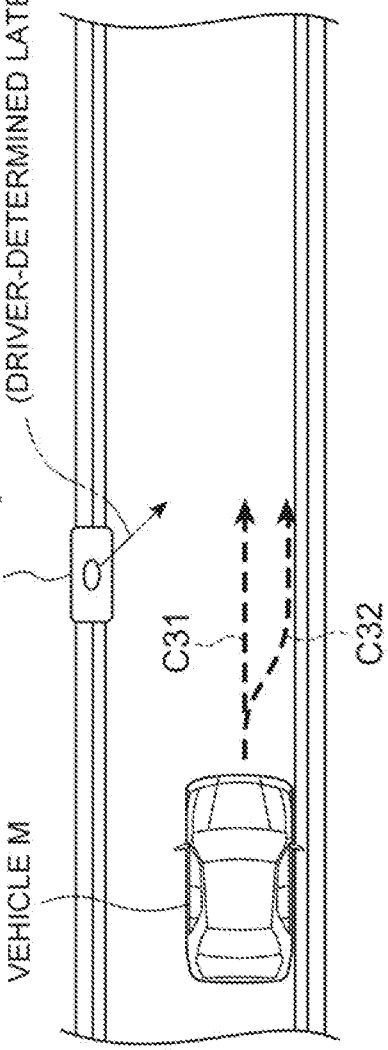
FIG. 21B is a plan view for explaining another example of a driver-determined latent risk recognized by the driver.

FIG. 21B is a plan view for explaining another example of a driver-determined latent risk recognized by the driver. FIG. 21B illustrates a bicycle Cy traveling in front of the vehicle M, a travel trajectory C31 when the driver does not recognize the driver-determined latent risk, and a travel trajectory C32 when the driver does not recognize the driver-determined latent risk. In the situation shown in FIG. 21B, a sudden fall of the bicycle Cy toward the roadway or a sudden route change may become the driver-determined latent risk. In addition, the vehicle M is already traveling at a certain distance away from the bicycle Cy. In this situation, in consideration of the sudden fall of the bicycle Cy toward the roadway or the sudden route change, the driver may steer the vehicle M such that the travel trajectory becomes the travel trajectory C32 which is further away from the bicycle Cy. At this time, in the driving assistance system 200, the driver recognition estimation unit 32 estimates that the driver recognizes the driver-determined latent risk, therefore, the normal driving assistance mode can be continued.

Even if it is determined by the latent risk determination unit 31 that latent risk is present, and if it is estimated by the driver recognition estimation unit 32 that the driver does not recognize the latent risk, the switching timing setting unit 33 sets the switching timing. The switching timing setting unit 33 sets the switching timing based on the information on the driving skill of the driver as in the first embodiment.

The switching transition time setting unit 34 sets the switching transition time. The switching transition time is a time from switching start to switching end in switching from the normal driving assistance mode to the risk avoidance assistance mode.

The switching transition time setting unit 34 sets the switching transition time according to a difference between the risk recognitions by the system and by the driver. Specifically, if it is determined by the explicit risk determination unit 21 that the explicit risk is present, if it is estimated by the driver recognition estimation unit 32 that the driver does not recognize the explicit risk, when vehicle M becomes switching timing, and when the vehicle M is in the switching timing, the switching transition time setting unit 34 sets the switching transition time as a reference time Δt. The reference time Δt is a time set in advance.

If it is determined by the explicit risk determination unit 21 that explicit risk is present and if it is estimated by the driver recognition estimation unit 32 that the driver recognizes the explicit risk, the switching transition time setting unit 34 sets the switching transition time as a time Δt1 which is shorter than the reference time Δt. Since the normal driving assistance mode is continued if it is estimated by the driver recognition estimation unit 32 that the driver recognizes the driver-determined latent risk, the switching transition time setting unit 34 does not need to set the switching transition time.

If it is determined by the latent risk determination unit 31 that the latent risk is present and if it is estimated by the driver recognition estimation unit 32 that the driver recognizes the latent risk, the switching transition time setting unit 34 sets the switching transition time as a time Δt1 which is shorter than the reference time Δt. If it is determined by the latent risk determination unit 31 that the latent risk is present, if it is estimated by the driver recognition estimation unit 32 that the driver does not recognize the latent risk, and when the vehicle M is in the switching timing, the switching transition time setting unit 34 sets the switching transition time as a time Δt2 which is longer than the reference time Δt.

If it is determined by the explicit risk determination unit 21 that the explicit risk is present and if it is determined by the latent risk determination unit 31 that latent risk is present, if it is estimated by the driver recognition estimation unit 32 that the driver recognizes the explicit risk and does not recognize the latent risk, the switching transition time setting unit 34 sets the switching transition time as the reference time Δt.

If it is determined by the explicit risk determination unit 21 that the explicit risk is present and if it is determined by the latent risk determination unit 31 that the latent risk is present, if it is estimated by the driver recognition estimation unit 32 that the driver does not recognize the explicit risk and when the vehicle M is in the switching timing, the switching transition time setting unit 34 sets the switching transition time as a time Δt2 which is longer than the reference time Δt.

If it is determined by the latent risk determination unit 31 that the latent risk is present, the driving assistance switching unit 35 switches the driving assistance for the vehicle M from the driver-initiative normal driving assistance mode to the system-initiative risk avoidance assistance mode.

If it is determined by the latent risk determination unit 31 that the latent risk is present and if it is estimated by the driver recognition estimation unit 32 that the driver recognizes the latent risk, since the driver is unlikely to be embarrassed by the mode switching, the driving assistance switching unit 35 switches the driving assistance for the vehicle M from the driver-initiative normal driving assistance mode to the system-initiative risk avoidance assistance mode.

If it is determined by the latent risk determination unit 31 that the latent risk is present and if it is estimated by the driver recognition estimation unit 32 that the driver does not recognize the latent risk, the driving assistance switching unit 35 determines whether or not the vehicle M is in the switching timing.

If it is determined by driver recognition estimation unit 32 that the driver recognizes the latent risk before the vehicle M is in the switching timing, the driving assistance switching unit 35 switches the driving assistance for the vehicle M from the normal driving assistance mode to the risk avoidance assistance mode.

If it is determined that the vehicle M is in the switching timing while it is not estimated that the driver recognizes the latent risk, the driving assistance switching unit 35 switches the driving assistance for the vehicle M from the normal driving assistance mode to the risk avoidance assistance mode.

If it is determined by the explicit risk determination unit 21 that explicit risk is present and if it is determined by the latent risk determination unit 31 that latent risk is present, the driving assistance switching unit 35 switches the driving assistance for the vehicle M from the normal driving assistance mode to the risk avoidance assistance mode if the driver recognizes the explicit risk.

When switching from the normal driving assistance mode to the risk avoidance assistance mode, the driving assistance switching unit 35 gradually changes the assistance torque given to the steering section ST of the vehicle M through the switching transition time (through the time from the switching start to the switching end) such that the assistance torque is changed from the reaction force giving torque in the normal driving assistance mode to the risk avoidance assistance torque in the risk avoidance assistance mode. The assistance torque is a torque given to the steering section ST as the driving assistance. The reaction force giving torque is an assistance torque that is given to control the reaction force of the steering section ST in the normal driving assistance mode. The risk avoidance assistance torque is an assistance torque that is given to control the vehicle M in the risk avoidance assistance mode.

For example, if the output assistance torque is Trq, the reaction force giving torque in the normal driving assistance mode is TrqN, and the risk avoidance assistance torque in the risk avoidance assistance mode is TrqR, the driving assistance switching unit 35 can obtain an assistance torque Trq using following Equation (1). Here, Mx is a mixing rate that varies with time.

$$Trq = Mx \times TrqN + (1-Mx) \times TrqR \qquad (1)$$

FIG. 22 is a graph illustrating an example of a relationship between the mixing rate Mx and the time relating to the setting of the switching transition time. The vertical axis in the graph in FIG. 22 represents the mixing rate Mx, and the horizontal axis represents the time. FIG. 22 illustrates the switching transition times Δt, Δt1, Δt2 and switching start ts, and switching end te1, a switching end te2, and a switching end te3 respectively corresponding to the switching transition times Δt, Δt1, Δt2. The switching start ts is, for example, a time when the vehicle M is in the switching timing. The switching start ts is a time when the switching from the normal driving assistance mode to the risk avoidance assistance mode is started, and is not limited to the vehicle M is in the switching timing. As the mixing rate Mx is closer to 1, the output assistance torque Trq is closer to the reaction force giving torque TrqN in normal driving assistance mode, and as the mixing rate Mx is closer to 0, the assistance torque Trq is closer to the risk avoidance assistance torque in the risk avoidance assistance mode TrqR.

As illustrated in FIG. 22, if the switching transition time is a time Δt1 that is short, the assistance torque Trq changes rapidly compared to the case where the switching transition time is the reference time Δt. If the switching transition time is Δt2 which is long, the assistance torque Trq changes gradually compared to the case where the switching transition time is the reference time Δt. In the driving assistance system 200, since the switching transition time is changed according to a difference in the risk recognitions between the system and the driver, it is possible to perform the mode switching with reducing the discomfort to the driver. The temporal change of the mixing rate Mx does not need to be linear, and may be expressed in a curve.

If it is determined by the latent risk determination unit 31 that the latent risk is present and the switching is performed to the risk avoidance assistance mode, the avoidance control unit 36 performs the driving assistance for the vehicle M so as to avoid the latent risk. The avoidance control unit 36 generates a risk potential based on the latent risk, and calculates a target yaw rate and a target steering angle so as to avoid the latent risk. The avoidance control unit 36 controls the vehicle M so as to avoid the latent risk in the risk avoidance assistance mode by transmitting a control signal to the steering actuator.

Processing by Driving Assistance System in Second Embodiment

Next, the processing by the driving assistance system 200 in the second embodiment will be described with reference to the drawings. The reaction force characteristics change processing, the reaction force control processing, and the driver's explicit risk recognition estimation processing can be the same as those in the first embodiment, therefore, the descriptions thereof will not be repeated. Since the risk avoidance assistance processing can be the same as that in the first embodiment except that the latent risk is taken into consideration, the description thereof will not be repeated.

Mode Switching Processing in Second Embodiment

Figure 23:
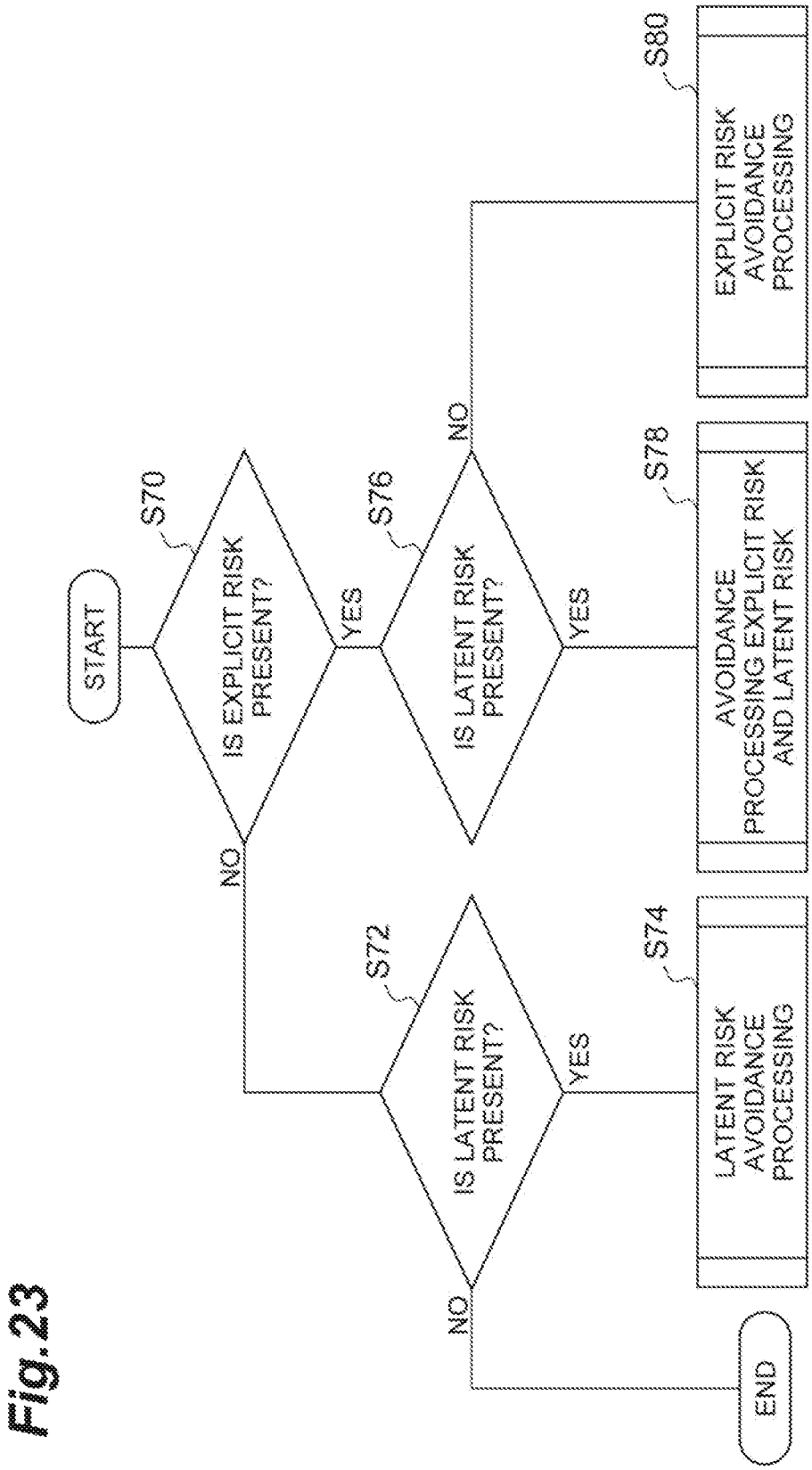
FIG. 23 is a flowchart illustrating an example of mode switching processing in the second embodiment.

FIG. 23 is a flowchart illustrating an example of the mode switching processing in the second embodiment. The mode switching processing illustrated in FIG. 23 is performed when the driving assistance for the vehicle M is in the normal driving assistance mode.

As illustrated in FIG. 23, as S70, the ECU 30 of the driving assistance system 200 determines whether or not the explicit risk is present using the explicit risk determination unit 21. If it is determined that the explicit risk is not present (NO in S70), the ECU 30 makes the process proceed to S72. If it is determined that the explicit risk is present (YES in S70), the ECU 30 makes the process proceed to S76.

In S72, the ECU 30 determines whether or not the latent risk is present using the latent risk determination unit 31. The latent risk determination unit 31 determines whether or not the latent risk is present based on the position of the vehicle M on the map recognized by the vehicle position recognition unit 11 and the latent risk information in the latent risk database D. If it is determined that the latent risk is not present (NO in S72), the ECU 30 ends the current processing. Thereafter, the ECU 30 repeats the processing from S70 after a certain time has elapsed. If it is determined that the latent risk is present (YES in S72), the ECU 30 makes the process proceed to S74. In S74, the ECU 30 performs the latent risk avoidance processing.

In S76, the ECU 30 determines whether or not the latent risk is present using the latent risk determination unit 31. If it is determined that the latent risk is present (YES in S76), the ECU 30 makes the process proceed to S78. If it is determined that the latent risk is not present (NO in S76), the ECU 30 makes the process proceed to S80.

In S78, the ECU 30 performs the explicit risk processing and the latent risk avoidance processing. In S80, the ECU 30 performs the explicit risk avoidance processing.

Latent Risk Avoidance Processing

Figure 24:
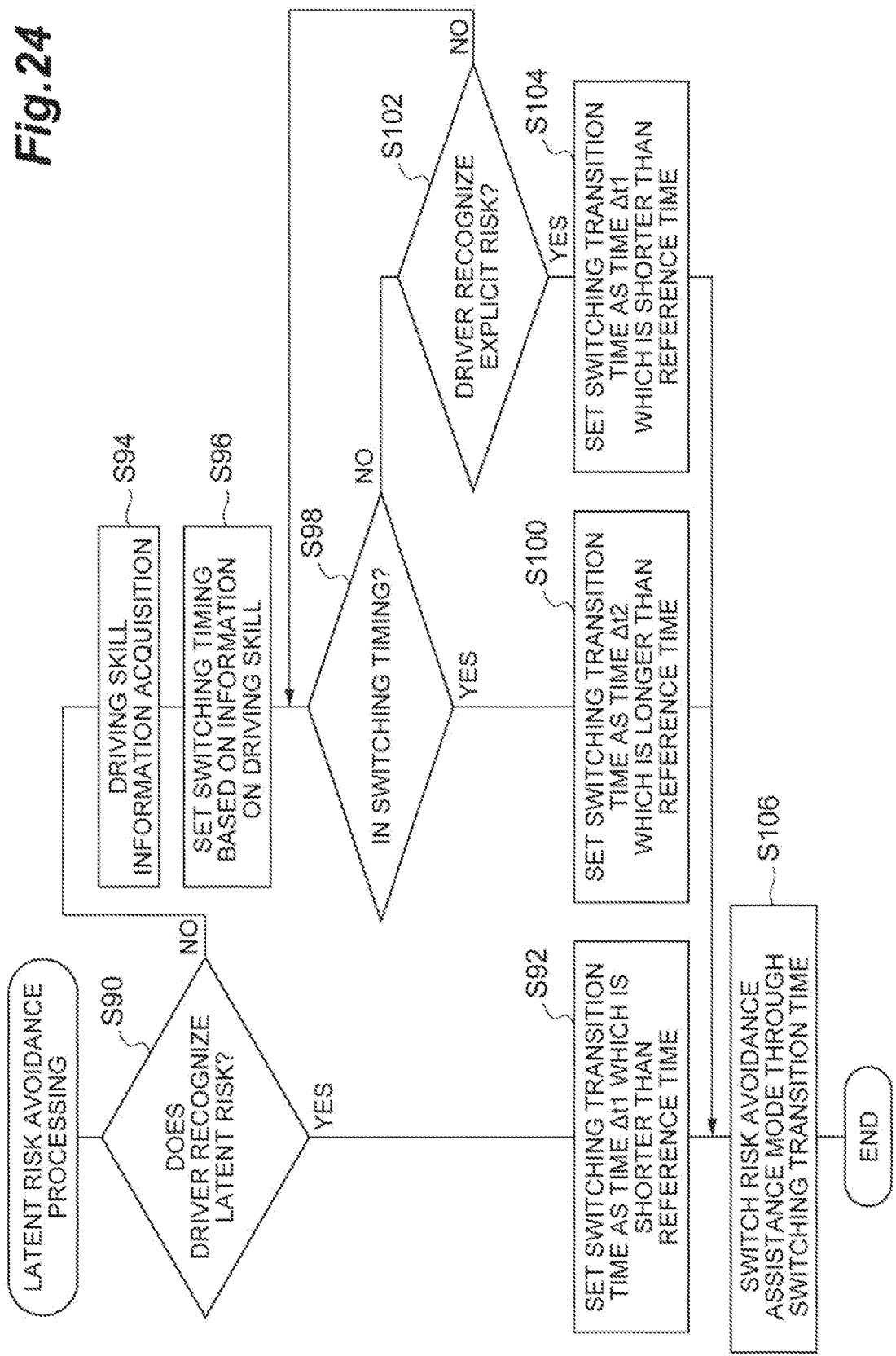
FIG. 24 is a flow chart illustrating an example of latent risk avoidance processing.

FIG. 24 is a flowchart illustrating an example of the latent risk avoidance processing. As illustrated in FIG. 24, in the latent risk avoidance processing, as S90, the ECU 30 estimates whether or not the driver recognizes the latent risk using the driver recognition estimation unit 32. The driver recognition estimation unit 32 estimates whether or not the driver recognizes the latent risk based on the predicted steering amount when the driver recognizes the latent risk and the steering amount of the driver.

If it is estimated that the driver recognizes the latent risk (YES in S90), the ECU 30 makes the process proceed to S92. If it is estimated that the driver does not recognize the latent risk (NO in S90), the ECU 30 makes the process proceed to S94.

In S92, the ECU 30 sets the switching transition time as the time Δt1 which is shorter than the reference time Δt using the switching transition time setting unit 34. Thereafter, the ECU 30 makes the process proceed to S106.

In S94, the ECU 30 acquires the information on the driving skill of the driver using the driving skill information acquisition unit 23. Subsequently, in S96, the ECU 30 sets the switching timing using the switching timing setting unit 33. The switching timing setting unit 33 sets the switching timing based on the information on the driving skill acquired by the driving skill information acquisition unit 23. Thereafter, the ECU 30 makes the process proceed to S98.

In S98, the ECU 30 determines whether or not the vehicle M is in the switching timing using the driving assistance switching unit 35. The driving assistance switching unit 35 determines whether or not the vehicle M is in the switching timing based on, for example, the time to collision between the vehicle M and the object subject to the explicit risk. If it is determined that the vehicle M is in the switching timing (YES in S98), the ECU 30 makes the process to proceed to S100. If it is not determined that the vehicle M is in the switching timing (NO in S98), the ECU 30 makes the process to proceed to S102.

In S100, the ECU 30 sets the switching transition time as the time Δt2 which is longer than the reference time Δt using the switching transition time setting unit 34. Thereafter, the ECU 30 makes the process proceed to S106.

In S102, The ECU 30 estimates whether or not the driver recognizes the latent risk using the driver recognition estimation unit 32. If it is estimated that the driver recognizes the latent risk (YES S102), the ECU 30 makes the process proceed to S104. If it is estimated that the driver does not recognize the latent risk (NO in S102), the ECU 30 makes the process return to S98.

In S104, the ECU 30 sets the switching transition time as the time Δt1 which is shorter than the reference time Δt using the switching transition time setting unit 34. Thereafter, the ECU 30 makes the process proceed to S106.

In S106, the ECU 30 switches the driving assistance for the vehicle M from the driver-initiative normal driving assistance mode to the system-initiative risk avoidance assistance mode using the driving assistance switching unit 35. The driving assistance switching unit 35 gradually changes the assistance torque given to the steering section ST of the vehicle M through the switching transition time (through the time from the switching start to the switching end) such that the assistance torque is changed from the reaction force giving torque in the normal driving assistance mode to the risk avoidance assistance torque in the risk avoidance assistance mode.

Explicit Risk and Latent Risk Avoidance Processing

Figure 25:
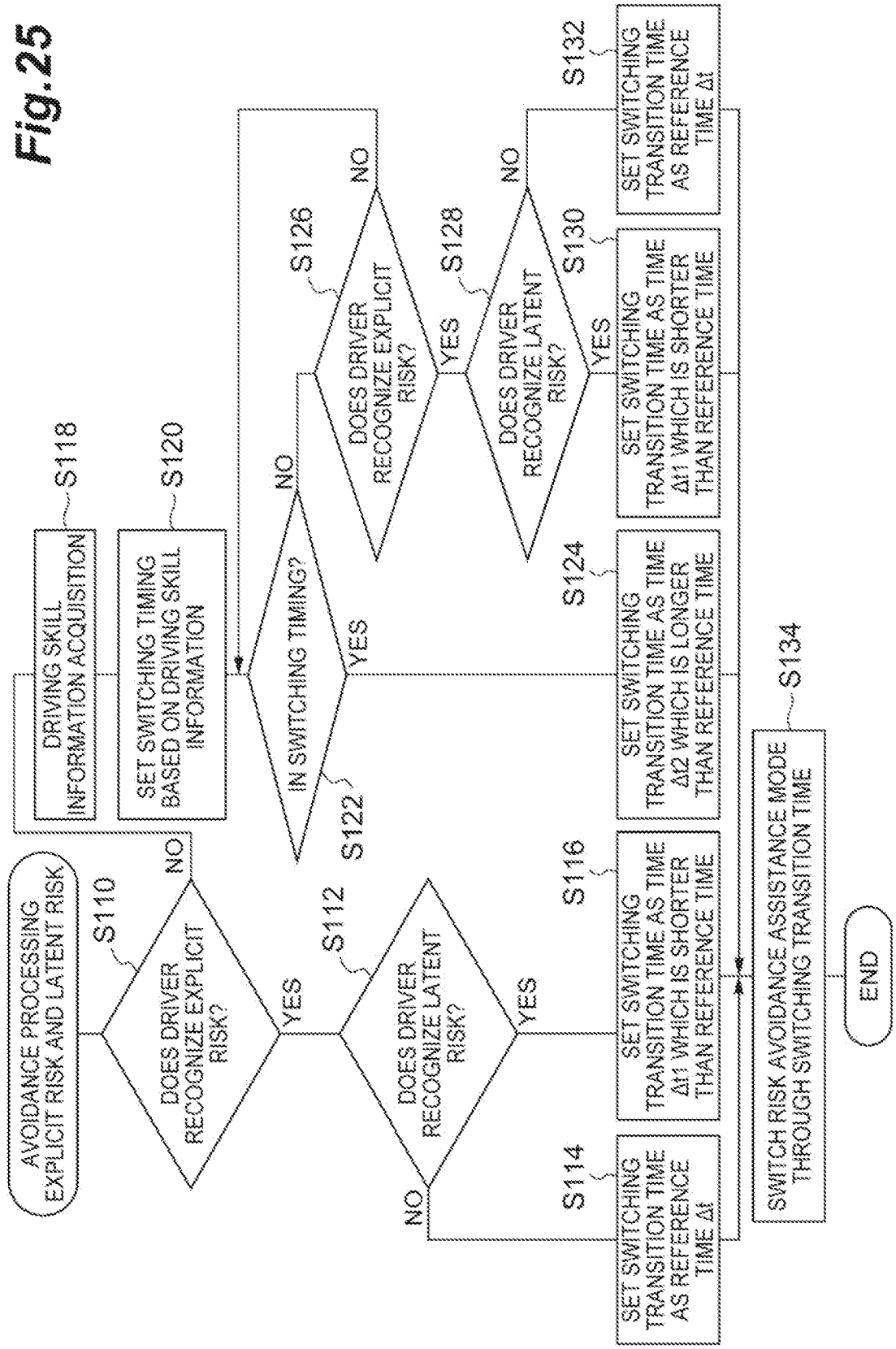
FIG. 25 is a flowchart illustrating an example of explicit risk and latent risk avoidance processing.

FIG. 25 is a flowchart illustrating an example of the explicit risk and latent risk avoidance processing. As illustrated in FIG. 25, as S110, in the explicit risk and latent risk avoidance processing, the ECU 30 estimates whether or not the driver recognizes the explicit risk using the driver recognition estimation unit 32. If it is estimated that the driver recognizes the explicit risk (YES in S110), the ECU 30 makes the process proceed to S112. If it is estimated that the driver does not recognize the explicit risk (NO in S110), the ECU 30 makes the process proceed to S118.

In S112, The ECU 30 estimates whether or not the driver recognizes the latent risk using the driver recognition estimation unit 32. If it is estimated that the driver does not recognize the latent risk (NO in S112), the ECU 30 makes the process proceed to S114. If it is estimated that the driver recognizes the latent risk (YES in S112), the ECU 30 makes the process proceed to S116.

In S114, the ECU 30 sets the switching transition time as the reference time Δt using the switching transition time setting unit 34. Thereafter, the ECU 30 makes the process proceed to S134.

In S116, the ECU 30 sets the switching transition time as the time Δt1 which is shorter than the reference time Δt using the switching transition time setting unit 34. Thereafter, the ECU 30 makes the process proceed to S134.

In S118, the ECU 30 acquires the information on the driving skill of the driver using the driving skill information acquisition unit 23. Subsequently, in S120, the ECU 30 sets the switching timing using the switching timing setting unit 33. The switching timing setting unit 33 sets the switching timing based on the information on the driving skill acquired by the driving skill information acquisition unit 23. Thereafter, the ECU 30 makes the process proceed to S122.

In S122, the ECU 30 determines whether or not the vehicle M is in the switching timing using the driving assistance switching unit 35. If it is determined that the vehicle M is in the switching timing (YES in S122), the ECU 30 makes the process proceed to S124. If it is not determined that the vehicle M is in the switching timing (NO in S122), the ECU 30 makes the process proceed to S126.

In S124, the ECU 30 sets the switching transition time as the time Δt2 which is longer than the reference time Δt using the switching transition time setting unit 34. Thereafter, the ECU 30 makes the process proceed to S134.

In S126, the ECU 30 estimates whether or not the driver recognizes the explicit risk using the driver recognition estimation unit 32. If it is estimated that the driver recognizes the explicit risk (YES in S126), the ECU 30 makes the process proceed to S128. If it is estimated that the driver does not recognize the explicit risk (NO in S126), the ECU 30 makes the process return to S122.

In S128, the ECU 30 estimates whether or not the driver recognizes the latent risk using the driver recognition estimation unit 32. If it is estimated that the driver recognizes the latent risk (YES in S128), the ECU 30 makes the process proceed to S130. If it is estimated that the driver does not recognize the latent risk (NO in S128), the ECU 30 makes the process proceed to S132.

In S130, the ECU 30 sets the switching transition time as the time Δt1 which is shorter than the reference time Δt using the switching transition time setting unit 34. Thereafter, the ECU 30 makes the process proceed to S134.

In S132, the ECU 30 sets the switching transition time as the reference time Δt using the switching transition time setting unit 34. Thereafter, the ECU 30 makes the process proceed to S134.

In S134, the ECU 30 switches the driving assistance for the vehicle M from the driver-initiative normal driving assistance mode to the system-initiative risk avoidance assistance mode using the driving assistance switching unit 35. driving assistance switching unit 35 gradually changes the assistance torque given to the steering section ST of the vehicle M through the switching transition time (through the time from the switching start to the switching end) such that the assistance torque is changed from the reaction force giving torque in the normal driving assistance mode to the risk avoidance assistance torque in the risk avoidance assistance mode.

Explicit Risk Avoidance Processing

Figure 26:
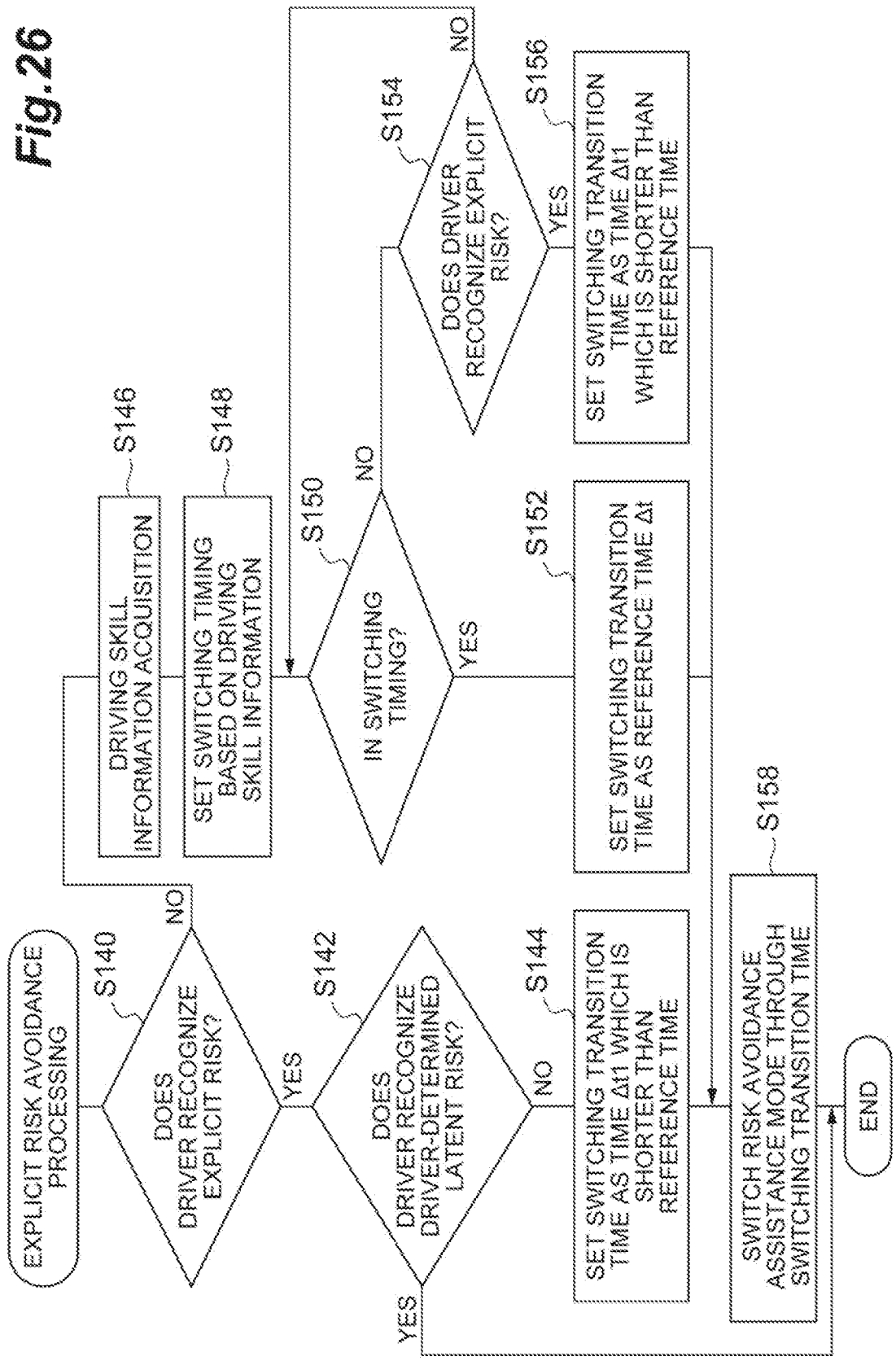
FIG. 26 is a flowchart illustrating an example of explicit risk avoidance processing.

FIG. 26 is a flowchart illustrating an example of the explicit risk avoidance processing. In the explicit risk avoidance processing illustrated in FIG. 26, as S140, the ECU 30 estimates whether or not the driver recognizes the explicit risk using the driver recognition estimation unit 32. The driver recognition estimation unit 32 estimates whether or not the driver recognizes the explicit risk based on the predicted steering amount when the driver does not recognize the explicit risk and the steering amount of the driver. If it is estimated that the driver recognizes the explicit risk (YES in S140), the ECU 30 makes the process proceed to S142. If it is estimated that the driver does not recognize the explicit risk (NO in S140), the ECU 30 makes the process proceed to S146.

In S142, the ECU 30 estimates whether or not the driver recognizes the driver-determined latent risk using the driver recognition estimation unit 32. The driver recognition estimation unit 32 estimates whether or not the driver recognizes the driver-determined latent risk based on the target steering amount when the vehicle M avoids the explicit risk in the risk avoidance assistance mode and the steering amount of the driver. If it is estimated that the driver recognizes the driver-determined latent risk (YES in S142), the ECU 30 ends the current process, and continues the normal driving assistance mode. The ECU 30 repeats the processing from S90 in the mode switching processing after a predetermined time has elapsed. If it is estimated that the driver does not recognize the driver-determined latent risk (NO in S142), the ECU 30 makes the process proceed to S144.

In S144, the ECU 30 sets the switching transition time as a time $\Delta t1$ which is shorter than the reference time $\Delta t$ using the switching transition time setting unit 34. Thereafter, the ECU 30 makes the process proceed to S158.

In S146, the ECU 30 acquires the information on the driving skill of the driver using the driving skill information acquisition unit 23. Subsequently, in S148, the ECU 30 sets the switching timing using the switching timing setting unit 33. The switching timing setting unit 33 sets the switching timing based on the information on the driving skill acquired by the driving skill information acquisition unit 23. Thereafter, the ECU 30 makes the process proceed to S150.

In S150, the ECU 30 determines whether or not the vehicle M is in the switching timing using the driving assistance switching unit 35. If it is determined that the vehicle M is in the switching timing (YES in S150), the ECU 30 makes the process proceed to S152. If it is not determined that the vehicle M is in the switching timing (NO in S150), the ECU 30 makes the process proceed to S154.

In S152, the ECU 30 sets the switching transition time as the reference time $\Delta t$ using the switching transition time setting unit 34. Thereafter, the ECU 30 makes the process proceed to S158.

In S154, the ECU 30 estimates whether or not the driver recognizes the explicit risk using the driver recognition estimation unit 32. If it is estimated that the driver recognizes the explicit risk (YES in S154), the ECU 30 makes the process proceed to S156. If it is estimated that the driver does not recognize the explicit risk (NO in S154), the ECU 30 makes the process return to S150.

In S156, the ECU 30 sets the switching transition time as the time $\Delta t1$ which is shorter than the reference time $\Delta t$ using the switching transition time setting unit 34. Thereafter, the ECU 30 makes the process proceed to S158.

In S158, the ECU 30 switches the driving assistance for the vehicle M from the driver-initiative normal driving assistance mode to the system-initiative risk avoidance assistance mode using the driving assistance switching unit 35. The driving assistance switching unit 35 gradually changes the assistance torque given to the steering section ST of the vehicle M through the switching transition time (through the time from the switching start to the switching end) such that the assistance torque is changed from the reaction force giving torque in the normal driving assistance mode to the risk avoidance assistance torque in the risk avoidance assistance mode.

Driver's Latent Risk Recognition Estimation Processing

FIG. 27A is a flowchart illustrating an example of the driver's latent risk recognition estimation processing. The driver's latent risk recognition estimation processing is performed in, for example, S90 and S102 in FIG. 24 and S112 and S128 in FIG. 25.

As illustrated in FIG. 27A, as 160, the ECU 30 estimates the predicted steering amount of the driver when the latent risk is not recognized using the driver recognition estimation unit 32. For example, the driver recognition estimation unit 32 estimates the predicted steering amount of the driver when the latent risk is recognized based on the external environment of the vehicle M, the vehicle state of the vehicle M, and the operation history of the driver.

In S162, the ECU 30 sets the allowable range of the predicted steering amount using the driver recognition estimation unit 32. The driver recognition estimation unit 32 sets, for example, a steering amount range set in advance having the predicted steering amount as a median value.

In S164, the ECU 30 determines whether or not the steering amount of the driver recognized by the operation amount recognition unit 15 is within the allowable range of the predicted steering amount using the driver recognition estimation unit 32. If it is determined that the steering amount of the driver is within the allowable range of the predicted steering amount (YES in S164), the ECU 30 makes the process proceed to S166. If it is determined that the steering amount of the driver is not within the allowable range of the predicted steering amount (NO in S164), the ECU 30 makes the process proceed to S168.

In S166, the ECU 30 estimates that the driver recognizes the latent risk. In S168, the ECU 30 estimates that the driver does not recognize the latent risk. The driver recognition estimation unit 32 may estimate that the driver recognizes the latent risk only when a state in which the steering amount of the driver is within the allowable range of the predicted steering amount is continued for more than a certain period.

Driver-determined Latent Risk Driver's Recognition Estimation Processing

FIG. 27B is a flowchart illustrating an example of the driver-determined latent risk driver's recognition estimation processing. The driver-determined latent risk driver's recognition estimation processing is performed, for example, in S142 in FIG. 26.

As illustrated in FIG. 27B, as S170, the ECU 30 calculates the target steering amount when the vehicle M avoids the explicit risk in the risk avoidance assistance mode using the driver recognition estimation unit 32.

In S172, using the driver recognition estimation unit 32, the ECU 30 determines whether or not the driver performs the steering so as to be further away from the explicit risk compared to the target steering amount when the vehicle M avoids the explicit risk in the risk avoidance assistance mode. When the deviation amount between the target steering amount when the vehicle M avoids the explicit risk in the risk avoidance assistance mode as a reference and the steering amount of the driver in a direction away from the explicit risk is equal t or greater than the deviation threshold value, the driver recognition estimation unit 32 may be estimated that the driver recognizes the driver-determined latent risk. If it is determined that the driver performs the steering so as to be further away from the explicit risk compared to the target steering amount (YES in S172), the ECU 30 makes the process proceed to S174. If it is not determined that the driver performs the steering so as to be further away from the explicit risk compared to the target steering amount (NO in S172), the ECU 30 makes the process proceed to S176.

In S174, the ECU 30 estimates that the driver recognizes the driver-determined latent risk. In S176, the ECU 30 estimates that the driver does not recognize the driver-determined latent risk. The driver recognition estimation unit 32 may estimate that the driver recognizes the driver-determined latent risk only when a state in which the deviation amount between the target steering amount as a reference and the steering amount of the driver in a direction away from the explicit risk is equal to or greater than the deviation threshold value is continued for more than a certain period.

According to the driving assistance system 200 in the second embodiment described above, if it is determined that a latent risk such as a pedestrian jumping out from the intersection with low visibility is present, it is possible to take appropriate measures to avoid the risk by switching the driving assistance mode to the system-initiative risk avoidance assistance mode.

In the driving assistance system 200, if it is estimated that the driver does not recognize the explicit risk, the switching transition time is set as a longer time compared to a case where it is estimated that the driver is recognizes the explicit risk. In addition, in the driving assistance system 200, if it is determined that the latent risk is present and if it is estimated that the driver does not recognize the latent risk, the switching transition time is set as a longer time compared to a case where it is estimated that the driver recognizes the latent risk. In this way, according to the driving assistance system 200, it is possible to prevent the driver from suddenly changing the assistance torque without understanding the reason for the mode switching.

Furthermore, according to the driving assistance system 200, if the driver recognizes the driver-determined latent risk which is not recognized by the system, since sometimes it may not be appropriate to switch the assistance mode to the system-initiative risk avoidance assistance mode, the normal driving assistance mode can be continued. In this way, despite that the driver recognizes the driver-determined latent risk which is not recognized by the system and performs the steering so as to be away from the explicit risk, it is possible to avoid a situation where the assistance mode is switched to risk avoidance assistance mode and the steering is performed so as to approach the explicit risk compared to the driver's steering.

As described above, the embodiments of the present disclosure have been described, however, the present disclosure is not limited to the embodiments described above. The present disclosure can be implemented in various forms including various modifications and improvements based on the knowledge of those skilled in the art, including the above-described embodiments. The present disclosure can be embodied in various forms including various modifications and improvements based on the knowledge of those skilled in the art including the above-described embodiments.

The normal driving assistance mode may include driving assistances other than the reaction force characteristics change. The normal driving assistance mode may include well-known driving assistance control such as an adaptive cruise control (ACC). The driving assistance systems 100 and 200 may be able to switch the assistance mode to other modes besides the normal driving assistance mode and the risk avoidance assistance mode.

In estimating the driver's recognition of the explicit risk, it is not necessary to use the allowable range. The method of estimation is not limited as long as at least one of the predicted steering amount when the driver does not recognize the explicit risk and the predicted steering amount when the driver recognizes the explicit risk, and the steering amount of the driver are used.

The driving assistance systems 100 and 200 do not necessarily need to perform the estimation of the driver's recognition of the explicit risk. The driving assistance systems 100 and 200 may not include the driver recognition estimation units 22 and 32.

The switching timing may be a predetermined fixed value. In this case, the driving assistance systems 100 and 200 do not need to include the driving skill information acquisition unit 23 and the switching timing setting units 24 and 33.

The switching transition time may be set in the first embodiment. The driving assistance system 100 may include a switching transition time setting unit 34. In addition, it is not necessary need to use the mixing rate Mx for the change of the assistance torque Trq. The method of obtaining the assistance torque Trq is not limited to Equation (1), but any methods may be adopted as long as the assistance torque Trq can be gradually changed through the switching transition time.

In the driving assistance systems 100 and 200, the switching transition time may be a predetermined fixed value. In this case, the switching transition time setting unit 34 does not necessarily need to be included. In addition, the switching transition time may not be set. The assistance torque Trq may change immediately at the time of starting the switching from the normal driving assistance mode to the risk avoidance assistance mode.

In the first embodiment, the driver may estimate whether or not the driver recognizes the driver-determined latent risk. That is, in driving assistance system 100, even if it is determined that the explicit risk is present, if it is estimated that the driver recognizes the driver-determined latent risk, the normal driving assistance mode may be continued.

In the driving assistance system 200, it is necessarily need to estimate the recognition of the driver-determined latent risk. When the driver performs the steering so as to be further away from the explicit risk compared to the target steering amount when the vehicle M avoids the explicit risk in the risk avoidance assistance mode, the driving assistance system 200 may continue the normal driving assistance mode without estimating the recognition of the driver-determined latent risk. Alternatively, in the driving assistance system 200, if it is determined that the explicit risk is present, switching from the normal driving assistance mode to the risk avoidance assistance mode may necessarily be performed. The above-described point may be applied to the driving assistance system 100.

The driving assistance systems 100 and 200 do not necessarily need to use the PID controller 7. The ECU 10 may be directly connected to the reaction force actuator 8. In this case, the ECU 10 may have a feedback function for suppressing the influence of disturbance instead of the PID controller 7.

The driving assistance systems 100 and 200 do not necessarily need to use the GPS receiver 1 and the map database 5. In this case, the ECUs 10 and 30 do not need to include the vehicle position recognition unit 11. The external environment recognition unit 12 may recognize the external environment of the vehicle M only from the result of detection performed by the external sensor 2.

The appropriate operation amount prediction unit 16 may predict the appropriate operation amount without using the vehicle state. In this case, the ECUs 10 and 30 do not necessarily need to be connected to the internal sensor 3, and the ECUs 10 and 30 do not need to include the vehicle state recognition unit 13. The appropriate operation amount may be any operation amount as long as the operation amount that is performed by the driver in response to the external environment along the operation history of the driver. In addition, the appropriate operation amount prediction unit 16 does not necessarily need to use the operation history. The appropriate operation amount prediction unit 16 may predict the appropriate operation amount from the external environment of the vehicle and the vehicle state. In this case, the appropriate operation amount is the operation amount that the driver performs in response to the external environment. When the operation history is not used, the ECUs 10 and 30 do not need to be connected to the operation history storage unit 6.

The ECUs 10 and 30 do not necessarily need to include the curve traveling recognition unit 14. If it is determined by the determination unit 18 that the operation amount of the driver corresponding to the prediction time point for the appropriate operation amount is included in the appropriate operation amount range regardless of whether the vehicle M is traveling on the curve or not, the reaction force characteristics change unit 19 may change the reaction force characteristics of the operation device T to the reaction force characteristics for maintaining the sense of initiative.

The reaction force characteristics change unit 19 may change the reaction force characteristics for maintaining the sense of initiative according to the driver's driving trend and/or the driving skill. The driver's driving trend and the driving skill can be obtained from the operation history of the driver using well-known evaluation method. In the driver's skill, the characteristics (veteran characteristics, beginner characteristics, or the like) may be classified according to a result of comparison between the operation history of the driver and the reference model operation. When the driving skill of the driver is the veteran characteristics, the reaction force characteristics change unit 19 may decrease the slope in the appropriate steering amount range Es of the reaction force characteristics R for maintaining the sense of initiative in FIG. 3 and FIG. 4 compared to the case where the driver's driving skill is the beginner characteristics. For example, the slope may be set approximately 2 times the slope of the reference reaction force characteristics B when the driving skill of the driver is the veteran characteristics, and may be set to approximately three times the reference reaction force characteristics B when the driving skill of the driver is beginner characteristics.

The reaction force characteristics change unit 19 does not necessarily need to set the reaction force characteristics for maintaining the sense of initiative using the reference reaction force characteristics. The reaction force characteristics change unit 19 may set the reaction force characteristics for maintaining the sense of initiative regardless of the reference reaction force characteristics.

The driving assistance systems 100 and 200 perform the driving assistance such that the steering amount of the driver becomes appropriate while maintaining the sense of initiative of the driver, however, it does not exclude the forcible operation interference depending on the situation. In a situation where it is necessary to avoid contact between the vehicle M and an object, the driving assistance systems 100 and 200 may perform the operation interference for forcibly changing the operation amount of the driver. The driving assistance systems 100 and 200 may determine whether there is a possibility of contact between the vehicle and the object, and may perform the change to the reaction force characteristics for maintaining the sense of initiative if it is determined that there is no possibility of contact.

What is claimed is:

1. A driving assistance system that performs a driver-initiative normal driving assistance mode as a driving assistance for a vehicle, the system comprising:
  an electronic control unit (ECU), including a processor and a memory that stores a program executed by the processor, configured to:
  recognize an operation amount performed by a driver for an operation device of the vehicle;
  recognize an external environment of the vehicle;
  set an appropriate operation amount range that is a range of an appropriate operation amount performed by the driver in response to the external environment;
  determine whether or not the operation amount of the driver is included in the appropriate operation amount range at a first time;
  change reaction force characteristics of the operation device, when the operation amount of the driver at the first time is determined to not be included in the appropriate operation amount range by:
    controlling, during a normal driving assistance mode and after determining that the operation amount of the driver at the first time is not included in the appropriate operation amount range, a reaction force increase amount of the operation device with respect to an increase of the operation amount within the appropriate operation amount range to be larger than a reaction force increase amount of the operation device with respect to the increase of the operation amount within the appropriate operation amount range when the operation amount of the driver is determined to be in the appropriate operation range at the first time, and
    controlling, during the normal driving assistance mode and after determining that the operation amount of the driver at the first time is not included in the appropriate operation amount range, a reaction force decrease amount of the operation device with respect to a decrease of the operation amount within the appropriate operation amount range to be larger than a reaction force decrease amount of the operation device with respect to the decrease of the operation amount within the appropriate operation amount range when the operation amount of the driver is determined to be in the appropriate operation range at the first time;
  determine whether or not an explicit risk is present based on the external environment of the vehicle; and
  switch a driving assistance for the vehicle from the normal driving assistance mode to a system-initiative risk avoidance assistance mode, based upon the determination that the explicit risk is present in the normal driving assistance mode.

2. The driving assistance system according to claim 1,
wherein the operation amount of the driver includes a steering amount of the driver for a steering wheel of the vehicle, and
the ECU is further configured to:
estimate whether or not the driver recognizes the explicit risk, if it is determined that the explicit risk is present, based on a predicted steering amount when the driver does not recognize the explicit risk or when the driver does recognizes the explicit risk, and the steering amount of the driver in the normal driving assistance mode,
switch the driving assistance for the vehicle from the normal driving assistance mode to the risk avoidance assistance mode, if it is estimated that the driver recognizes the explicit risk.

3. The driving assistance system according to claim 2, wherein the ECU is further configured to:
acquire information on a driving skill of the driver; and
set a switching timing based on the information on the driving skill of the driver, if it is determined that the driver does not recognize the explicit risk,
switch the driving assistance for the vehicle from the normal driving assistance mode to the risk avoidance assistance mode when the switching timing is set and when the vehicle is in the switching timing.

4. The driving assistance system according to claim 2, wherein the ECU is further configured to:
set a switching transition time which is a time from switching start to switching end, when switching from the normal driving assistance mode to the risk avoidance assistance mode,
gradually change an assistance torque given to the steering wheel through the time from the switching start to the switching end such that the assistance torque is changed from a reaction force giving torque in the normal driving assistance mode to a risk avoidance assistance torque in the risk avoidance assistance mode, and
set the switching transition time as a longer time if it is estimated that the driver does not recognize the explicit risk compared to a case where if it is estimated that the driver recognizes the explicit risk.

5. The driving assistance system according to claim 2, wherein the ECU is further configured to:
recognize a vehicle position on a map;
store latent risk information associated with the position on the map, in a latent risk database;
determine whether or not a latent risk is present based on the vehicle position on the map and the latent risk information; and
switch the driving assistance for the vehicle from the normal driving assistance mode to the risk avoidance assistance mode, if it is determined that the latent risk is present in the normal driving assistance mode.

6. The driving assistance system according to claim 5, wherein the ECU is further configured to:
set a switching transition time which is a time from switching start to switching end, when switching from the normal driving assistance mode to the risk avoidance assistance mode,
estimate whether or not the driver recognizes the latent risk based on a predicted steering amount when the driver recognizes the latent risk and a steering amount of the driver, if it is estimated that the latent risk is present,
gradually change an assistance torque given to the steering wheel through the time from the switching start to the switching end such that the assistance torque is changed from a reaction force giving torque in the normal driving assistance mode to a risk avoidance assistance torque in the risk avoidance assistance mode, and
set the switching transition time as a longer time if it is determined that the latent risk is present and when it is estimated that the driver does not recognize the explicit risk, compared to a case when it is estimated that the driver recognizes the explicit risk.

7. The driving assistance system according to claim 5, wherein the ECU is further configured to:
estimate whether or not the driver recognizes a driver-determined latent risk based on the target steering amount when the vehicle avoids the explicit risk in the risk avoidance assistance mode and a steering amount of the driver, if it is determined that the explicit risk is present and if it is determined that the latent risk is not present, and
continue the normal driving assistance mode if it is estimated that the driver recognizes the driver-determined latent risk.

8. The driving assistance system according to claim 3, wherein the ECU is further configured to:
set a switching transition time which is a time from switching start to switching end, when switching from the normal driving assistance mode to the risk avoidance assistance mode,
gradually change an assistance torque given to the steering wheel through the time from the switching start to the switching end such that the assistance torque is changed from a reaction force giving torque in the normal driving assistance mode to a risk avoidance assistance torque in the risk avoidance assistance mode, and
set the switching transition time as a longer time if it is estimated that the driver does not recognize the explicit risk compared to a case where if it is estimated that the driver recognizes the explicit risk.

9. The driving assistance system according to claim 3, wherein the ECU is further configured to:
recognize a vehicle position on a map;
store latent risk information associated with the position on the map in a latent risk database; and
determine whether or not a latent risk is present based on the vehicle position on the map and the latent risk information,
switch the driving assistance for the vehicle from the normal driving assistance mode to the risk avoidance assistance mode, if it is determined that the latent risk is present in the normal driving assistance mode.

10. The driving assistance system according to claim 4, wherein the ECU is further configured to:
recognize a vehicle position on a map;
store latent risk information associated with the position on the map in a latent risk database; and
determine whether or not a latent risk is present based on the vehicle position on the map and the latent risk information,
switch the driving assistance for the vehicle from the normal driving assistance mode to the risk avoidance assistance mode, if it is determined that the latent risk is present in the normal driving assistance mode.

11. The driving assistance system according to claim 6, wherein the ECU is further configured to: estimate whether or not the driver recognizes a driver-determined latent risk based on the target steering amount when the vehicle avoids the explicit risk in the risk avoidance assistance mode and a steering amount of the driver, if it is determined that the explicit risk is present and if it is determined that the latent risk is not present, and continue the normal driving assistance mode if it is estimated that the driver recognizes the driver-determined latent risk.

* * * * *